(12) United States Patent
Numazaki et al.

(10) Patent No.: US 9,859,829 B2
(45) Date of Patent: Jan. 2, 2018

(54) MOTOR CONTROL DEVICE

(71) Applicant: JTEKT CORPORATION, Osaka-shi (JP)

(72) Inventors: Kazuya Numazaki, Chiryu (JP); Yasuharu Mukai, Kariya (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/393,792

(22) Filed: Dec. 29, 2016

(65) Prior Publication Data

US 2017/0201199 A1 Jul. 13, 2017

(30) Foreign Application Priority Data

Jan. 8, 2016 (JP) .................................. 2016-002484
Mar. 18, 2016 (JP) .................................. 2016-055450

(51) Int. Cl.
  *H02P 21/14* (2016.01)
  *H02P 21/00* (2016.01)
  *G05B 13/02* (2006.01)

(52) U.S. Cl.
  CPC .......... *H02P 21/14* (2013.01); *G05B 13/0285* (2013.01); *H02P 21/001* (2013.01)

(58) Field of Classification Search
  CPC .. H02P 21/15; H02P 21/0001; G05B 13/0285
  USPC ....................................................... 318/568
  See application file for complete search history.

(56) References Cited

U.S. PATENT DOCUMENTS

| 7,174,226 | B2* | 2/2007 | Nakazato | G05B 19/19 700/159 |
|---|---|---|---|---|
| 2005/0085939 | A1* | 4/2005 | Nakazato | G05B 19/19 700/173 |
| 2015/0295522 | A1* | 10/2015 | Sakai | G05B 19/404 318/631 |

FOREIGN PATENT DOCUMENTS

| JP | 2009-303432 | 12/2009 |
|---|---|---|
| JP | 2014-6566 | 1/2014 |

\* cited by examiner

*Primary Examiner* — Eduardo Colon Santana
*Assistant Examiner* — Devon Joseph
(74) *Attorney, Agent, or Firm* — Oblon, McClelland, Maier & Neustadt, L.L.P.

(57) ABSTRACT

In a motor control device, a velocity feed-forward control portion includes a velocity-side acceleration input portion that outputs received high-order command acceleration as a velocity-side acceleration output; a velocity-side velocity input portion that outputs a received high-order command velocity as a velocity-side velocity output; velocity-side boundary-velocity input portions which are prepared so as to respectively correspond to boundary velocities, and to output velocity-side boundary velocity outputs from the velocity-side boundary-velocity input portions corresponding to the high-order command velocity, the boundary velocities being velocities at boundaries of preset adjacent velocity ranges obtained by dividing a limited velocity range; a velocity-side first weight learning portion that changes velocity-side first learning weights in accordance with a velocity deviation, the velocity-side first learning weights respectively corresponding to velocity-side first outputs; and a velocity-side output portion that outputs, as a second tentative command current, a value obtained by summing velocity-side first multiplication values.

12 Claims, 22 Drawing Sheets

FIG. 5
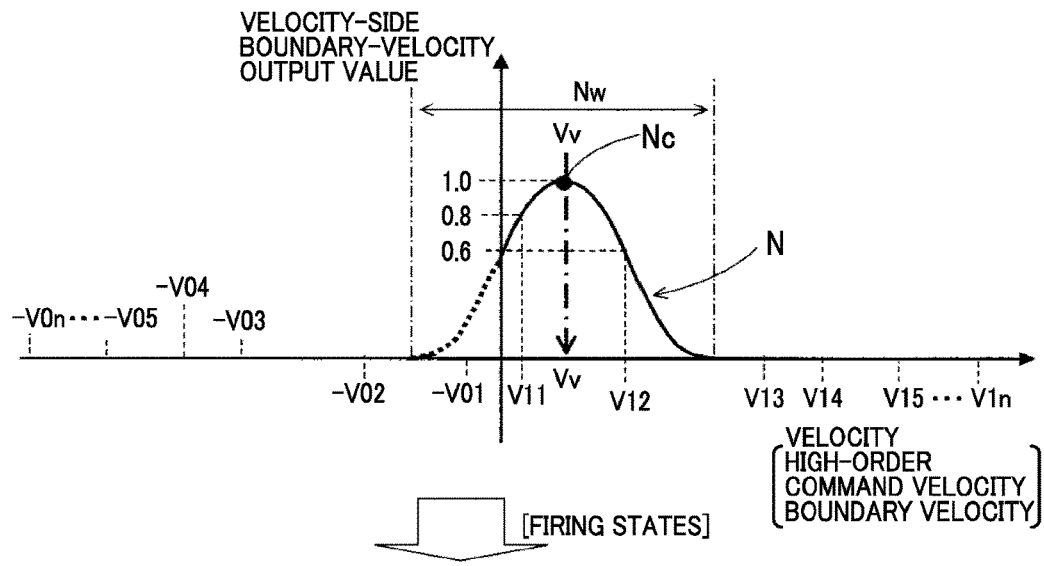
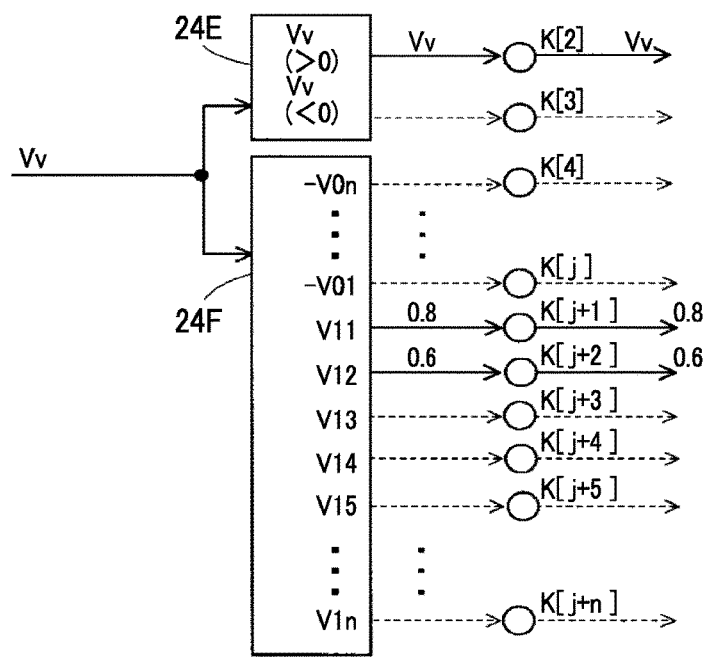

FIG. 7
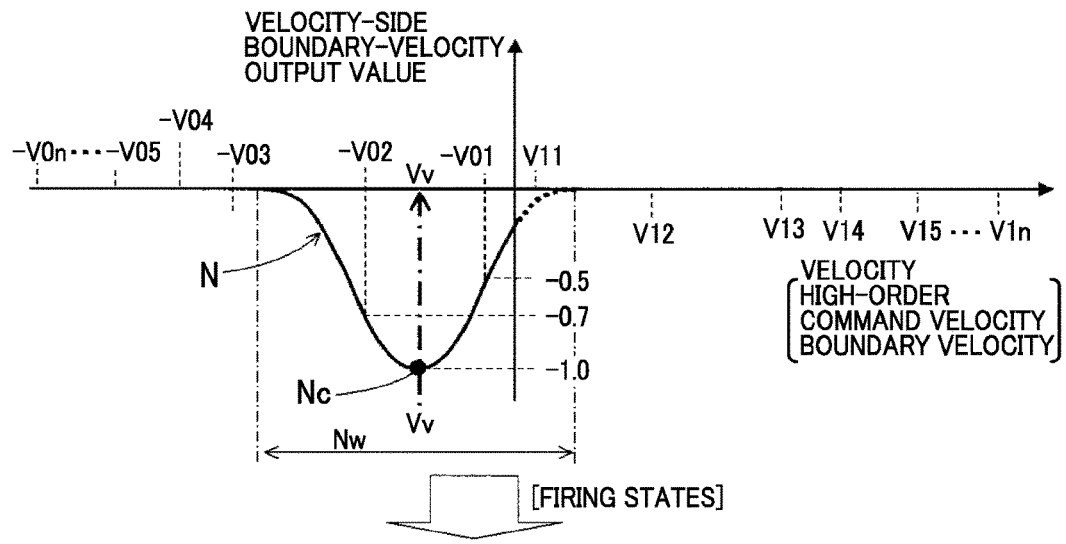
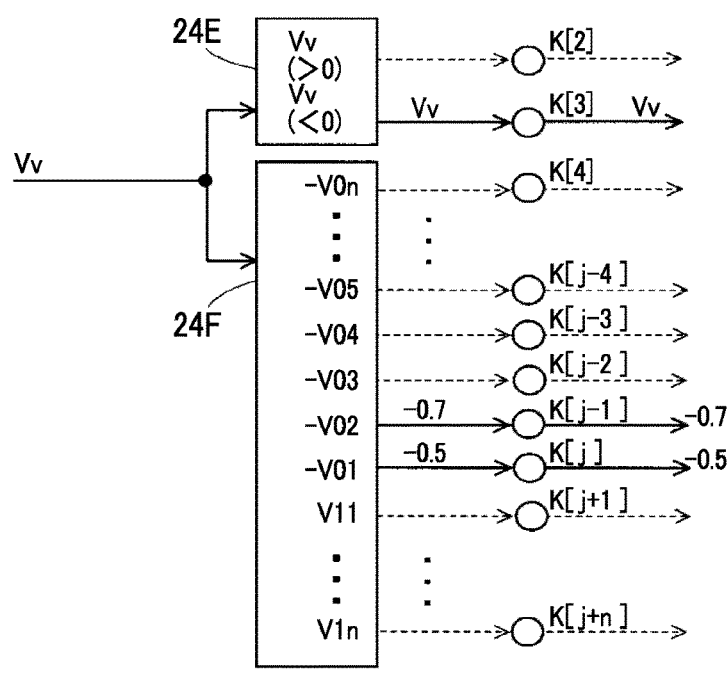

FIG. 19
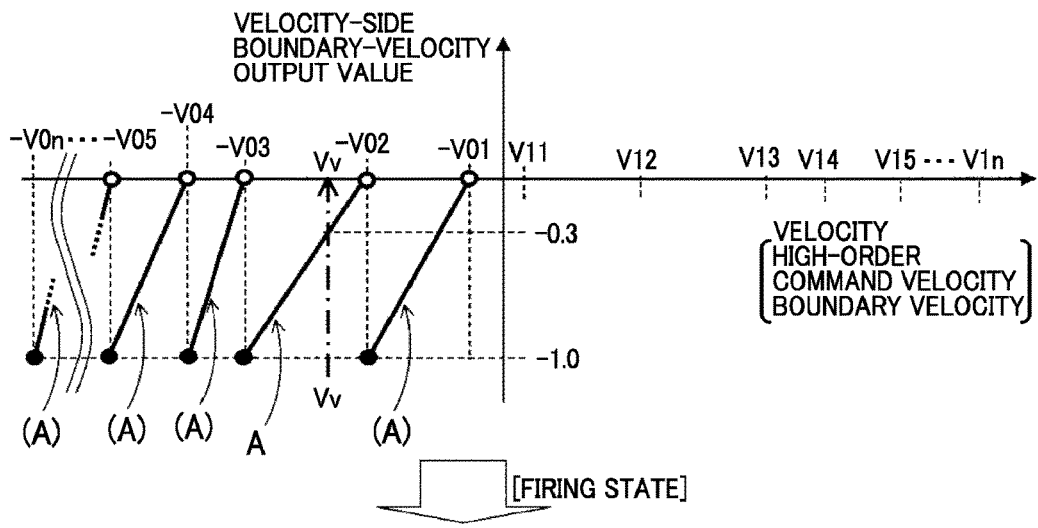
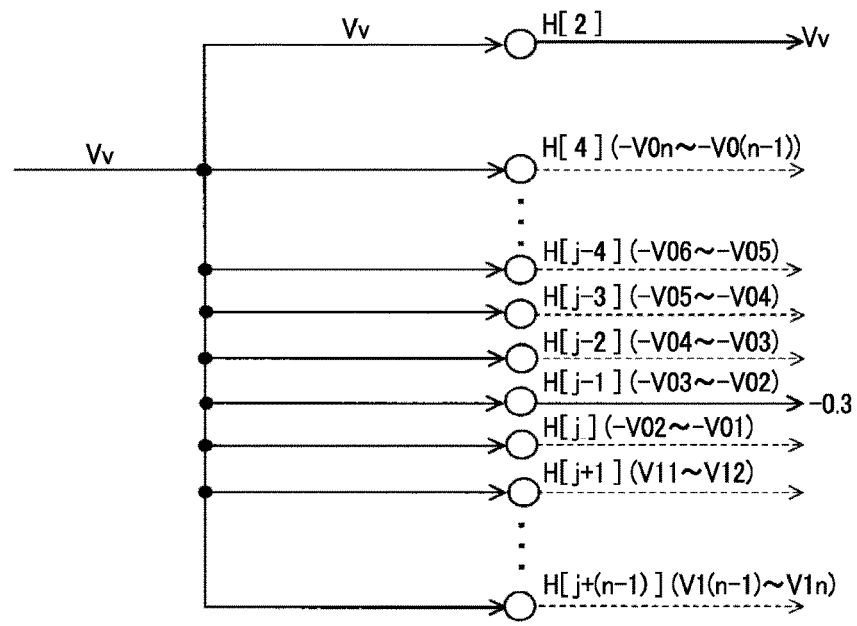

FIG. 21
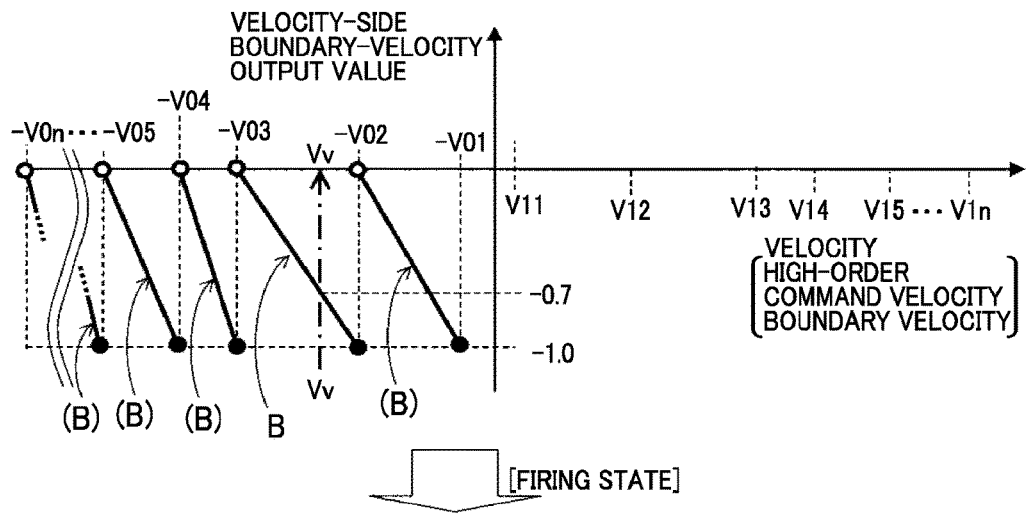
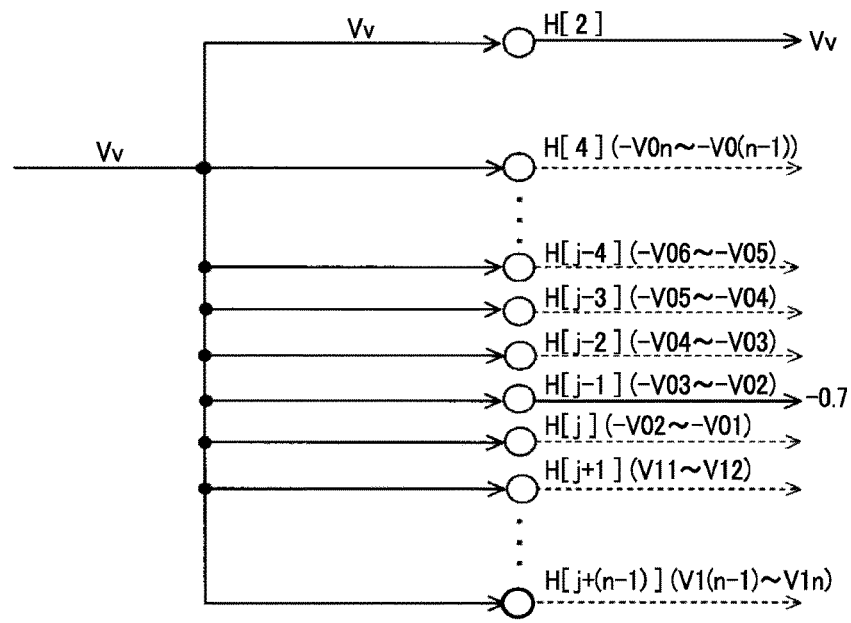

FIG. 22
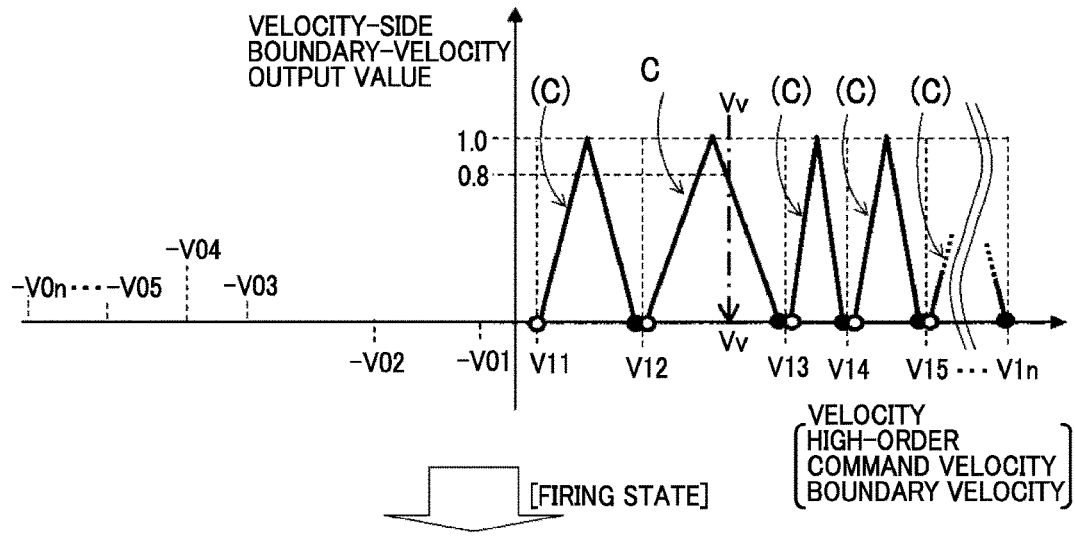
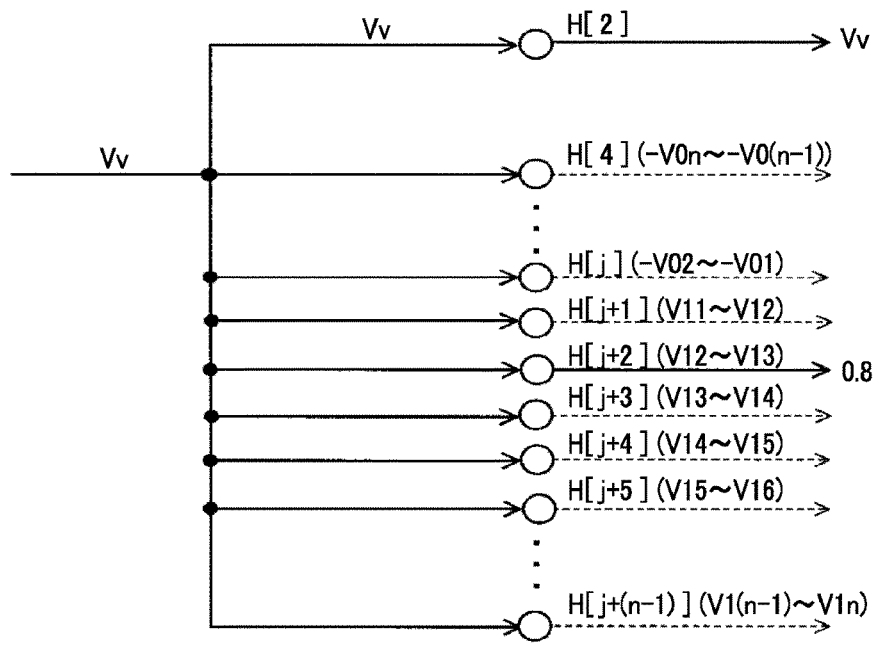

FIG. 23
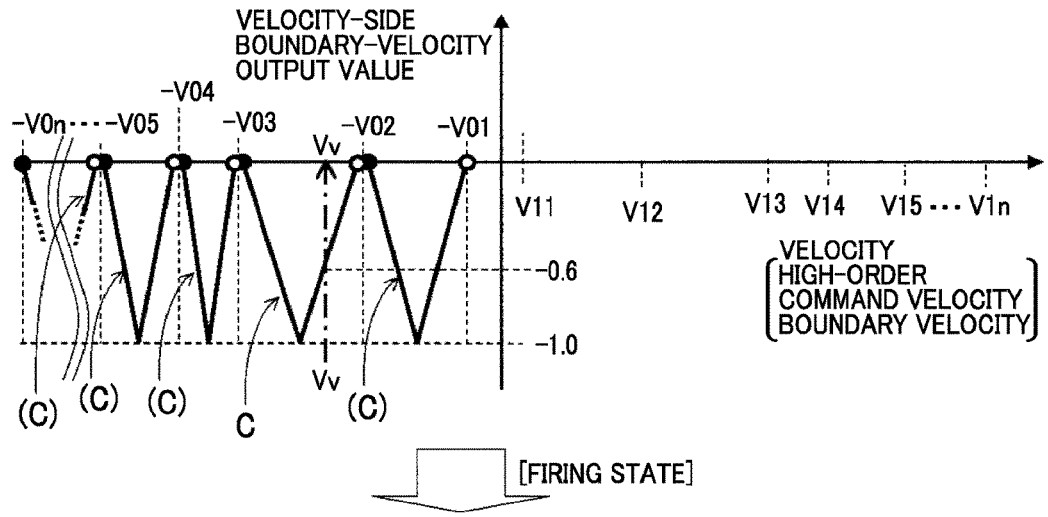
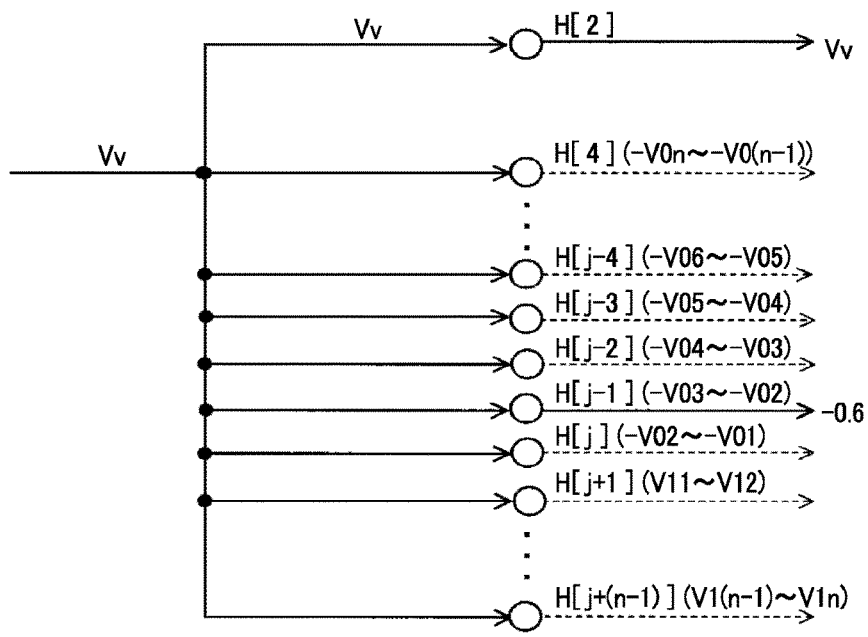

MOTOR CONTROL DEVICE

INCORPORATION BY REFERENCE

The disclosure of Japanese Patent Application No. 2016-055450 filed on Mar. 18, 2016 including the specification, drawings and abstract is incorporated herein by reference in its entirety.

BACKGROUND

1. Technical Field

The disclosure relates to a motor control device that controls a position of a specified member (a controlled object), such as a table or an arm, by using an electric motor, in a machine tool, a robot, or the like.

2. Description of Related Art

For example, Japanese Patent Application Publication No. 2009-303432 (JP 2009-303432 A) discloses a position control device that uses a motor and changes a detection value of a position of the motor in accordance with a position command value. The position control device includes: a velocity reference model that outputs a velocity reference command value; a velocity controller (a velocity feedback portion) that calculates a control quantity (a current command value) in accordance with a deviation between the velocity reference command value and an actual velocity; and a velocity feed-forward portion that outputs a velocity feed-forward output signal. Furthermore, the position control device includes: a position reference model that outputs a position reference command value; a position controller (a position feedback portion) that calculates a control quantity (a velocity command value) in accordance with a deviation between the position reference command value and an actual position; and a position feed-forward portion that outputs a position feed-forward output signal. Note that the position feed-forward portion receives a position command value that is input to the position reference model and the velocity feed-forward portion receives the velocity command value that is input to the velocity reference model.

In addition, for example, Japanese Patent Application Publication No. 2014-6566 (JP 2014-6566 A) discloses an incorporated intelligent controller that controls a position of a controlled object through a position command and controls a force thereof through a force command. The incorporated intelligent controller includes a fuzzy neural network in a position control system, a fuzzy neural network in a force control system, and a switching portion that switches between position control and force control in a continuous manner by hybrid/compliance control of the position and the force.

SUMMARY

The position control device disclosed in JP 2009-303432 A requires the position reference model and the velocity reference model as models of the controlled object. Thus, it is extremely difficult to apply the position control device that is difficult to model due to static friction or the like. In addition, because the velocity feed-forward portion only receives the velocity command value, a position deviation and a velocity deviation that have a significant impact on accuracy of a machine tool, a robot, or the like may not be efficiently reduced.

The incorporated intelligent controller disclosed in JP 2014-6566 A uses the fuzzy neural networks for smooth switching between the position control and the force control during assembly operation of an industrial robot or the like that requires both of the position control and the force control. However, because these types of the control are complicated, it is difficult to apply the incorporated intelligent controller to a control system that controls a position of a specified member, such as a table of a machine tool or a robot arm, with higher accuracy.

The disclosure provides a motor control device that controls a position of a specified member (a controlled object) using an electric motor, and that can further reduce a position deviation and a velocity deviation.

A first aspect of the disclosure relates to a motor control device configured to control a position of a controlled object by using an electric motor that moves the position of the controlled object, and a position detection unit that detects a position related to the electric motor. The motor control includes: a position deviation computation portion that computes a position deviation that is a deviation between a command position for the electric motor and an actual position based on a detection signal from the position detection unit; a position feedback control portion that executes feedback control in accordance with the position deviation and outputs a first tentative command velocity; a velocity deviation computation portion that computes a velocity deviation that is a deviation between a low-order command velocity for the electric motor including the first tentative command velocity and an actual velocity based on the detection signal from the position detection unit; a velocity feedback control portion that executes feedback control in accordance with the velocity deviation and outputs a first tentative command current; a velocity feed-forward control portion that executes feed-forward control in accordance with a high-order command velocity that is different from the low-order command velocity and outputs a second tentative command current; a current addition computation portion that adds the first tentative command current to the second tentative command current and outputs a command current; and a current output portion that outputs a drive current for the electric motor based on the command current. The velocity feed-forward control portion includes: a velocity-side acceleration input portion that receives high-order command acceleration and outputs the received high-order command acceleration as a velocity-side acceleration output; a velocity-side velocity input portion that receives the high-order command velocity and outputs the received high-order command velocity as a velocity-side velocity output; a plurality of velocity-side boundary-velocity input portions which are prepared so as to respectively correspond to a plurality of boundary velocities, to receive the high-order command velocity, and to output a velocity-side boundary velocity output from a velocity-side boundary-velocity input portion corresponding to the high-order command velocity, the plurality of the boundary velocities being velocities at boundaries of a plurality of preset adjacent velocity ranges that are obtained by dividing a limited velocity range that is limited relative to a velocity range of the high-order command velocity; a velocity-side first weight learning portion that changes a plurality of velocity-side first learning weights in accordance with the velocity deviation, the velocity-side first learning weights respectively corresponding to velocity-side first outputs that include the velocity-side acceleration output, the velocity-side velocity output, and the velocity-side boundary velocity output; and a velocity-side output portion that outputs, as the second tentative command current, a value obtained by summing a plurality of velocity-side first multiplication values that are obtained by multiplying the velocity-side first outputs by the velocity-side first learning weights that respectively correspond to the velocity-side first outputs.

In the first aspect, the velocity-side boundary-velocity input portion and the velocity-side first learning weight are prepared for each of the plurality of the velocity ranges. The velocity-side boundary velocity output, which is output from the velocity-side boundary-velocity input portion corresponding to the high-order command velocity, is multiplied by the velocity-side first learning weight, and the obtained value is reflected in the second tentative command current of the velocity feed-forward control portion (in other words, the second tentative command current of the velocity feed-forward control portion is changed in accordance with the obtained value). Learning is performed such that the velocity-side first learning weights are changed to reduce the velocity deviation. Thus, the velocity-side first learning weight for each of the plurality of the velocity ranges is changed in accordance with the high-order command velocity and the velocity deviation. Thus, it is possible to provide the motor control device that reduces the velocity deviation at any velocity.

A second aspect of the disclosure relates to a motor control device configured to control a position of a controlled object by using an electric motor that moves the position of the controlled object, and a position detection unit that detects a position related to the electric motor. The motor control device includes: a position deviation computation portion that computes a position deviation that is a deviation between a command position for the electric motor and an actual position based on a detection signal from the position detection unit; a position feedback control portion that executes feedback control in accordance with the position deviation and outputs a first tentative command velocity; a velocity deviation computation portion that computes a velocity deviation that is a deviation between a low-order command velocity for the electric motor including the first tentative command velocity and an actual velocity based on the detection signal from the position detection unit; a velocity feedback control portion that executes feedback control in accordance with the velocity deviation and outputs a first tentative command current; a velocity feed-forward control portion that executes feed-forward control in accordance with a high-order command velocity that is different from the low-order command velocity and outputs a second tentative command current; a current addition computation portion that adds the first tentative command current to the second tentative command current and outputs a command current; and a current output portion that outputs a drive current for the electric motor based on the command current. The velocity feed-forward control portion includes: a velocity-side positive/negative-velocity firing portion that receives the high-order command velocity, outputs a velocity-side positive-velocity output value when the received high-order command velocity is positive, and outputs a velocity-side negative-velocity output value when the received high-order command velocity is negative; a velocity-side boundary-velocity firing portion that has a plurality of boundary velocities, receives the high-order command velocity, and outputs velocity-side boundary-velocity output values from the boundary velocities each of which has a velocity difference from the high-order command velocity that is equal to or smaller than a specified velocity difference among the plurality of the boundary velocities, each of the velocity-side boundary-velocity output values being based on the velocity difference from the high-order command velocity, and the plurality of the boundary velocities being velocities at boundaries of a plurality of preset adjacent velocity ranges that are obtained by dividing a limited velocity range that is limited relative to a velocity range of the high-order command velocity; a velocity-side acceleration input portion that receives high-order command acceleration and outputs the received high-order command acceleration as a velocity-side acceleration output; a velocity-side positive-velocity input portion that receives the velocity-side positive-velocity output value and outputs the received velocity-side positive-velocity output value as a velocity-side positive-velocity output; a velocity-side negative-velocity input portion that receives the velocity-side negative-velocity output value and outputs the received velocity-side negative-velocity output value as a velocity-side negative-velocity output; a plurality of velocity-side boundary-velocity input portions which are prepared so as to respectively correspond to the plurality of the boundary velocities, to receive the velocity-side boundary-velocity output values, and to output the received velocity-side boundary-velocity output values as a plurality of velocity-side boundary velocity outputs; a velocity-side first weight learning portion that changes a plurality of velocity-side first learning weights in accordance with the velocity deviation, the velocity-side first learning weights respectively corresponding to velocity-side first outputs that include the velocity-side acceleration output, the velocity-side positive-velocity output, the velocity-side negative-velocity output, and the plurality of the velocity-side boundary velocity outputs; and a velocity-side output portion that outputs, as the second tentative command current, a value obtained by summing a plurality of velocity-side first multiplication values that are obtained by multiplying the velocity-side first outputs by the velocity-side first learning weights that respectively correspond to the velocity-side first outputs.

In the second aspect, the velocity-side boundary-velocity firing portion, the velocity-side boundary-velocity input portions, and the velocity-side first learning weights are prepared for the plurality of the velocity ranges. In the velocity-side boundary-velocity firing portion, the plurality of the boundary velocities corresponding to the high-order command velocity fire, and the plurality of the velocity-side boundary velocity outputs are output from the plurality of the velocity-side boundary velocity input portions. In addition, each of the velocity-side boundary velocity outputs is an output that corresponds to the velocity difference between the high-order command velocity and the boundary velocity, each of the velocity-side boundary velocity outputs is multiplied by the corresponding velocity-side first learning weight, and the sum of the obtained values is reflected in the second tentative command current of the velocity feed-forward control portion. Learning is performed such that the velocity-side first learning weights are changed to reduce the velocity deviation. Thus, the velocity-side first learning weight for each of the plurality of the velocity ranges is changed in accordance with the high-order command velocity and the velocity deviation, and the plurality of the velocity-side boundary velocity outputs are output for the one high-order command velocity. In addition, each of the velocity-side boundary velocity outputs is the output that corresponds to the velocity difference between the high-order command velocity and the boundary velocity. Each of the velocity-side boundary velocity outputs is multiplied by the corresponding velocity-side first learning weight, and a value that is obtained by summing the obtained values has velocity continuity as compared to that in the first aspect of the disclosure. Thus, it is possible to provide the motor control device that reduces the velocity deviation at any velocity.

In a third aspect of the disclosure, the motor control device according to the second aspect may further include: a position feed-forward control portion that executes feed-forward control in accordance with the high-order command velocity and outputs a second tentative command velocity; and a velocity addition computation portion that adds the first tentative command velocity to the second tentative command velocity and outputs the low-order command velocity. The position feed-forward control portion may include: a position-side positive/negative-velocity firing portion that receives the high-order command velocity, outputs a position-side positive-velocity output value when the received high-order command velocity is positive, and outputs a position-side negative-velocity output value when the received high-order command velocity is negative; a position-side boundary-velocity firing portion that has the plurality of boundary velocities, receives the high-order command velocity, and outputs position-side boundary-velocity output values from the boundary velocities each of which has a velocity difference from the high-order command velocity that is equal to or smaller than a specified velocity difference among the plurality of the boundary velocities, each of the position-side boundary-velocity output values being based on the velocity difference from the high-order command velocity; a position-side acceleration input portion that receives the high-order command acceleration and outputs the received high-order command acceleration as a position-side acceleration output; a position-side positive-velocity input portion that receives the position-side positive-velocity output value and outputs the received position-side positive-velocity output value as a position-side positive-velocity output; a position-side negative-velocity input portion that receives the position-side negative-velocity output value and outputs the received position-side negative-velocity output value as a position-side negative-velocity output; a plurality of position-side boundary-velocity input portions which are prepared so as to respectively correspond to the plurality of the boundary velocities, to receive the position-side boundary-velocity output values, and to output the received position-side boundary-velocity output values as a plurality of position-side boundary velocity outputs; a position-side first weight learning portion that changes a plurality of position-side first learning weights in accordance with the position deviation, the position-side first learning weights respectively corresponding to position-side first outputs that include the position-side acceleration output, the position-side positive-velocity output, the position-side negative-velocity output, and the plurality of the position-side boundary velocity outputs; and a position-side output portion that outputs, as the second tentative command velocity, a value obtained by summing a plurality of position-side first multiplication values that are obtained by multiplying the position-side first outputs by the position-side first learning weights that respectively correspond to the position-side first outputs.

In the third aspect, the same configuration as that of the velocity feed-forward control portion in the second aspect of the disclosure is applied to the position feed-forward control portion, and the position-side first learning weights of the position feed-forward control portion are learned in accordance with the high-order command velocity and the position deviation. Thus, it is possible to provide the motor control device that reduces the velocity deviation and the position deviation at any velocity.

A fourth aspect of the disclosure relates to a motor control device configured to control a position of a controlled object by using an electric motor that moves the position of the controlled object, and a position detection unit that detects a position related to the electric motor. The motor control device includes: a position deviation computation portion that computes a position deviation that is a deviation between a command position for the electric motor and an actual position based on a detection signal from the position detection unit; a position feedback control portion that executes feedback control in accordance with the position deviation and outputs a first tentative command velocity; a velocity deviation computation portion that computes a velocity deviation that is a deviation between a low-order command velocity for the electric motor including the first tentative command velocity and an actual velocity based on the detection signal from the position detection unit; a velocity feedback control portion that executes feedback control in accordance with the velocity deviation and outputs a first tentative command current; a velocity feed-forward control portion that executes feed-forward control in accordance with a high-order command velocity that is different from the low-order command velocity and outputs a second tentative command current; a current addition computation portion that adds the first tentative command current to the second tentative command current and outputs a command current; and a current output portion that outputs a drive current for the electric motor based on the command current. The velocity feed-forward control portion includes: a velocity-side positive/negative-velocity firing portion that receives the high-order command velocity, outputs a velocity-side positive-velocity output value when the received high-order command velocity is positive, and outputs a velocity-side negative-velocity output value when the received high-order command velocity is negative; a velocity-side boundary-velocity firing portion that has a plurality of boundary velocities, receives the high-order command velocity, and outputs velocity-side boundary-velocity output values from the boundary velocities each of which has a velocity difference from the high-order command velocity that is equal to or smaller than a specified velocity difference among the plurality of the boundary velocities, each of the velocity-side boundary-velocity output values being based on the velocity difference from the high-order command velocity, and the plurality of the boundary velocities being velocities at boundaries of a plurality of preset adjacent velocity ranges that are obtained by dividing a limited velocity range that is limited relative to a velocity range of the high-order command velocity; a velocity-side acceleration input portion that receives high-order command acceleration and outputs the received high-order command acceleration as a velocity-side acceleration output to each of a plurality of velocity-side computation portions that are prepared in advance; a velocity-side positive-velocity input portion that receives the velocity-side positive-velocity output value and outputs the received velocity-side positive-velocity output value as a velocity-side positive-velocity output to each of the plurality of the velocity-side computation portions; a velocity-side negative-velocity input portion that receives the velocity-side negative-velocity output value and outputs the received velocity-side negative-velocity output value as a velocity-side negative-velocity output to each of the plurality of the velocity-side computation portions; a plurality of velocity-side boundary-velocity input portions which are prepared so as to respectively correspond to the plurality of the boundary velocities, to receive the velocity-side boundary-velocity output values, and to output the received velocity-side boundary-velocity output values as a plurality of velocity-side boundary velocity outputs to each of the plurality of the velocity-side computation portions; a velocity-side first weight learning portion that changes a plurality of velocity-side first learning weights in accordance with the velocity deviation, the plurality of the velocity-side first learning weights respectively corresponding to velocity-side first outputs that include the plurality of the velocity-side acceleration outputs, the plurality of the velocity-side positive-velocity outputs, the plurality of the velocity-side negative-velocity outputs, and the plurality of the velocity-side boundary velocity outputs; the plurality of the velocity-side computation portions each of which outputs, as a velocity-side second output, a value obtained by summing a plurality of velocity-side first multiplication values that are obtained by multiplying the velocity-side first outputs by the velocity-side first learning weights that respectively correspond to the velocity-side first outputs; a velocity-side second weight learning portion that changes a plurality of velocity-side second learning weights in accordance with the velocity deviation, the plurality of the velocity-side second learning weights respectively corresponding to the velocity-side second outputs; and a velocity-side output portion that outputs, as the second tentative command current, a value obtained by summing a plurality of velocity-side second multiplication values that are obtained by multiplying the velocity-side second outputs by the velocity-side second learning weights that respectively correspond to the velocity-side second outputs.

The velocity feed-forward control portion in the second aspect is a perceptron that includes the input portions, the velocity-side first weight learning portion, and the velocity-side output portion. The velocity feed-forward control portion in the fourth aspect is a neural network that includes the input portions, the velocity-side first weight learning portion, the velocity-side computation portion, the velocity-side second weight learning portion, and the velocity-side output portion. The outputs from the input portions are respectively multiplied by the weights. More combination patterns for the sum of the obtained values are provided in the neural network than in the perceptron. Thus, it is possible to provide the motor control device that further reduces the velocity deviation at any velocity as compared to the motor control device according to the second aspect.

In a fifth aspect of the disclosure, the motor control device according to the fourth aspect may include: a position feed-forward control portion that executes feed-forward control in accordance with the high-order command velocity and outputs a second tentative command velocity; and a velocity addition computation portion that adds the first tentative command velocity to the second tentative command velocity and outputs the low-order command velocity. The position feed-forward control portion may include: a position-side positive/negative-velocity firing portion that receives the high-order command velocity, outputs a position-side positive-velocity output value when the received high-order command velocity is positive, and outputs a position-side negative-velocity output value when the received high-order command velocity is negative; a position-side boundary-velocity firing portion that has the plurality of the boundary velocities, receives the high-order command velocity, and outputs position-side boundary-velocity output values from the boundary velocities each of which has a velocity difference from the high-order command velocity that is equal to or smaller than a specified velocity difference among the plurality of the boundary velocities, each of the position-side boundary-velocity output values being based on the velocity difference from the high-order command velocity; a position-side acceleration input portion that receives high-order command acceleration and outputs the received high-order command acceleration as a position-side acceleration output to each of a plurality of position-side computation portions that are prepared in advance; a position-side positive-velocity input portion that receives the position-side positive-velocity output value and outputs the received position-side positive-velocity output value as a position-side positive-velocity output to each of the plurality of the position-side computation portions; a position-side negative-velocity input portion that receives the position-side negative-velocity output value and outputs the received position-side negative-velocity output value as a position-side negative-velocity output to each of the plurality of the position-side computation portions; a plurality of position-side boundary-velocity input portions which are prepared so as to respectively correspond to the plurality of the boundary velocities, to receive the position-side boundary-velocity output values, and to output the received position-side boundary-velocity output values as a plurality of position-side boundary velocity outputs to each of the plurality of the position-side computation portions; a position-side first weight learning portion that changes a plurality of position-side first learning weights in accordance with the position deviation, the plurality of the position-side first learning weights respectively corresponding to position-side first outputs that include the plurality of the position-side acceleration outputs, the plurality of the position-side positive-velocity outputs, the plurality of the position-side negative-velocity outputs, and the plurality of the position-side boundary velocity outputs; the plurality of the position-side computation portions each of which outputs, as a position-side second output, a value obtained by summing a plurality of position-side first multiplication values that are obtained by multiplying the position-side first outputs by the position-side first learning weights that respectively correspond to the position-side first outputs; a position-side second weight learning portion that changes a plurality of position-side second learning weights in accordance with the position deviation, the plurality of the position-side second learning weights respectively corresponding to the position-side second outputs; and a position-side output portion that outputs, as the second tentative command velocity, a value obtained by summing a plurality of position-side second multiplication values that are obtained by multiplying the position-side second outputs by the position-side second learning weights that respectively correspond to the position-side second outputs.

The position feed-forward control portion in the third aspect is a perceptron that includes the input portions, the position-side first weight learning portion, and the position-side output portion. The position feed-forward control portion in the fifth aspect is a neural network that includes the input portions, the position-side first weight learning portion, the position-side computation portion, the position-side second weight learning portion, and the position-side output portion. The outputs from the input portions are respectively multiplied by the weights. More combination patterns for the sum of the obtained values are provided in the neural network than in the perceptron. Thus, it is possible to provide the motor control device that further reduces the velocity deviation and the position deviation at any velocity as compared to the motor control device according to the third aspect.

In a sixth aspect, the limited velocity range that has a velocity-physical phenomenon characteristic and that is regarded as having a nonlinear characteristic may be divided into the velocity ranges each of which is regarded as having a linear characteristic, the velocity-physical phenomenon characteristic indicating a relationship between a velocity and a specified physical phenomenon including friction at a time when the controlled object is moved; and the velocities at the boundaries of the velocity ranges may be set as the boundary velocities.

In the sixth aspect, the plurality of the velocity ranges are applied to the velocity range in which the specified physical phenomenon including the friction is nonlinear with respect to the velocity. Thus, it is possible to provide the motor control device that reduces the velocity deviation regardless of presence or absence of the specified physical phenomenon including the friction.

In a seventh aspect, the velocity-side boundary-velocity firing portion may have a specified distribution function that has a preset velocity width as a spreading width, and may use the distribution function to calculate a distribution probability corresponding to a velocity that is distant from a center of the distribution function by the velocity difference between the received high-order command velocity and each of the boundary velocities; the velocity-side boundary-velocity firing portion may fire at only the boundary velocities corresponding to the calculated distribution probabilities that are not zero; and when the high-order command velocity is positive, the velocity-side boundary-velocity firing portion may output positive values based on the calculated distribution probabilities, as the velocity-side boundary-velocity output values corresponding to the boundary velocities that fire, and when the high-order command velocity is negative, the velocity-side boundary-velocity firing portion may output negative values based on the calculated distribution probabilities, as the velocity-side boundary-velocity output values corresponding to the boundary velocities that fire.

In the seventh aspect, the distribution function whose position is changed in accordance with the high-order command velocity and which extends over the plurality of the velocity ranges is used, and each of the velocity-side boundary velocity outputs is calculated from the value of the distribution function at the boundary velocity, and thus more velocity continuity is provided. Accordingly, it is possible to provide the motor control device that further reduces the velocity deviation at any velocity.

In an eighth aspect, the position-side boundary-velocity firing portion may have a specified distribution function that has a preset velocity width as a spreading width, and may use the distribution function to calculate a distribution probability corresponding to a velocity that is distant from a center of the distribution function by the velocity difference between the received high-order command velocity and each of the boundary velocities; the position-side boundary-velocity firing portion may fire at only the boundary velocities corresponding to the calculated distribution probabilities that are not zero; and when the high-order command velocity is positive, the position-side boundary-velocity firing portion may output positive values based on the calculated distribution probabilities, as the position-side boundary-velocity output values corresponding to the boundary velocities that fire, and when the high-order command velocity is negative, the position-side boundary-velocity firing portion may output negative values based on the calculated distribution probabilities, as the position-side boundary-velocity output values corresponding to the boundary velocities that fire.

In the eighth aspect, the distribution function whose position is changed in accordance with the high-order command velocity and which extends over the plurality of the velocity ranges is used, and each of the position-side boundary velocity outputs is calculated from the value of the distribution function at the boundary velocity, and thus, more velocity continuity is provided. Accordingly, it is possible to provide the motor control device that further reduces the velocity deviation and the position deviation at any velocity.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a graph and a diagram that illustrate an example of firing states of a velocity-side positive/negative-velocity firing portion and a velocity-side boundary-velocity firing portion in an example of a case of a high-order command velocity Vv>0 and a boundary velocity V11<the high-order command velocity Vv<a boundary velocity V12;

FIG. 7 is a graph and a diagram that illustrate an example of firing states of the velocity-side positive/negative-velocity firing portion and the velocity-side boundary-velocity firing portion in an example of a case of the high-order command velocity Vv<0 and a boundary velocity −V02<the high-order command velocity Vv<a boundary velocity −V01;

FIG. 19 is a graph and a diagram that illustrate an example of the firing state of the velocity-side boundary-velocity input portion H[m] in an example of a case of the high-order command velocity Vv<0 and a boundary velocity −V03<the high-order command velocity Vv<a boundary velocity −V02 in the fifth embodiment;

FIG. 21 is a graph and a diagram that illustrate an example of the firing state of the velocity-side boundary-velocity input portion H[m] in an example of a case of the high-order command velocity Vv<0 and a boundary velocity −V03<the high-order command velocity Vv<a boundary velocity −V02 in the sixth embodiment;

FIG. 22 is a graph and a diagram that illustrate an example of a firing state of a velocity-side boundary-velocity input portion H[m] in an example of a case of a high-order command velocity Vv>0 and a boundary velocity V12<the high-order command velocity Vv<a boundary velocity V13 in the seventh embodiment; and FIG. 23 is a graph and a diagram that illustrate an example of the firing state of the velocity-side boundary-velocity input portion H[m] in an example of a case of the high-order command velocity Vv<0 and a boundary velocity −V03<the high-order command velocity Vv<a boundary velocity −V02 in the seventh embodiment.

DETAILED DESCRIPTION OF EMBODIMENTS

Figure 1:
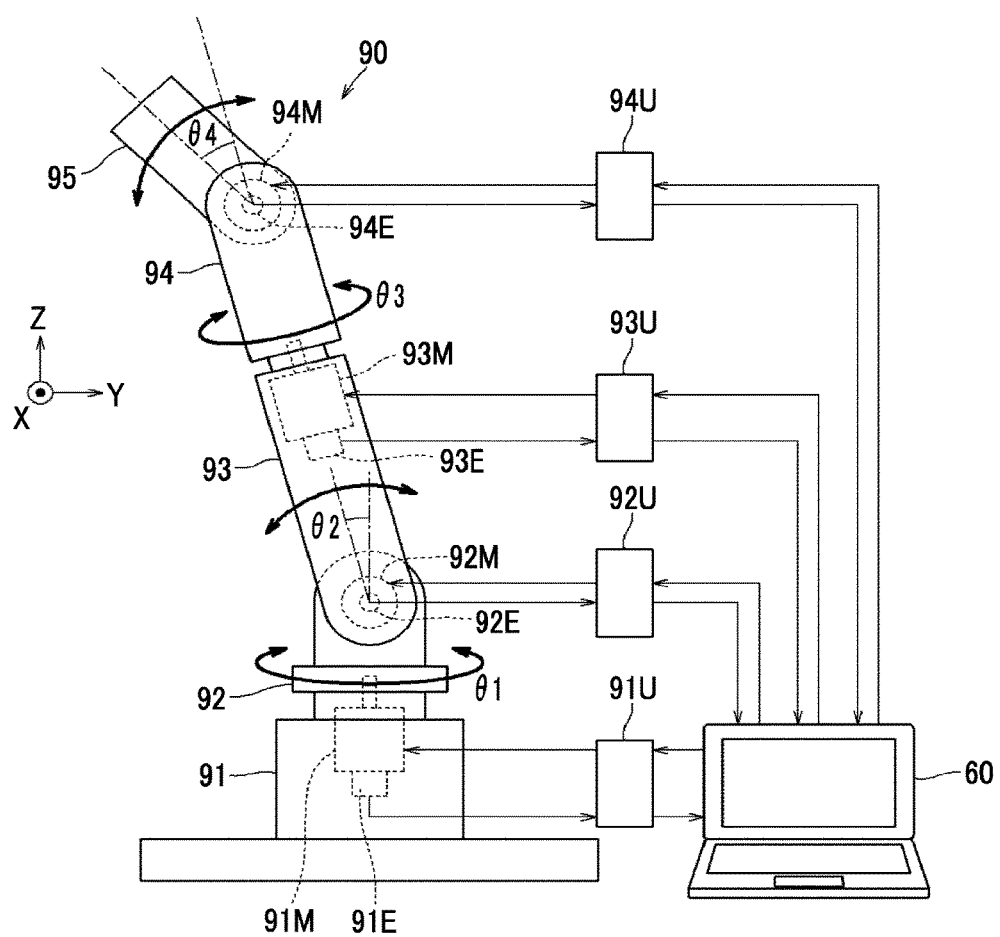
FIG. 1 is a view that illustrates an example of external appearance of a robot to which a motor control device in a first embodiment is applied.

Embodiments of the disclosure will hereinafter be described by using the drawings. Note that, in the drawings in which an x-axis, a y-axis, and a z-axis are shown, the x-axis, the y-axis, and the z-axis are orthogonal to each other.

A first embodiment will be described with reference to FIG. 1 to FIG. 11. A motor control device 92U in the first embodiment will be described as an example of a control device that controls a robot, which is shown in FIG. 1. The robot shown in FIG. 1 includes a base 91, a first turning portion 92, a first oscillating portion 93, a second turning portion 94, a second oscillating portion 95, and the like.

The base 91 is provided with an electric motor 91M that includes an encoder 91E (that is an angle detection unit and can also be used as a position detection unit). The electric motor 91M turns the first turning portion 92 with respect to the base 91 on the basis of a drive current from a motor control device 91U. In addition, the motor control device 91U detects a turning angle θ1 of the first turning portion 92 on the basis of a detection signal from the encoder 91E.

The first turning portion 92 is provided with an electric motor 92M that includes an encoder 92E (that is an angle detection unit and can also be used as a position detection unit). The electric motor 92M causes the first oscillating portion 93 to oscillate with respect to the first turning portion 92 on the basis of a drive current from the motor control device 92U. In addition, the motor control device 92U detects an oscillating angle θ2 of the first oscillating portion 93 on the basis of a detection signal from the encoder 92E.

The first oscillating portion 93 is provided with an electric motor 93M that includes an encoder 93E (that is an angle detection unit and can also be used as a position detection unit). The electric motor 93M turns the second turning portion 94 with respect to the first oscillating portion 93 on the basis of a drive current from a motor control device 93U. In addition, the motor control device 93U detects a turning angle θ3 of the second turning portion 94 on the basis of a detection signal from the encoder 93E.

The second turning portion 94 is provided with an electric motor 94M that includes an encoder 94E (that is an angle detection unit and can also be used as a position detection unit). The electric motor 94M causes the second oscillating portion 95 to oscillate with respect to the second turning portion 94 on the basis of a drive current from a motor control device 94U. In addition, the motor control device 94U detects an oscillating angle θ4 of the second oscillating portion 95 on the basis of a detection signal from the encoder 94E.

A robot control device 60 sends a command position around θ1 to the motor control device 91U, sends a command position around θ2 to the motor control device 92U, sends a command position around θ3 to the motor control device 93U, and sends a command position around θ4 to the motor control device 94U.

Hereinafter, the electric motor 92M will be used as an example, and the motor control device 92U that controls the electric motor 92M will be described by using FIG. 2 to FIG. 11. Note that the same applies to the motor control devices 91U, 93U, 94U that respectively control the electric motors 91M, 93M, 94M and thus the description thereof will not be made.

Figure 2:
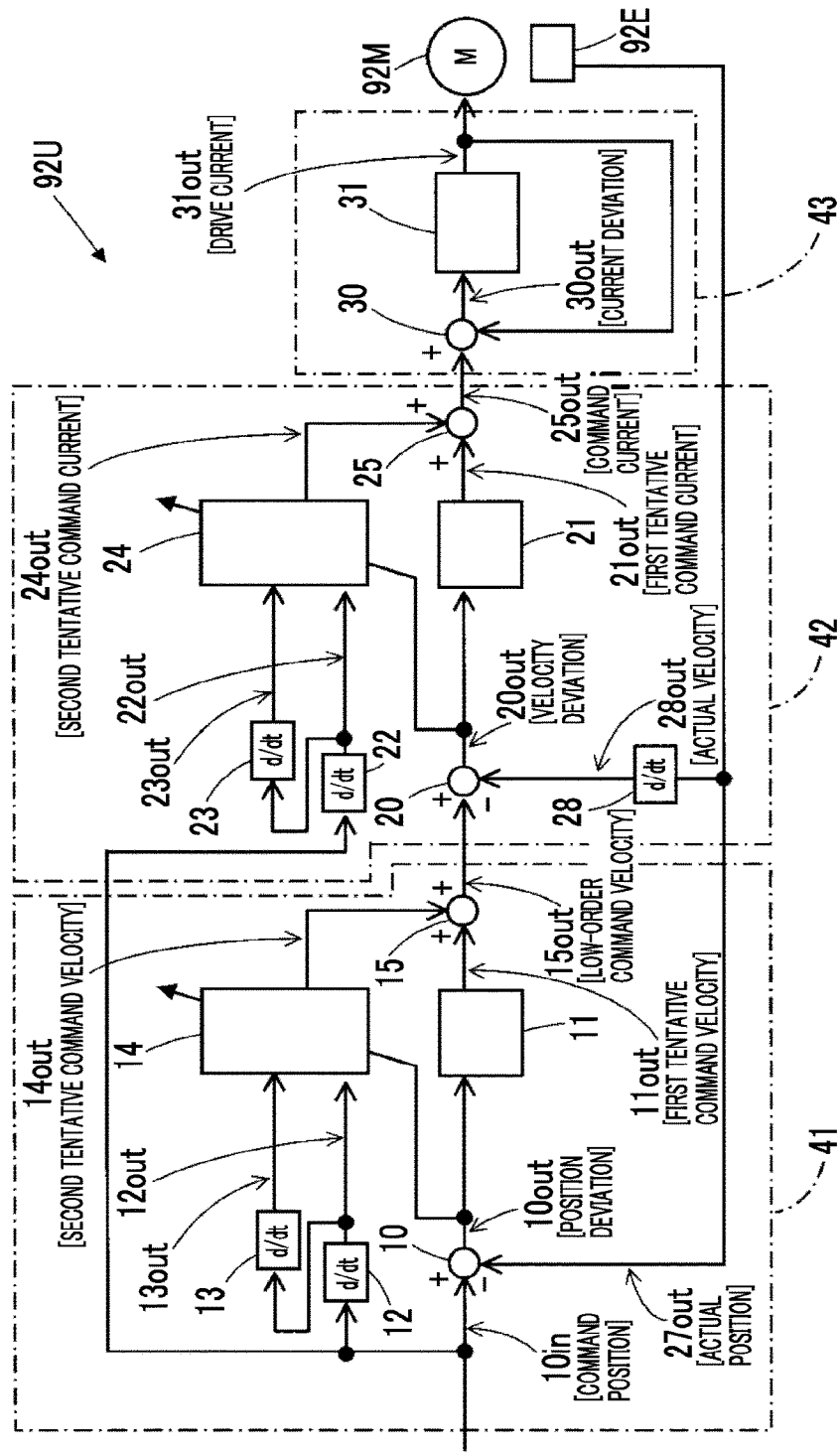
FIG. 2 is a diagram that illustrates an example of an overall configuration of the motor control device in the first and third embodiments.

A configuration of the motor control device 92U that controls the electric motor 92M will be described with reference to FIG. 2. As shown in FIG. 2, the motor control device 92U that controls the electric motor 92M includes: a first control portion 41 that receives a command position 10in and an actual position 27out and outputs a low-order command velocity 15out; a second control portion 42 that receives the low-order command velocity 15out, the command position 10in, and the actual position 27out and outputs a command current 25out; and a current output portion 43 that receives the command current 25out and outputs a drive current 31out for driving the electric motor 92M. Note that the command position in this case is the same as a command angle and a current position (angle) is detected on the basis of the detection signal from the encoder 92E.

A configuration of the first control portion 41 will be described with reference to FIG. 2. The first control portion 41 includes a position deviation computation portion 10, a position feedback control portion 11, a position-side input velocity computation portion 12, a position-side input acceleration computation portion 13, a position feed-forward control portion 14, a velocity addition computation portion 15, and the like.

The position deviation computation portion 10 receives: the command position 10in (in this case, a command (rotation) angle) for the electric motor 92M; and the actual position 27out (an actual position based on the detection signal from the encoder 92E) that is an actual position related to the electric motor 92M (in this case, a rotation angle of an output shaft of the electric motor 92M), and computes and outputs a position deviation 10out that is a deviation between the command position 10in and the actual position 27out. Note that the actual position 27out can be calculated from the detection signal from the encoder 92E. Note that, when a velocity reduction mechanism with a reduction ratio "a" exists between the electric motor 92M and the first oscillating portion 93, a value that is obtained by multiplying the command position of the first oscillating portion 93 as a controlled object by "a" becomes the command position 10in of the electric motor 92M.

The position feedback control portion 11 receives the position deviation 10out, executes feedback control in accordance with the received position deviation 10out, and outputs a first tentative command velocity 11out. The position feedback control portion 11 has at least one of a proportional term (P), an integral term (I), and a differential term (D) of so-called PID control, and outputs the first tentative command velocity 11out. Note that the PID control is similar to existing control and thus a detailed description thereof will not be made.

The position-side input velocity computation portion 12 receives the command position 10in (as an input position (in this case, the rotation angle)) and outputs an input velocity 12out (may be regarded as a position-side velocity) that is a velocity (in this case, a rotation angular velocity) based on a temporal change of the command position 10in.

The position-side input acceleration computation portion 13 receives the input velocity 12out and outputs input acceleration 13out (may be regarded as position-side acceleration) that is acceleration (in this case, rotation angular acceleration) based on a temporal change of the input velocity 12out.

The position feed-forward control portion 14 receives the input velocity 12out (the position-side velocity), the input acceleration 13out (the position-side acceleration), and the position deviation 10out, executes feed-forward control in accordance with the inputs (i.e., the input velocity 12out, the input acceleration 13out, and the position deviation 10out), and outputs a second tentative command velocity 14out. The position feed-forward control portion 14 is constructed of a network with a weight learning function, and a detail thereof will be described below.

The velocity addition computation portion 15 receives the first tentative command velocity flout and the second tentative command velocity 14out and outputs the low-order command velocity 15out (in this case, a command rotation angular velocity) that is obtained by adding the first tentative command velocity 11out to the second tentative command velocity 14out.

A configuration of the second control portion 42 will be described with reference to FIG. 2. The second control portion 42 includes a velocity deviation computation portion 20, a velocity feedback control portion 21, a velocity-side input velocity computation portion 22, a velocity-side input acceleration computation portion 23, a velocity feed-forward control portion 24, a current addition computation portion 25, an actual velocity computation portion 28, and the like.

The velocity deviation computation portion 20 receives the low-order command velocity 15out and an actual velocity 28out (an actual velocity based on the detection signal from the encoder 92E) that is an actual velocity (in this case, the rotation angular velocity) of the output shaft of the electric motor 92M and computes and outputs a velocity deviation 20out that is a deviation between the low-order command velocity 15out and the actual velocity 28out. Note that the actual velocity computation portion 28 calculates the actual velocity 28out from a temporal change of the actual position 27out (in this case, an actual rotation angle) based on the detection signal from the encoder 92E. The actual velocity computation portion 28 receives the actual position 27out and outputs the actual velocity 28out.

The velocity feedback control portion 21 receives the velocity deviation 20out, executes feedback control in accordance with the received velocity deviation 20out, and outputs a first tentative command current 21out. The velocity feedback control portion 21 has at least one of the proportional term (P), the integral term (I), and the differential term (D) of the so-called PID control and outputs the first tentative command current 21out. Note that the PID control is similar to the existing control and thus the detailed description thereof will not be made.

The velocity-side input velocity computation portion 22 receives the command position 10in (as the input position (in this case, the rotation angle)) and outputs an input velocity 22out (may be regarded as a velocity-side velocity) that is a velocity (in this case, the rotation angular velocity) based on the temporal change of the command position 10in.

The velocity-side input acceleration computation portion 23 receives the input velocity 22out and outputs input acceleration 23out (may be regarded as velocity-side acceleration) that is acceleration (in this case, the rotation angular acceleration) based on a temporal change of the input velocity 22out.

The velocity feed-forward control portion 24 receives the input velocity 22out (the velocity-side velocity), the input acceleration 23out (the velocity-side acceleration), and the velocity deviation 20out, executes feed-forward control in accordance with the inputs (i.e., the input velocity 22out, the input acceleration 23out, and the velocity deviation 20out), and outputs a second tentative command current 24out. The velocity feed-forward control portion 24 is constructed of a network with a weight learning function, and a detail thereof will be described below.

The current addition computation portion 25 receives the first tentative command current 21out and the second tentative command current 24out and outputs the command current 25out that is obtained by adding the first tentative command current 21out to the second tentative command current 24out.

A configuration of the current output portion 43 will be described with reference to FIG. 2. The current output portion 43 includes a current deviation computation portion 30, a current feedback control portion 31, and the like.

The current deviation computation portion 30 receives the command current 25out and the drive current 31out (an actual current) that is an actually output current, and computes and outputs a current deviation 30out that is a deviation between the command current 25out and the drive current 31out (the actual current).

The current feedback control portion 31 receives the current deviation 30out, executes feedback control in accordance with the received current deviation 30out, and outputs the drive current 31out for driving the electric motor 91M. The current feedback control portion 31 has at least one of the proportional term (P), the integral term (I), and the differential term (D) of the so-called PID control and outputs the drive current 31out. Note that the PID control is similar to the existing control and thus the detailed description thereof will not be made.

A configuration of the network with the weight learning function in the velocity feed-forward control portion 24 will be described with reference to FIG. 3. Since influence of the velocity feed-forward control portion 24 on a reduction in the position deviation is greater than that of the position feed-forward control portion 14, the velocity feed-forward control portion 24 will be described first. The velocity feed-forward control portion 24 includes an input processing portion 241 and a simple perceptron 242. The input processing portion 241 includes a velocity-side positive/negative-velocity firing portion 24E and a velocity-side boundary-velocity firing portion 24F. The simple perceptron 242 includes an input layer 24A, a velocity-side first weight learning portion 24G, and an output layer 24C.

Figure 3:
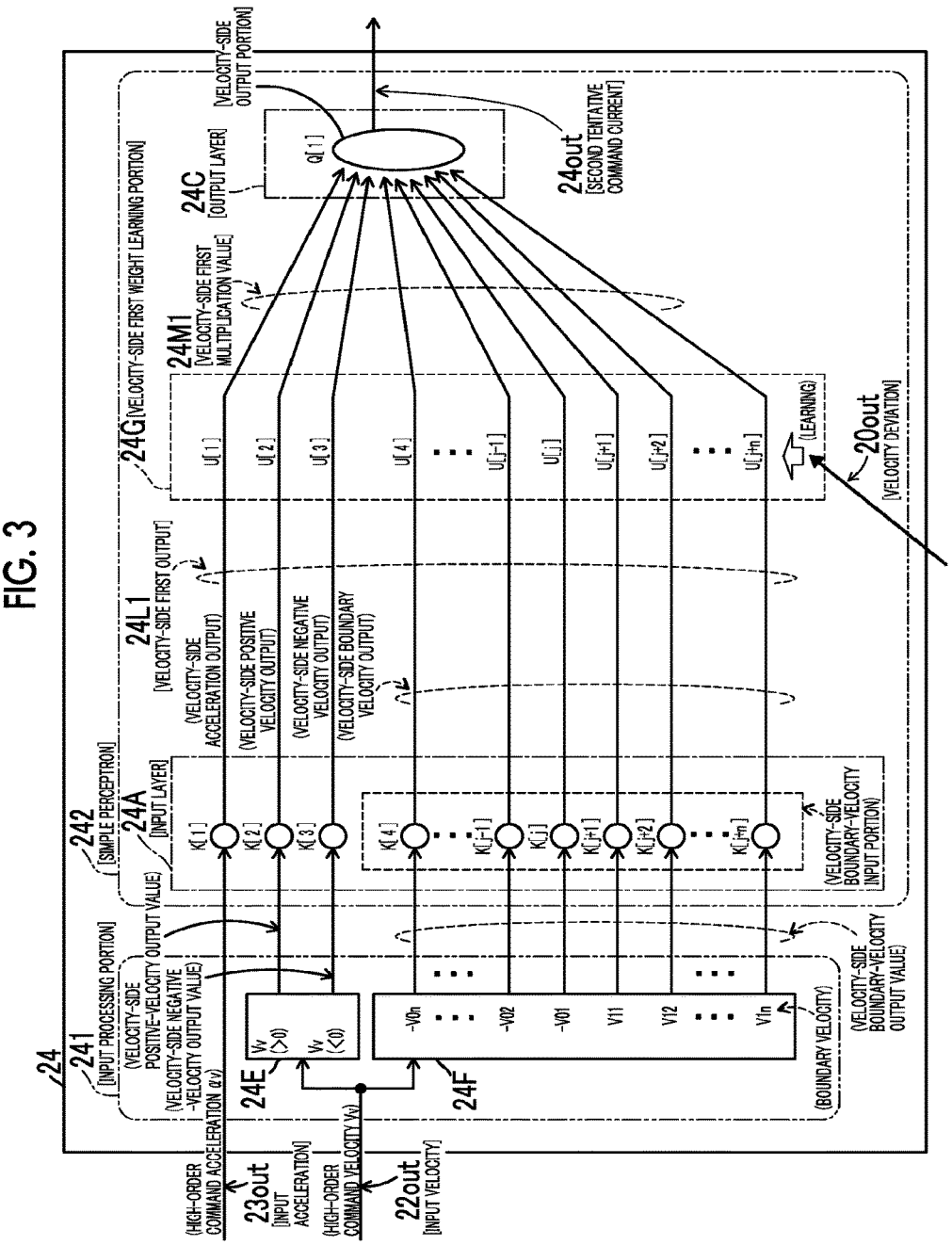
FIG. 3 is a conceptual diagram that illustrates an internal configuration of a velocity feed-forward control portion in FIG. 2 in the first embodiment.

Note that, as shown in FIG. 2, the velocity (the input velocity 22out) that is input to the velocity feed-forward control portion 24 shown in FIG. 3 is calculated by differentiating the command position 10in from the robot control device 60. However, the velocity may not be calculated from the differentiation of the command position 10in and may be calculated by differentiating information related to the various positions. Alternatively, a command velocity from the robot control device 60 may be used as the velocity input to the velocity feed-forward control portion 24. For this reason, the velocity that is input to the velocity feed-forward control portion 24 shown in FIG. 3 will hereinafter be described as a high-order command velocity Vv (that is different from the low-order command velocity 15out) instead of the input velocity 22out. Similarly, as shown in FIG. 2, the acceleration (the input acceleration 23out) that is input to the velocity feed-forward control portion 24 shown in FIG. 3 is calculated by differentiating the command position 10in from the robot control device 60 twice. However, the acceleration may not be calculated by differentiating the command position 10in twice, and may be calculated by differentiating the information related to the various positions twice. Alternatively, the acceleration may be calculated by differentiating the command velocity from the robot control device 60. For this reason, the acceleration that is input to the velocity feed-forward control portion 24 shown in FIG. 3 will hereinafter be described as high-order command acceleration αv, instead of the input acceleration 23out.

The input processing portion 241 will be described with reference to FIG. 3 to FIG. 8. The velocity-side positive/negative-velocity firing portion 24E receives the high-order command velocity Vv. When the received high-order command velocity Vv is positive (>0), a "Vv (>0)" side of the velocity-side positive/negative-velocity firing portion 24E fires, and a "Vv (<0)" side thereof does not fire. The velocity-side positive/negative-velocity firing portion 24E outputs a velocity-side positive-velocity output value (the value is a value of the high-order command velocity Vv) to a velocity-side positive-velocity input portion K[2]. In addition, when the received high-order command velocity Vv is negative (<0), the "Vv (<0)" side of the velocity-side positive/negative-velocity firing portion 24E fires, and the "Vv (>0)" side thereof does not fire. The velocity-side positive/negative-velocity firing portion 24E outputs a velocity-side negative-velocity output value (the value is the value of the high-order command velocity Vv) to a velocity-side negative-velocity input portion K[3].

The velocity-side boundary-velocity firing portion 24F receives the high-order command velocity Vv. The velocity-side boundary-velocity firing portion 24F has a plurality of boundary velocities (−V0n to V1n) that are velocities at the boundaries of a plurality of preset adjacent velocity ranges obtained by dividing a limited velocity range limited relative to the range of the high-order command velocity Vv (see FIG. 4). The velocity-side boundary-velocity firing portion 24F outputs velocity-side boundary-velocity output values from the boundary velocities each of which has a velocity difference from the received high-order command velocity Vv that is equal to or smaller than a specified velocity difference, each of the velocity-side boundary-velocity output values being based on the velocity difference. Note that the limited velocity range, the velocity range, the boundary velocity, and the velocity-side boundary-velocity output value will be described by using FIG. 4 to FIG. 8.

The limited velocity range, the velocity range, and the boundary velocities (−V0n to V1n) will be described by using FIG. 4. When the first oscillating portion 93 (see FIG. 1) is caused to oscillate by using the electric motor 92M, the position deviation is caused due to friction of each portion (friction inside the electric motor 92M, friction between the first oscillating portion 93 and the first turning portion 92, and the like). A friction force is expressed as synthetic friction in which mainly static friction and viscous friction are combined, and the friction force is changed in accordance with the velocity.

Figure 4:
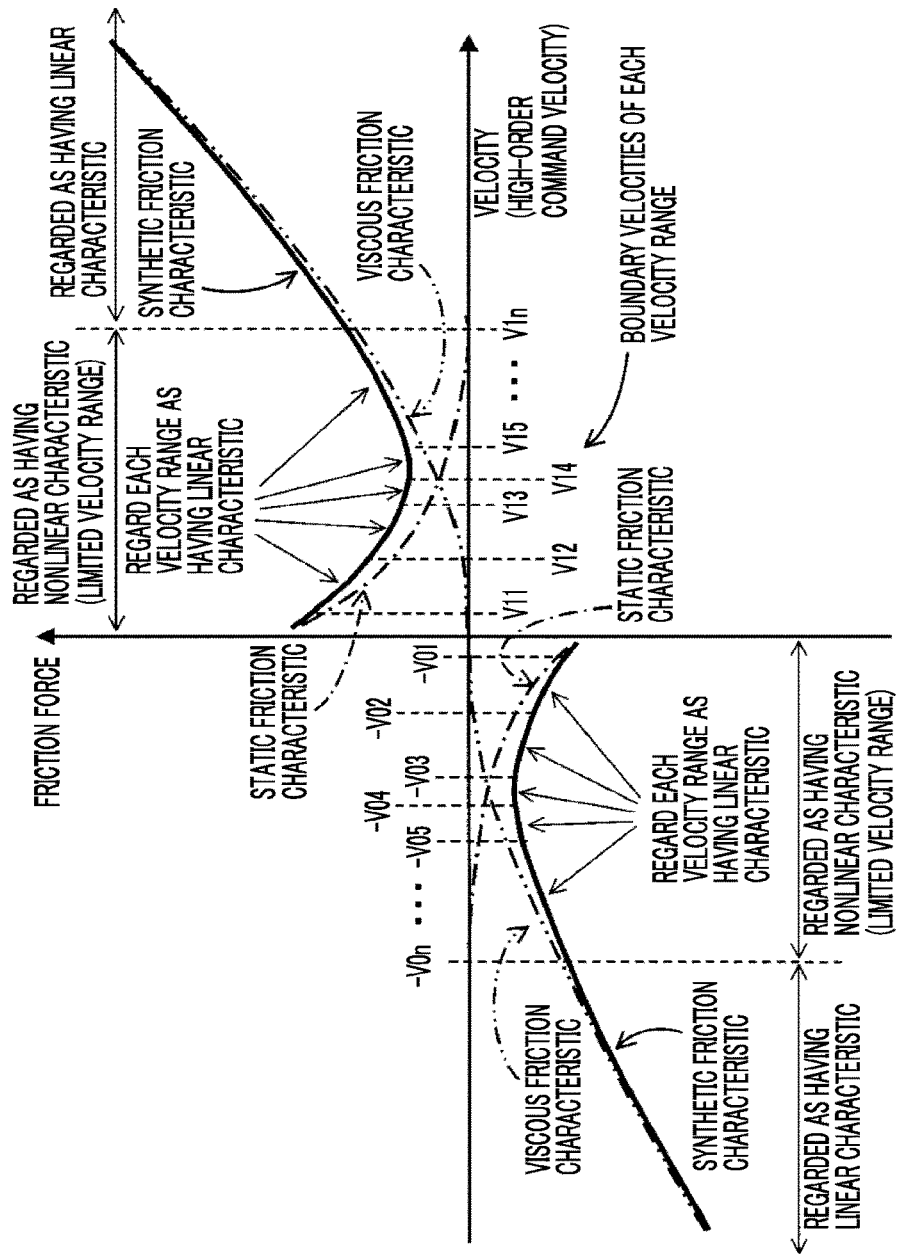
FIG. 4 is a graph that illustrates an example of a (synthetic) friction characteristic that includes a static friction characteristic and a viscous friction characteristic (a nonlinear characteristic as a whole) as well as a method of setting a boundary velocity.

FIG. 4 shows a velocity-physical phenomenon characteristic that indicates a relationship between a magnitude of the high-order command velocity Vv for the electric motor 92M and a specified physical phenomenon (in this case, friction) at a time when the controlled object is moved. In FIG. 4, a horizontal axis indicates the velocity (the high-order command velocity Vv), and a vertical axis indicates the friction force. In addition, in FIG. 4, a characteristic indicated by a one-dot chain line is a static friction characteristic, a characteristic indicated by a two-dot chain line is a viscous friction characteristic, and a characteristic indicated by a solid bold line is a synthetic friction characteristic in which the static friction characteristic and the viscous friction characteristic are combined.

In a region where the velocity is positive, the static friction characteristic shows that the static friction is gradually reduced as the velocity is increased from a position near zero. The viscous friction characteristic shows that the viscous friction is gradually increased as the velocity is increased from the position near zero. In the region where the velocity is positive, the synthetic friction characteristic is regarded as a nonlinear characteristic in a region where the velocity is equal to or smaller than V1n (and the velocity >0) with the velocity=V1n (may be regarded as a specified positive velocity) serving as a boundary. In a region where the velocity is larger than V1n, the synthetic friction characteristic can be regarded as a linear characteristic. Thus, in the region where the velocity is positive, the synthetic friction characteristic as a whole is regarded as the nonlinear characteristic.

In a region where the velocity is negative, the static friction characteristic shows that the static friction is gradually increased as the velocity is reduced from a position near zero. The viscous friction characteristic shows that the viscous friction is gradually reduced as the velocity is reduced from the position near zero. In the region where the velocity is negative, the synthetic friction characteristic is regarded as the nonlinear characteristic in a region where the velocity is equal to or larger than −V0n (and the velocity <0) with the velocity=−V0n (may be regarded as a specified negative velocity) serving as a boundary. In a region where the velocity is smaller than −V0n, the synthetic friction characteristic can be regarded as the linear characteristic. Thus, in the region where the velocity is negative, the synthetic friction characteristic as a whole is regarded as the nonlinear characteristic. Note that FIG. 4 shows an example in which a slope of the synthetic friction characteristic in the region where the velocity is smaller than −V0n is slightly gentler than a slope of the synthetic friction characteristic in a region where the velocity is larger than V1n. In addition, FIG. 4 shows an example in which a curvature of the synthetic friction characteristic in a region where the velocity ranges from −V05 to −V01 is smaller (a curve is gentler) than a curvature of the synthetic friction characteristic in a region where the velocity ranges from V11 to V15. Thus, as shown in the example of FIG. 4, a velocity-friction force characteristic (the synthetic friction characteristic) in the region where the velocity is positive (>0) and that in the region where the velocity is negative (<0) are not symmetrical about a point. Note that, depending on a situation, there is a case where the velocity-friction force characteristic (the synthetic friction characteristic) in the region where the velocity is positive and that in the region where the velocity is negative becomes symmetrical about the point. In this case, all of the velocities may be treated as positive without considering whether the velocity is positive or negative.

Because the synthetic friction characteristic as a whole is the nonlinear characteristic, it is difficult to model the synthetic friction. Thus, in velocity feed-forward control in which the conventional neural network is used, the position deviation cannot be appropriately reduced. Thus, in the disclosure, the synthetic friction characteristic that is the nonlinear characteristic is divided into the velocity ranges, in each of which the synthetic friction characteristic can be regarded as the linear characteristic. In this way, the synthetic friction characteristic in each of the velocity ranges is regarded as the linear characteristic, and thus, the position deviation can be appropriately reduced. More specifically, the synthetic friction characteristic that is the nonlinear characteristic is divided into the velocity ranges in each of which the synthetic friction characteristic can be regarded as the linear characteristic. Then, weight learning, which will be described below, is performed for each of the divided velocity ranges (for each of the linear characteristics). Thus, the position deviation can be appropriately reduced at any velocity.

In the region where the velocity is positive (>0), the synthetic friction characteristic shown in FIG. 4 is regarded as the nonlinear characteristic in a region where the velocity is equal to or smaller than V1 n and the velocity >0. The region where the velocity is equal to or smaller than V1n and the velocity >0 is set as the limited velocity range. The limited velocity range is divided into the velocity ranges in each of which the synthetic friction characteristic can be regarded as the linear characteristic. For example, in the example in FIG. 4, the limited velocity range is divided into a range from the velocity (V11) to a velocity (V12), a range from the velocity (V12) to a velocity (V13), a range from the velocity (V13) to a velocity (V14), and the like. In each of the velocity ranges, the synthetic friction characteristic is linear and thus can be regarded as the linear characteristic. Velocities at boundaries of the velocity ranges are set as the boundary velocities V11 to V1n. The positive-side boundary velocity V1n at the boundary between the velocity range where the synthetic friction characteristic can be regarded as the linear characteristic and the velocity range where the synthetic friction characteristic is regarded as the nonlinear characteristic is set as the specified positive velocity V1n. Accordingly, in the region where the velocity is positive, the positive-side boundary velocities (V11 to V1n) are set in the limited velocity range where the synthetic friction characteristic is regarded as the nonlinear characteristic and the velocity is equal to or smaller than the specified positive velocity. For example, in a portion where the curvature of the synthetic friction characteristic is relatively large, the velocity range is narrowed (for example, the velocity range between the boundary velocity V13 and the boundary velocity V14). In a portion where the curvature of the synthetic friction characteristic is relatively small, the velocity range is widened (for example, the velocity range between the boundary velocity V11 and the boundary velocity V12). That is, intervals between the boundary velocities are unequal intervals. In this way, in each of the velocity ranges, the synthetic friction characteristic becomes linear. Thus, the synthetic friction characteristic can be regarded as the linear characteristic in each of the velocity ranges (the same applies to the following case where the velocity is negative). Note that a value of the synthetic friction characteristic cannot be identified when the velocity=0 (zero). Thus, the boundary velocity V11 (>0) is set at a value that is not 0 (zero) and is close to 0 (zero).

Similarly, in the region where the velocity is negative (<0), the synthetic friction characteristic is regarded as the nonlinear characteristic in a region where the velocity is equal to or larger than −V0n and the velocity <0. The region where the velocity is equal to or larger than −V0n and the velocity <0 is set as the limited velocity range and is divided into the velocity ranges in each of which the synthetic friction characteristic can be regarded as the linear characteristic. For example, in the example in FIG. 4, the limited velocity range is divided into a range from the velocity (−V05) to a velocity (−V04), a range from the velocity (−V04) to a velocity (−V03), a range from the velocity (−V03) to a velocity (−V02), and the like. In each of the velocity ranges, the synthetic friction characteristic is linear and thus can be regarded as the linear characteristic. Velocities at boundaries of the velocity ranges are set as the boundary velocities −V01 to −V0n. The negative-side boundary velocity −V0n at the boundary between the velocity region where the synthetic friction characteristic can be regarded as the linear characteristic and the velocity region where the synthetic friction characteristic is regarded as the nonlinear characteristic is set as the specified negative velocity −V0n. Accordingly, in the region where the velocity is negative, the negative-side boundary velocities (−V01 to −V0n) are set in the limited velocity range where the synthetic friction characteristic is regarded as the nonlinear characteristic and the velocity is equal to or larger than the specified negative velocity. Note that the value of the synthetic friction characteristic cannot be identified when the velocity=0 (zero). Thus, the boundary velocity −V01 (<0) is set at the value that is not 0 (zero) and is close to 0 (zero). Next, operations of the velocity-side positive/negative-velocity firing portion 24E and the velocity-side boundary-velocity firing portion 24F will be described by using FIG. 5 to FIG. 8.

The operations of the velocity-side positive/negative-velocity firing portion 24E and the velocity-side boundary-velocity firing portion 24F will be described with reference to FIG. 5 to FIG. 8. FIG. 5 shows an example of a case of the high-order command velocity Vv>0 and V11<the high-order command velocity Vv<V12. As shown in the example in an upper portion of FIG. 5, coordinates, in which a horizontal axis indicates the velocity (the high-order command velocity, the boundary velocity) and a vertical axis indicates the velocity-side boundary-velocity output value, are prepared. A specified distribution function N (for example, a normal distribution function) that has a spreading width Nw as a width in a velocity direction is preset. Then, the distribution function N is arranged such that a value of an apex Nc of the distribution function N in a horizontal-axis direction is the high-order command velocity Vv. Note that a value of the apex Nc of the distribution function N in a vertical-axis direction is 1.0. In the example in the upper portion of FIG. 5, the value of the distribution function N at the boundary velocity V11 is 0.8, and the value of the distribution function N at the boundary velocity V12 is 0.6. Note that the values of the distribution function N at the boundary velocities other than the boundary velocities V11 and V12 are all 0 (zero) because the boundary velocities other than the boundary velocities V11 and V12 fall out of the range of the distribution function N. In the graph of the upper portion of FIG. 5, the boundary velocity −V01 seems to fall within the range of the distribution function N. However, the example of FIG. 5 shows the case of the high-order command velocity Vv>0. Thus, the boundary velocities −V01 to −V0n for the case of the high-order command velocity Vv<0 are regarded as falling out of the range of the distribution function for the case of the high-order command velocity Vv>0, and the values of the distribution function N at the boundary velocities −V01 to −V0n are all regarded as 0 (zero).

The example of FIG. 5 shows the case of the high-order command velocity Vv>0. Thus, in the velocity-side positive/negative-velocity firing portion 24E, Vv (>0) that corresponds to the velocity-side positive-velocity input portion K[2] fires, and outputs the high-order command velocity Vv. Accordingly, the velocity-side positive-velocity input portion K[2] receives the high-order command velocity Vv as a velocity-side positive velocity input value. Then, the velocity-side positive-velocity input portion K[2] outputs the received velocity-side positive velocity input value as a velocity-side positive velocity output. Note that, in the example of FIG. 5, in the velocity-side positive/negative-velocity firing portion 24E, Vv (<0) that corresponds to the velocity-side negative-velocity input portion K[3] does not fire. Thus, the velocity-side negative-velocity input portion K[3] does not receive anything, and the velocity-side negative-velocity input portion K[3] does not output anything.

In addition, in the example of FIG. 5, in the velocity-side boundary-velocity firing portion 24F, the boundary velocities V11 and V12 that respectively correspond to velocity-side boundary-velocity input portions K[j+1] and K[j+2] fire. That is, in the graph of the upper portion of FIG. 5, at the boundary velocities each of which has a velocity difference from the high-order command velocity that is equal to or smaller than a specified velocity difference (that is equal to or smaller than the spreading width Nw/2), the velocity-side boundary-velocity output values are output. Each of the velocity-side boundary-velocity output values is based on the velocity difference between the boundary velocity and the high-order command velocity Vv, and the distribution function N. In the example of FIG. 5, in the velocity-side boundary-velocity firing portion 24F, the firing boundary velocity V11 outputs 0.8, and the firing boundary velocity V12 outputs 0.6. Accordingly, the velocity-side boundary-velocity input portion K[j+1] receives 0.8. Then, the velocity-side boundary-velocity input portion K[j+1] outputs the received velocity-side boundary-velocity output value (0.8 in this case) as a velocity-side boundary velocity output. In addition, the velocity-side boundary-velocity input portion K[j+2] receives 0.6. Then, the velocity-side boundary-velocity input portion K[j+2] outputs the received velocity-side boundary-velocity output value (0.6 in this case) as a velocity-side boundary velocity output. Note that, in the example of FIG. 5, the boundary velocities −V0n, −V01, V13, V14, V15, and V1n in the velocity-side boundary-velocity firing portion 24F do not fire. Thus, velocity-side boundary-velocity input portions K[4], K[j], K[j+3], K[j+4], K[j+5], and K[j+n] do not receive anything, and the velocity-side boundary-velocity input portions K[4], K[j], K[j+3], K[j+4], K[j+5], and K[j+n] do not output anything. Note that, because the boundary velocities are arranged at unequal intervals, instead of equal intervals, as shown in FIG. 5 and FIG. 6, the number of the firing boundary velocities is changed in accordance with the value of the high-order command velocity Vv.

Figure 6:
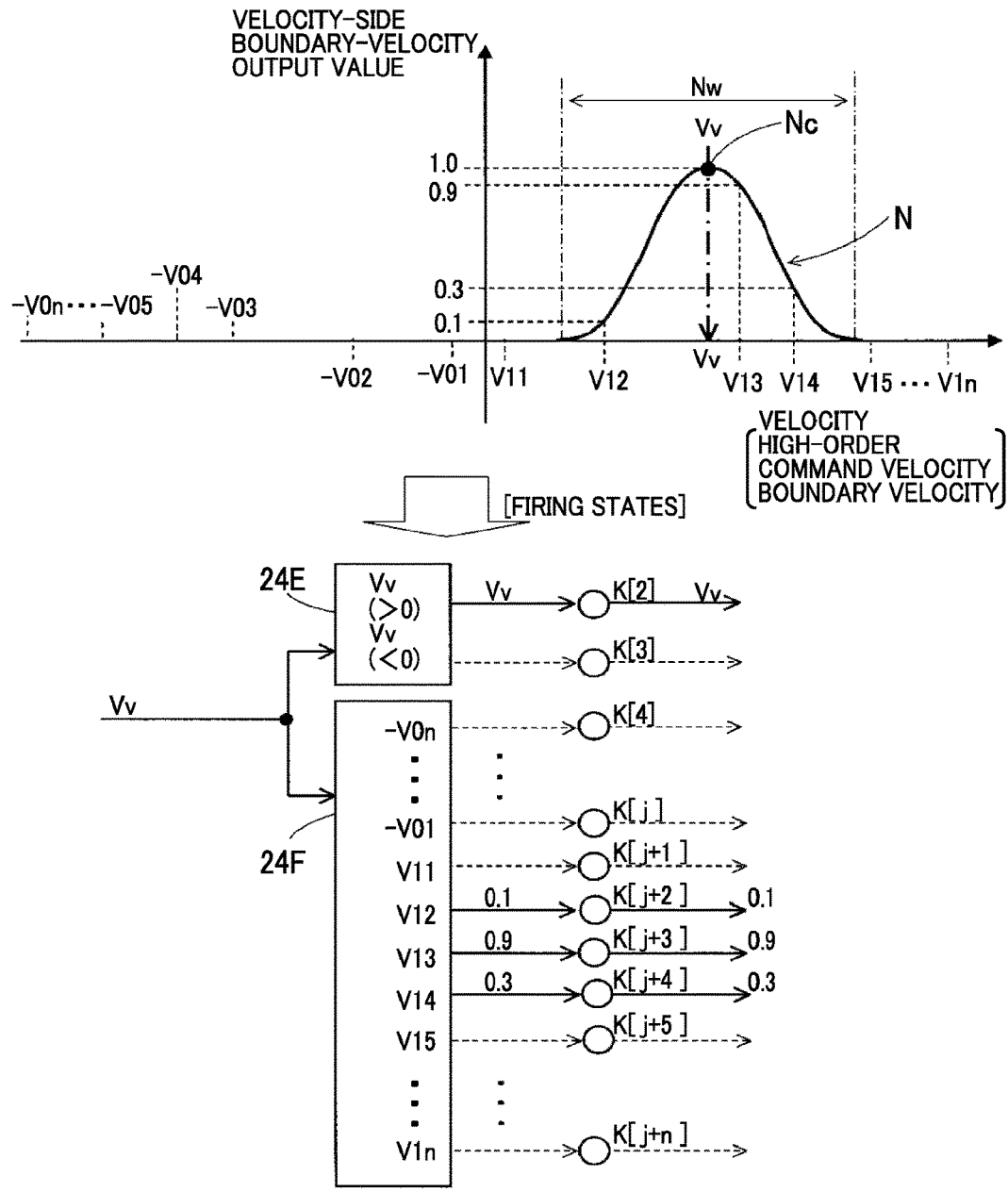
FIG. 6 is a graph and a diagram that illustrate an example of firing states of the velocity-side positive/negative-velocity firing portion and the velocity-side boundary-velocity firing portion in an example of a case of the high-order command velocity Vv>0 and the boundary velocity V12<the high-order command velocity Vv<a boundary velocity V13.

FIG. 6 shows an example of a case of the high-order command velocity Vv>0 and V12<the high-order command velocity Vv<V13. As shown in the example in an upper portion of FIG. 6 (similar to FIG. 5), coordinates, in which a horizontal axis indicates the velocity (the high-order command velocity, the boundary velocity) and a vertical axis indicates the velocity-side boundary-velocity output value, are prepared. The specified distribution function N (for example, the normal distribution function) that has the spreading width Nw as the width in the velocity direction is preset. Then, the distribution function N is arranged such that the value of the apex Nc of the distribution function N in the horizontal-axis direction is the high-order command velocity Vv. Note that the value of the apex Nc of the distribution function N in the vertical-axis direction is 1.0. In the example in the upper portion of FIG. 6, the value of the distribution function N at the boundary velocity V12 is 0.1, the value of the distribution function N at the boundary velocity V13 is 0.9, and the value of the distribution function N at the boundary velocity V14 is 0.3. Note that the values of the distribution function N at the boundary velocities other than the boundary velocities V12, V13, and V14 are all 0 (zero) because the boundary velocities other than the boundary velocities V12, V13, and V14 fall out of the range of the distribution function N. The example of FIG. 6 shows the case of the high-order command velocity Vv>0. Therefore, the values of the distribution function N at the boundary velocities −V01 to V0n for the case of the high-order command velocity Vv<0 are all 0 (zero). As shown in FIG. 5 and FIG. 6, when the velocity difference between the high-order command velocity Vv and the boundary velocity is large, the value of the distribution function N at the boundary velocity is small. When the velocity difference between the high-order command velocity Vv and the boundary velocity is small, the value of the distribution function N at the boundary velocity is large. When the values of the distribution function N at the adjacent boundary velocities are the same, the high-order command velocity Vv is at a center between the adjacent boundary velocities.

The example of FIG. 6 shows the case of the high-order command velocity Vv>0. Thus, in the velocity-side positive/negative-velocity firing portion 24E, Vv (>0) that corresponds to the velocity-side positive-velocity input portion K[2] fires, and outputs the high-order command velocity Vv. Accordingly, the velocity-side positive-velocity input portion K[2] receives the high-order command velocity Vv as the velocity-side positive velocity input value. Then, the velocity-side positive-velocity input portion K[2] outputs the received velocity-side positive velocity input value as the velocity-side positive velocity output. Note that, in the example of FIG. 6, in the velocity-side positive/negative-velocity firing portion 24E, Vv (<0) that corresponds to the velocity-side negative-velocity input portion K[3] does not fire. Thus, the velocity-side negative-velocity input portion K[3] does not receive anything, and the velocity-side negative-velocity input portion K[3] does not output anything.

In addition, in the example of FIG. 6, in the velocity-side boundary-velocity firing portion 24F, the boundary velocities V12, V13, and V14 that respectively correspond to the velocity-side boundary-velocity input portions K[j+2], K[j+3] and K[j+4] fire. That is, in the graph of the upper portion of FIG. 6, at the boundary velocities each of which has the velocity difference from the high-order command velocity that is equal to or smaller than the specified velocity difference (that is equal to or smaller than the spreading width Nw/2), the velocity-side boundary-velocity output values are output. Each of the velocity-side boundary-velocity output values is based on the velocity difference between the boundary velocity and the high-order command velocity Vv, that is, based on the distribution function N. In the example of FIG. 6, in the velocity-side boundary-velocity firing portion 24F, the firing boundary velocity V12 outputs 0.1, the firing boundary velocity V13 outputs 0.9, and the firing boundary velocity V14 outputs 0.3. Accordingly, the velocity-side boundary-velocity input portion K[j+2] receives 0.1. Then, the velocity-side boundary-velocity input portion K[j+2] outputs the received velocity-side boundary-velocity output value (0.1 in this case) as the velocity-side boundary velocity output. In addition, the velocity-side boundary-velocity input portion K[j+3] receives 0.9. Then, the velocity-side boundary-velocity input portion K[j+3] outputs the received velocity-side boundary-velocity output value (0.9 in this case) as the velocity-side boundary velocity output. Furthermore, the velocity-side boundary-velocity input portion K[j+4] receives 0.3. Then, the velocity-side boundary-velocity input portion K[j+4] outputs the received velocity-side boundary-velocity output value (0.3 in this case) as the velocity-side boundary velocity output. Note that, in the example of FIG. 6, in the velocity-side boundary-velocity firing portion 24F, the boundary velocities −V0n, −V01, V11, V15, and \Tin do not fire. Thus, the velocity-side boundary-velocity input portions K[4], K[j], K[j+1], K[j+5], and K[j+n] do not receive anything, and the velocity-side boundary-velocity input portions K[4], K[j], K[j+1], K[j+5], and K[j+n] do not output anything.

FIG. 7 shows an example of a case of the high-order command velocity Vv<0 and −V02<the high-order command velocity Vv<−V01. As shown in the example in an upper portion of FIG. 7 similar to the upper portion of FIG. 5, coordinates, in which a horizontal axis indicates the velocity (the high-order command velocity) and a vertical axis indicates the velocity-side boundary-velocity output value, are prepared. The specified distribution function N (for example, the normal distribution function) that has the spreading width Nw as the width in the velocity direction is preset. Because the high-order command velocity Vv is smaller than 0 (the high-order command velocity Vv<0), the distribution function N is arranged to be projected downward. The distribution function N is arranged such that the value of the apex Nc of the distribution function N in the horizontal-axis direction is the high-order command velocity Vv. Note that the value of the apex Nc of the distribution function N in the vertical-axis direction is −1.0. In the example in the upper portion of FIG. 7, the value of the distribution function N at the boundary velocity −V02 is −0.7, and the value of the distribution function N at the boundary velocity −V01 is −0.5. Note that the values of the distribution function N at the boundary velocities other than the boundary velocities −V02 and −V01 are all 0 (zero) because the boundary velocities other than the boundary velocities −V02 and −V01 fall out of the range of the distribution function N. In the upper portion of FIG. 7, the boundary velocity V11 seems to fall within the range of the distribution function N. However, because the example of FIG. 7 shows the case of the high-order command velocity Vv<0, the boundary velocities V11 to V1n for the case of the high-order command velocity Vv>0 are regarded as falling out of the range of the distribution function for the case of the high-order command velocity Vv<0, and the values of the distribution function N at the boundary velocities V11 to V1n are all regarded as 0 (zero).

The example of FIG. 7 shows the case of the high-order command velocity Vv<0. Thus, in the velocity-side positive/negative-velocity firing portion 24E, Vv (<0) that corresponds to the velocity-side negative-velocity input portion K[3] fires, and outputs the high-order command velocity Vv. Accordingly, the velocity-side negative-velocity input portion K[3] receives the high-order command velocity Vv as a velocity-side negative-velocity input value. Then, the velocity-side negative-velocity input portion K[3] outputs the received velocity-side negative-velocity input value as a velocity-side negative velocity output. Note that, in the example of FIG. 7, in the velocity-side positive/negative-velocity firing portion 24E, Vv (>0) that corresponds to the velocity-side positive-velocity input portion K[2] does not fire. Thus, the velocity-side positive-velocity input portion K[2] does not receive anything, and the velocity-side positive-velocity input portion K[2] does not output anything.

In addition, in the example of FIG. 7, in the velocity-side boundary-velocity firing portion 24F, the boundary velocities −V02 and −V01 that respectively correspond to velocity-side boundary-velocity input portions K[j−1] and K[j] fire. That is, in the view of the upper portion of FIG. 7, at the boundary velocities each of which has the velocity difference from the high-order command velocity that is equal to or smaller than the specified velocity difference (that is equal to or smaller than the spreading width Nw/2), the velocity-side boundary-velocity output values are output. Each of the velocity-side boundary-velocity output values is based on the velocity difference between the boundary velocity and the high-order command velocity Vv, that is, the distribution function N. In the example of FIG. 7, in the velocity-side boundary-velocity firing portion 24F, the firing boundary velocity −V02 outputs −0.7, and the boundary velocity −V01 outputs −0.5. Accordingly, the velocity-side boundary-velocity input portion K[j−1] receives −0.7. Then, the velocity-side boundary-velocity input portion K[j−1] outputs the received velocity-side boundary-velocity output value (−0.7 in this case) as the velocity-side boundary velocity output. Furthermore, the velocity-side boundary-velocity input portion K[j] receives −0.5. Then, the velocity-side boundary-velocity input portion K[j] outputs the received velocity-side boundary-velocity output value (−0.5 in this case) as the velocity-side boundary velocity output. Note that, in the example of FIG. 7, the boundary velocities −V0n, −V05, −V04, −V03, V11, and V1n in the velocity-side boundary-velocity firing portion 24F do not fire. Thus, velocity-side boundary-velocity input portions K[4], K[j−4], K[j−3], K[j−2], K[j+1], and K[j+n] do not receive anything, and the velocity-side boundary-velocity input portions K[4], K[j−4], K[j−3], K[j−2], K[j+1], and K[j+n] do not output anything. Note that, because the boundary velocities are arranged at unequal intervals, instead of equal intervals, as shown in FIG. 7 and FIG. 8, the number of the firing boundary velocities is changed in accordance with the value of the high-order command velocity Vv.

Figure 8:
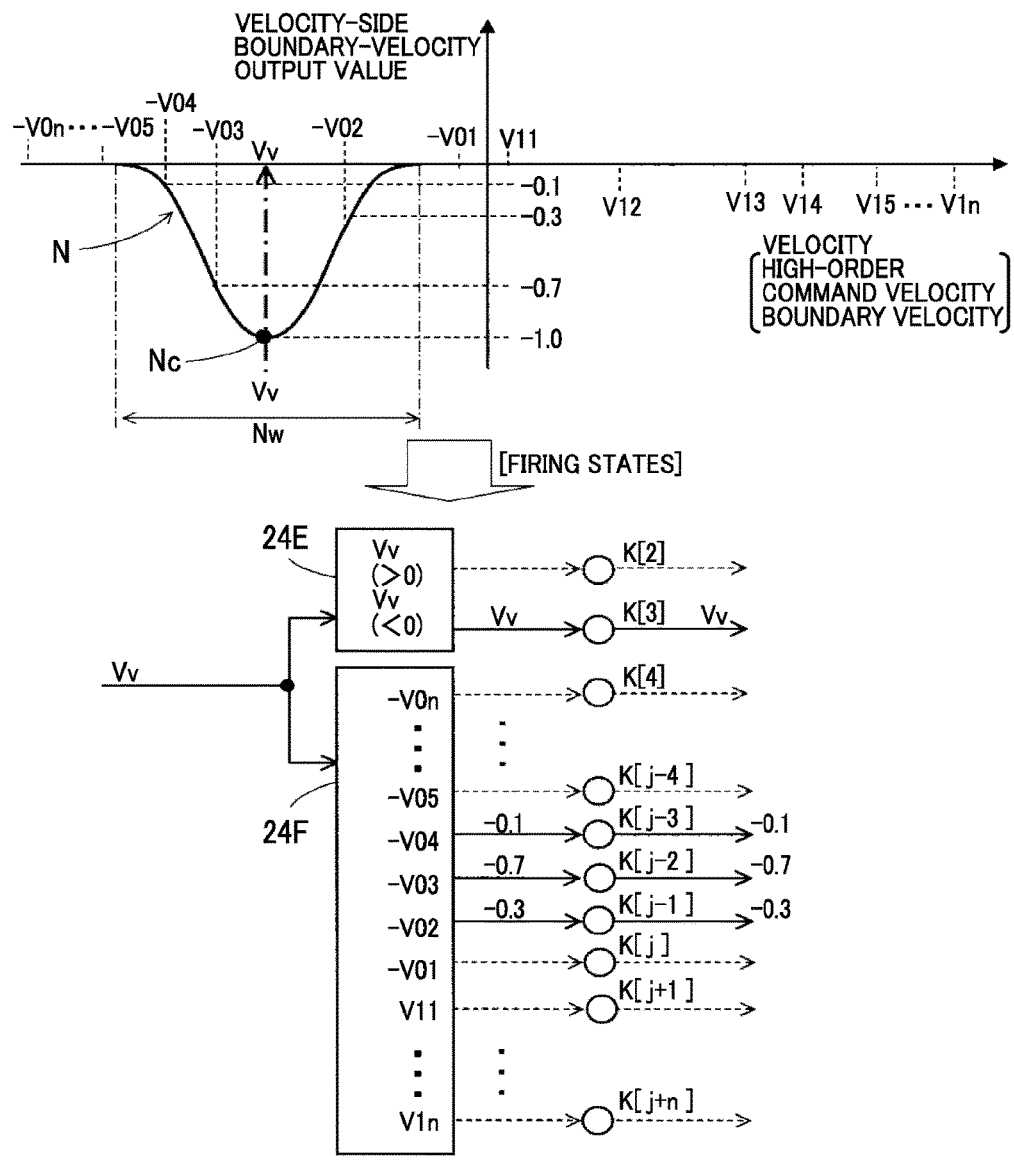
FIG. 8 is a graph and a diagram that illustrate an example of firing states of the velocity-side positive/negative-velocity firing portion and the velocity-side boundary-velocity firing portion in an example of a case of the high-order command velocity Vv<0 and a boundary velocity −V03<the high-order command velocity Vv<the boundary velocity −V02.

FIG. 8 shows an example of a case of the high-order command velocity Vv<0 and −V03<the high-order command velocity Vv<−V02. As shown in the example in an upper portion of FIG. 8, (similar to FIG. 7), coordinates, in which a horizontal axis indicates the velocity (the high-order command velocity, the boundary velocity) and a vertical axis indicates the velocity-side boundary-velocity output value, are prepared. The specified distribution function N (for example, the normal distribution function) that has the spreading width Nw as the width in the velocity direction is preset. Because the high-order command velocity Vv is smaller than 0 (the high-order command velocity Vv<0), the distribution function N is arranged to be projected downward. The distribution function N is arranged such that the value of the apex Nc of the distribution function N in the horizontal-axis direction is the high-order command velocity Vv. Note that the value of the apex Nc of the distribution function N in the vertical-axis direction is −1.0. In the example in the upper portion of FIG. 8, the value of the distribution function N at the boundary velocity −V04 is −0.1, the value of the distribution function N at the boundary velocity −V03 is −0.7, and the value of the distribution function N at the boundary velocity −V02 is −0.3. Note that the values of the distribution function N at the boundary velocities other than the boundary velocities −V04, −V03, and −V02 are all 0 (zero) because the boundary velocities other than the boundary velocities −V04, −V03, and −V02 fall out of the range of the distribution function N. The example of FIG. 8 shows the case of the high-order command velocity Vv<0. Therefore, the values of the distribution function N at the boundary velocities V11 to V1n for the case of the high-order command velocity Vv>0 are all 0 (zero).

The example of FIG. 8 shows the case of the high-order command velocity Vv<0. Thus, in the velocity-side positive/negative-velocity firing portion 24E, Vv (<0) that corresponds to the velocity-side negative-velocity input portion K[3] fires, and outputs the high-order command velocity Vv. Accordingly, the velocity-side negative-velocity input portion K[3] receives the high-order command velocity Vv as a velocity-side negative-velocity input value. Then, the velocity-side negative-velocity input portion K[3] outputs the received velocity-side negative-velocity input value as a velocity-side negative velocity output. Note that, in the example of FIG. 8, in the velocity-side positive/negative-velocity firing portion 24E, Vv (>0) that corresponds to the velocity-side positive-velocity input portion K[2] does not fire. Thus, the velocity-side positive-velocity input portion K[2] does not receive anything, and the velocity-side positive-velocity input portion K[2] does not output anything.

In addition, in the example of FIG. 8, in the velocity-side boundary-velocity firing portion 24F, the boundary velocities −V04, −V03, and −V02 that respectively correspond to the velocity-side boundary-velocity input portions K[j−3], K[j−2], and K[j−1] fire. That is, in the graph of the upper portion of FIG. 8, at the boundary velocities each of which has the velocity difference from the high-order command velocity that is equal to or smaller than the specified velocity difference (that is equal to or smaller than the spreading width Nw/2), the velocity-side boundary-velocity output values are output. Each of the velocity-side boundary-velocity output values is based on the velocity difference between the boundary velocity and the high-order command velocity Vv, that is, based on the distribution function N. In the example of FIG. 8, in the velocity-side boundary-velocity firing portion 24F, the firing boundary velocity −V04 outputs −0.1, the firing boundary velocity −V03 outputs −0.7, and the firing boundary velocity −V02 outputs −0.3. Accordingly, the velocity-side boundary-velocity input portion K[j−3] receives −0.1. Then, the velocity-side boundary-velocity input portion K[j−3] outputs the received velocity-side boundary-velocity output value (−0.1 in this case) as the velocity-side boundary velocity output. In addition, the velocity-side boundary-velocity input portion K[j−2] receives −0.7. Then, the velocity-side boundary-velocity input portion K[j−2] outputs the received velocity-side boundary-velocity output value (−0.7 in this case) as the velocity-side boundary velocity output. Furthermore, the velocity-side boundary-velocity input portion K[j−1] receives −0.3. Then, the velocity-side boundary-velocity input portion K[j−1] outputs the received velocity-side boundary-velocity output value (−0.3 in this case) as the velocity-side boundary velocity output. Note that, in the example of FIG. 8, in the velocity-side boundary-velocity firing portion 24F, the boundary velocities −V0n, −V05, −V01, V11, and V1n do not fire. Thus, the velocity-side boundary-velocity input portions K[4], K[j−4], K[j], K[j+1], and K[j+n] do not receive anything, and the velocity-side boundary-velocity input portions K[4], K[j−4], K[j], K[j+1], and K[j+n] do not output anything.

The input layer 24A in the simple perceptron 242 will be described with reference to FIG. 3. As shown in FIG. 3, the input layer 24A in the simple perceptron 242 of the network with the weight learning function includes a velocity-side acceleration input portion K[1], the velocity-side positive-velocity input portion K[2], the velocity-side negative-velocity input portion K[3], and the velocity-side boundary-velocity input portions K[4] to K[j+n].

The velocity-side acceleration input portion K[1] receives the high-order command acceleration αv and outputs the received high-order command acceleration αv as a velocity-side acceleration output.

As described above, when Vv (>0) in the velocity-side positive/negative-velocity firing portion 24E fires, the velocity-side positive-velocity input portion K[2] receives the velocity-side positive-velocity output value that is the high-order command velocity Vv. Then, the velocity-side positive-velocity input portion K[2] outputs the received velocity-side positive-velocity output value as the velocity-side positive velocity output. In addition, as described above, when Vv (<0) in the velocity-side positive/negative-velocity firing portion 24E fires, the velocity-side negative-velocity input portion K[3] receives the velocity-side negative-velocity output value that is the high-order command velocity Vv. Then, the velocity-side negative-velocity input portion K[3] outputs the received velocity-side negative-velocity output value as the velocity-side negative velocity output.

The velocity-side boundary-velocity input portions K[4] to K[j+n] are prepared so as to respectively correspond to the plurality of boundary velocities −V0n to V1n. As described above, the velocity-side boundary-velocity input portions K[4] to K[j+n] receive the velocity-side boundary-velocity output values from the firing boundary velocities in the velocity-side boundary-velocity firing portion 24F, and output the received velocity-side boundary-velocity output values as the velocity-side boundary velocity outputs. The velocity-side acceleration output, the velocity-side positive velocity output, the velocity-side negative velocity output, and the velocity-side boundary velocity outputs, which are output from the input portions K[1] to K[j+n], are collectively referred to as velocity-side first outputs 24L1.

The velocity-side first weight learning portion 24G in the simple perceptron 242 will be described with reference to FIG. 3. The velocity-side first weight learning portion 24G has a memory function that stores: a velocity-side first learning weight U[1] that corresponds to the velocity-side acceleration input portion K[1]; a velocity-side first learning weight U[2] that corresponds to the velocity-side positive-velocity input portion K[2]; a velocity-side first learning weight U[3] that corresponds to the velocity-side negative-velocity input portion K[3]; and velocity-side first learning weights U[4] to U[j+n] that respectively correspond to the velocity-side boundary-velocity input portions K[4] to K[j+n]. In addition, the velocity-side first weight learning portion 24G has a changing function that changes (learns) the velocity-side first learning weights U[1] to U[j+n] on the basis of the velocity deviation 20out. Furthermore, the velocity-side first weight learning portion 24G has a multiplication function that multiplies each of the received velocity-side first outputs 24L1 by a corresponding one of the velocity-side first learning weights U[1] to U[j+n].

The velocity-side first weight learning portion 24G changes (learns) each of values of the velocity-side first learning weights U[1] to U[j+n] such that each of the values of the velocity-side first learning weights U[1] to U[j+n] approximates an optimum value with respect to a specified evaluation function, in accordance with the velocity deviation 20out. For example, the velocity-side first weight learning portion 24G uses an evaluation function that has the velocity-side first learning weight as a horizontal axis and the second power of the velocity deviation as a vertical axis, to change (learn) the value of the velocity-side first learning weight such that the second power of the velocity deviation is reduced. Note that the evaluation function is prepared for each of the weights. Note that, when receiving the high-order command velocity Vv shown in the example of FIG. 5, the velocity-side first weight learning portion 24G learns the velocity-side first learning weights U[1], U[2], U[j+2], U[j+3], each of which corresponds to the velocity-side first output 24L1 that is output, and does not learn the velocity-side first learning weights U[3] to U[j+1], U[j+4] to U[j+n], each of which corresponds to the velocity-side first output 24L1 that is not output.

The velocity-side first weight learning portion 24G outputs velocity-side first multiplication values 24M1 that are obtained by multiplying the received velocity-side first outputs 24L1 by the corresponding velocity-side first learning weights U[1] to U[j+n]. For example, when receiving the high-order command velocity Vv shown in the example of FIG. 5, the velocity-side first weight learning portion 24G outputs $\alpha v \times U[1]$, $Vv \times U[2]$, $0.8 \times U[j+1]$, and $0.6 \times U[j+2]$. For example, when receiving the high-order command velocity Vv shown in the example of FIG. 7, the velocity-side first weight learning portion 24G outputs $\alpha v \times U[1]$, $Vv \times U[3]$, $-0.7 \times U[j-1]$, and $-0.5 \times [j]$.

The output layer 24C in the simple perceptron 242 will be described with reference to FIG. 3. The output layer 24C includes a velocity-side output portion Q[1]. The velocity-side output portion Q[1] converts a value that is obtained by summing the velocity-side first multiplication values of the following (11) to (14) by a specified function (for example, a sigmoid function), and outputs the converted value as the second tentative command current 24out: (11) the velocity-side first multiplication value ($\alpha v \times U[1]$) that is obtained by multiplying the velocity-side acceleration output ($\alpha v$), which is output from the velocity-side acceleration input portion K[1], by the velocity-side first learning weight U[1]; (12) the velocity-side first multiplication value ($Vv \times U[2]$) that is obtained by multiplying the velocity-side positive velocity output (Vv) by the velocity-side first learning weight U[2] when the velocity-side positive-velocity input portion K[2] outputs the velocity-side positive velocity output; (13) the velocity-side first multiplication value ($Vv \times U[3]$) that is obtained by multiplying the velocity-side negative velocity output (Vv) by the velocity-side first learning weight U[3] when the velocity-side negative-velocity input portion K[3] outputs the velocity-side negative velocity output; and (14) the velocity-side first multiplication values that are obtained by multiplying the velocity-side boundary velocity outputs, each of which is output from one of the velocity-side boundary-velocity input portions K[4] to K[j+n], by the corresponding velocity-side first learning weights (U[4] to U[j+n]). Note that the velocity-side output portion Q[1] can output the second tentative command current 24out without using the sigmoid function.

A configuration of the network with the weight learning function in the position feed-forward control portion 14 will be described with reference to FIG. 9. Similarly to the velocity feed-forward control portion 24, the position feed-forward control portion 14 includes an input processing portion 141 and a simple perceptron 142. The input processing portion 141 includes a position-side positive/negative-velocity firing portion 14E and a position-side boundary-velocity firing portion 14F. The simple perceptron 142 includes an input layer 14A, a position-side first weight learning portion 14G, and an output layer 14C.

Figure 9:
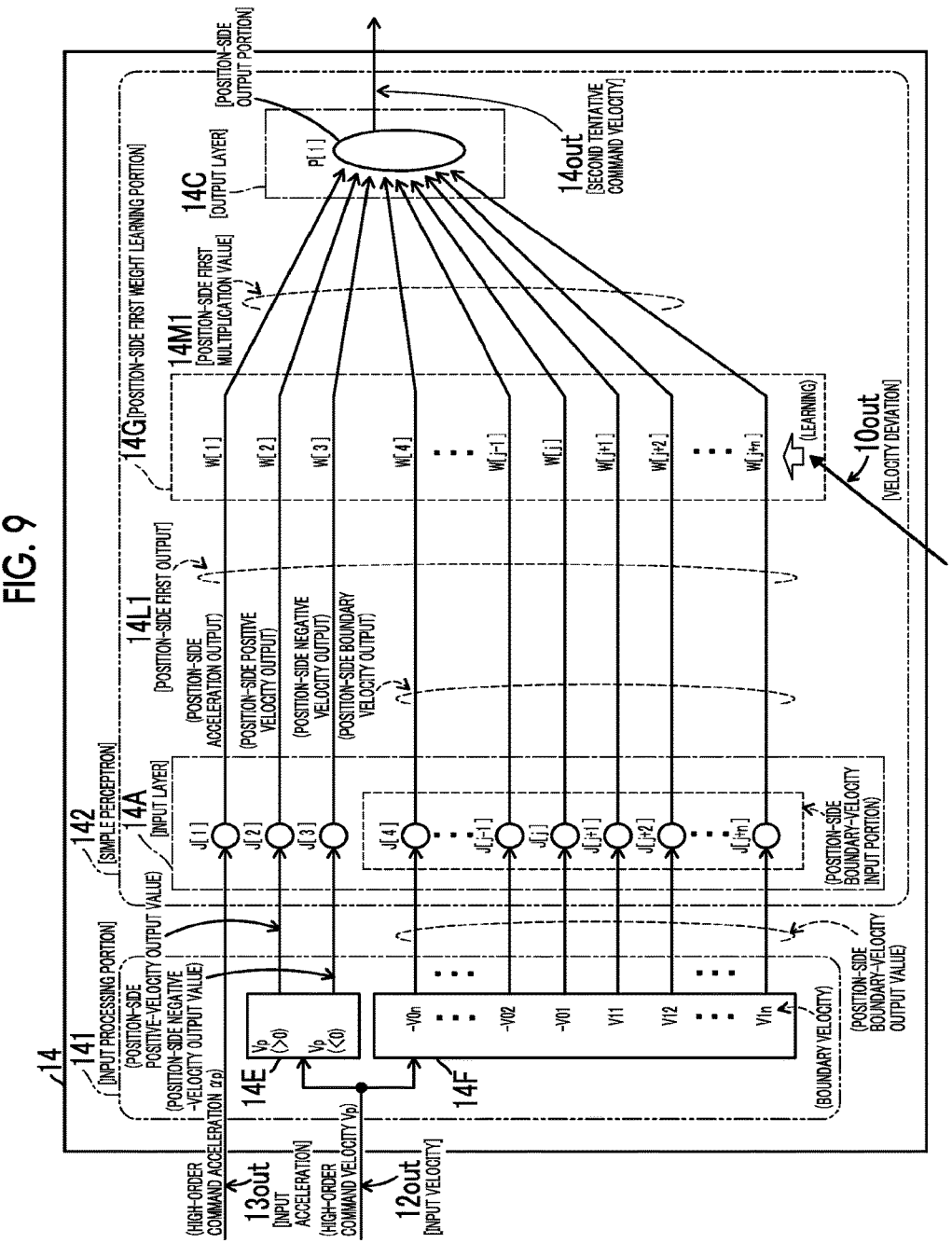
FIG. 9 is a conceptual diagram that illustrates an internal configuration of a position feed-forward control portion in FIG. 2 in the first embodiment.

Note that, as shown in FIG. 2, the velocity (the input velocity 12out) that is input to the position feed-forward control portion 14 shown in FIG. 9 is calculated by differentiating the command position 10in from the robot control device 60. However, the velocity may not be calculated from the differentiation of the command position 10in, and may be calculated by differentiating information related to the various positions. Alternatively, the command velocity from the robot control device 60 may be used as the velocity input to the position feed-forward control portion 14. For this reason, the velocity that is input to the position feed-forward control portion 14 shown in FIG. 9 will hereinafter be described as the high-order command velocity Vp (that is different from the low-order command velocity 15out) instead of the input velocity 12out. Similarly, as shown in FIG. 2, the acceleration (the input acceleration 13out) that is input to the position feed-forward control portion 14 shown in FIG. 9 is calculated by differentiating the command position 10in from the robot control device 60 twice. However, the acceleration may not be calculated by differentiating the command position 10in twice, and may be calculated by differentiating the information related to the various positions twice. Alternatively, the acceleration may be calculated by differentiating the command velocity from the robot control device 60. For this reason, the acceleration that is input to the position feed-forward control portion 14 shown in FIG. 9 will hereinafter be described as high-order command acceleration $\alpha p$, instead of the input acceleration 13out.

The input processing portion 141 will be described with reference to FIG. 9 to FIG. 11. The position-side positive/negative-velocity firing portion 14E receives the high-order command velocity Vp. When the received high-order command velocity Vp is positive (>0), a "Vp (>0)" side of the position-side positive/negative-velocity firing portion 14E fires, and a "Vp (<0)" side thereof does not fire. The position-side positive/negative-velocity firing portion 14E outputs a position-side positive-velocity output value (the value is a value of the high-order command velocity Vp) to a position-side positive-velocity input portion J[2]. In addition, when the received high-order command velocity Vp is negative (<0), the "Vp (<0)" side of the position-side positive/negative-velocity firing portion 14E fires, and the "Vp (>0)" side thereof does not fire. The position-side positive/negative-velocity firing portion 14E outputs a position-side negative-velocity output value (the value is a value of the high-order command velocity Vp) to a position-side negative-velocity input portion J[3].

The position-side boundary-velocity firing portion 14F receives the high-order command velocity Vp. The position-side boundary-velocity firing portion 14F has the plurality of boundary velocities (−V0n to V1n) that are velocities at the boundaries of preset adjacent velocity ranges obtained by dividing a limited velocity range that is limited relative to the range of the high-order command velocity Vv (see FIG. 4). The position-side boundary-velocity firing portion 14F outputs position-side boundary-velocity output values from the boundary velocities each of which has a velocity difference from the received high-order command velocity Vp that is equal to or smaller than a specified velocity difference, each of the position-side boundary-velocity output values being based on the velocity difference. Note that the limited velocity range, the velocity range, the boundary velocity, and the velocity-side boundary-velocity output values are the same as those that have been described by using FIG. 4 to FIG. 8, and thus will not be described.

Figure 10:
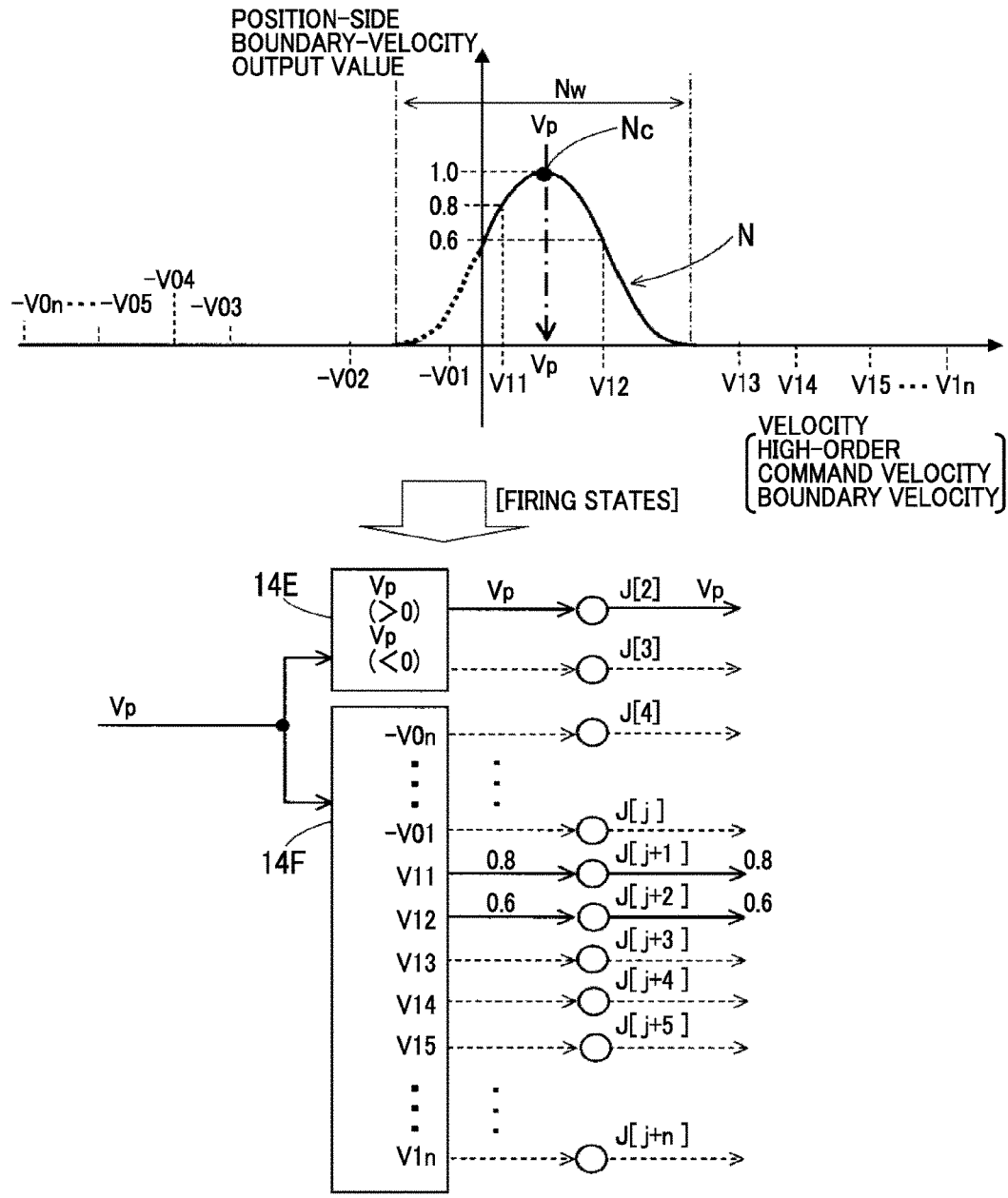
FIG. 10 is a graph and a diagram that illustrate an example of firing states of a position-side positive/negative-velocity firing portion and a position-side boundary-velocity firing portion in an example of a case of a high-order command velocity Vp>0 and the boundary velocity V11<the high-order command velocity Vp<the boundary velocity V12.

In an example of FIG. 10, the high-order command velocity Vv in the example of FIG. 5 is replaced with the high-order command velocity Vp, the velocity-side positive/negative-velocity firing portion 24E is replaced with the position-side positive/negative-velocity firing portion 14E, and the velocity-side boundary-velocity firing portion 24F is replaced with the position-side boundary-velocity firing portion 14F. The example of FIG. 10 shows the case of the high-order command velocity Vp>0. Thus, in the position-side positive/negative-velocity firing portion 14E, Vp (>0) that corresponds to the position-side positive-velocity input portion J[2] fires, and outputs the high-order command velocity Vp. Accordingly, the position-side positive-velocity input portion J[2] receives the high-order command velocity Vp as a position-side positive velocity input value. Then, the position-side positive-velocity input portion J[2] outputs the received position-side positive velocity input value as a position-side positive velocity output. Note that, in the example of FIG. 10, in the position-side positive/negative-velocity firing portion 14E, Vp (<0) that corresponds to the position-side negative-velocity input portion J[3] does not fire. Thus, the position-side negative-velocity input portion J[3] does not receive anything, and the position-side negative-velocity input portion J[3] does not output anything.

In addition, in the example of FIG. 10, in the position-side boundary-velocity firing portion 14F, the boundary velocities V11 and V12 that respectively correspond to position-side boundary-velocity input portions J[j+1] and J[j+2] fire. That is, in an upper portion of FIG. 10, at the boundary velocities each of which has the velocity difference from the high-order command velocity that is equal to or smaller than the specified velocity difference (that is equal to or smaller than the spreading width Nw/2), the position-side boundary-velocity output values are output. Each of the position-side boundary-velocity output values is based on the velocity difference between the boundary velocity and the high-order command velocity Vp, that is, based on the distribution function N. In the example of FIG. 10, in the position-side boundary-velocity firing portion 14F, the firing boundary velocity V11 outputs 0.8, and the firing boundary velocity V12 outputs 0.6. Accordingly, the position-side boundary-velocity input portion J[j+1] receives 0.8. Then, the position-side boundary-velocity input portion J[j+1] outputs the received position-side boundary-velocity output value (0.8 in this case) as a position-side boundary velocity output. The position-side boundary-velocity input portion J[j+2] receives 0.6. Then, the position-side boundary-velocity input portion J[j+2] outputs the received position-side boundary-velocity output value (0.6 in this case) as the position-side boundary velocity output. Note that, in the example of FIG. 10, in the position-side boundary-velocity firing portion 14F, the boundary velocities −V0n, −V01, V13, V14, V15, and V1n do not fire. Thus, position-side boundary-velocity input portions J[4], J[j], J[j+3], J[j+4], J[j+5], and J[j+n] do not receive anything, and the position-side boundary-velocity input portions J[4], J[j], J[j+3], J[j+4], J[j+5], and J[j+n] do not output anything. Note that, because the boundary velocities are arranged at unequal intervals instead of equal intervals, the number of the firing boundary velocities is changed in accordance with the value of the high-order command velocity Vp.

Figure 11:
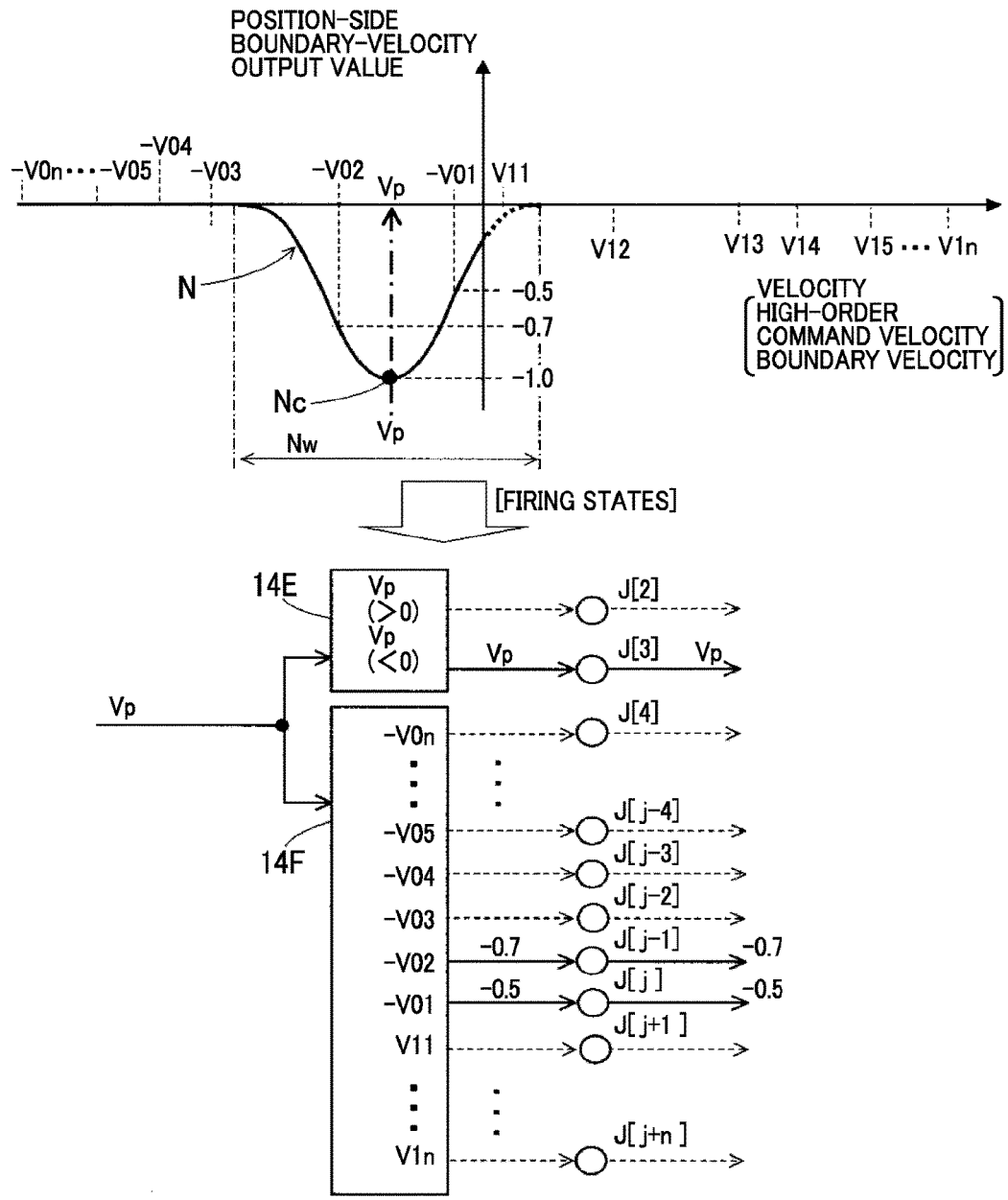
FIG. 11 is a graph and a diagram that illustrate an example of firing states of the position-side positive/negative-velocity firing portion and the position-side boundary-velocity firing portion in an example of a case of the high-order command velocity Vp<0 and the boundary velocity −V02<the high-order command velocity Vp<the boundary velocity −V01.

In an example of FIG. 11, the high-order command velocity Vv in the example of FIG. 7 is replaced with the high-order command velocity Vp, the velocity-side positive/negative-velocity firing portion 24E is replaced with the position-side positive/negative-velocity firing portion 14E, and the velocity-side boundary-velocity firing portion 24F is replaced with the position-side boundary-velocity firing portion 14F. The example of FIG. 11 shows the case of the high-order command velocity Vp<0. Thus, in the position-side positive/negative-velocity firing portion 14E, Vp (<0) that corresponds to the position-side negative-velocity input portion J[3] fires, and outputs the high-order command velocity Vp. Accordingly, the position-side negative-velocity input portion J[3] receives the high-order command velocity Vp as a position-side negative-velocity input value. Then, the position-side negative-velocity input portion J[3] outputs the received position-side negative-velocity input value as position-side negative velocity output. Note that, in the example of FIG. 11, in the position-side positive/negative-velocity firing portion 14E, Vp (>0) that corresponds to the position-side positive-velocity input portion J[2] does not fire. Thus, the position-side positive-velocity input portion J[2] does not receive anything, and the position-side positive-velocity input portion J[2] does not output anything.

In addition, in the example of FIG. 11, in the position-side boundary-velocity firing portion 14F, the boundary velocities −V02 and −V01 that respectively correspond to position-side boundary-velocity input portions J[j−1] and J[j] fire. That is, in a graph of an upper portion of FIG. 11, at the boundary velocities each of which has the velocity difference from the high-order command velocity that is equal to or smaller than the specified velocity difference (that is equal to or smaller than the spreading width Nw/2), the position-side boundary-velocity output values are output. Each of the position-side boundary-velocity output values is based on the velocity difference between the boundary velocity and the high-order command velocity Vp, that is, based on the distribution function N. In the example of FIG. 11, in the position-side boundary-velocity firing portion 14F, the firing boundary velocity −V02 outputs −0.7, and the firing boundary velocity −V01 outputs −0.5. Accordingly, the position-side boundary-velocity input portion J[j−1] receives −0.7. Then, the position-side boundary-velocity input portion J[j−1] outputs the received position-side boundary-velocity output value (−0.7 in this case) as the position-side boundary velocity output. The position-side boundary-velocity input portion J[j] receives −0.5. Then, the position-side boundary-velocity input portion J[j] outputs the received position-side boundary-velocity output value (−0.5 in this case) as the position-side boundary velocity output. Note that, in the example of FIG. 11, in the position-side boundary-velocity firing portion 14F, the boundary velocities −V0n, −V05, −V04, −V03, V11, and V1n do not fire. Thus, the position-side boundary-velocity input portions J[4], J[j−4], J[j−3], J[j−2], J[j+1], and J[j+n] do not receive anything, and the position-side boundary-velocity input portions J[4], J[j−4], J[j−3], J[j−2], J[j+1], and J[j+n] do not output anything. Note that, because the boundary velocities are arranged at unequal intervals instead of equal intervals, the number of the firing boundary velocities is changed in accordance with the value of the high-order command velocity Vp.

The input layer 14A in the simple perceptron 142 will be described with reference to FIG. 9. As shown in FIG. 9, the input layer 14A in the simple perceptron 142 of the network with the weight learning function includes a position-side acceleration input portion J[1], the position-side positive-velocity input portion J[2], the position-side negative-velocity input portion J[3], and the position-side boundary-velocity input portions J[4] to J[j+n].

The position-side acceleration input portion J[1] receives the high-order command acceleration αp and outputs the received high-order command acceleration αp as a position-side acceleration output.

As described above, when Vp (>0) in the position-side positive/negative-velocity firing portion 14E fires, the position-side positive-velocity input portion J[2] receives the position-side positive-velocity output value that is the high-order command velocity Vp. Then, the position-side positive-velocity input portion J[2] outputs the received position-side positive velocity output value as the position-side positive velocity output. As described above, when Vp (<0) in the position-side positive/negative-velocity firing portion 14E fires, the position-side negative-velocity input portion J[3] receives the position-side negative-velocity output value that is the high-order command velocity Vp. Then, the position-side negative-velocity input portion J[3] outputs the received position-side negative velocity output value as the position-side negative velocity output.

The position-side boundary-velocity input portions J[4] to J[j+n] are prepared so as to respectively correspond to the plurality of boundary velocities −V0n to V1n. As described above, the position-side boundary-velocity input portions J[4] to J[j+n] receive the position-side boundary-velocity output values from the firing boundary velocities in the position-side boundary-velocity firing portion 14F, and output the received position-side boundary-velocity output values as the position-side boundary velocity outputs. The position-side acceleration output, the position-side positive velocity output, the position-side negative velocity output, and the position-side boundary velocity outputs, which are output from the input portions J[1] to J[j+n], are collectively referred to as position-side first outputs 14L1.

The position-side first weight learning portion 14G in the simple perceptron 142 will be described with reference to FIG. 9. The position-side first weight learning portion 14G has a memory function that stores: a position-side first learning weight W[1] that corresponds to the position-side acceleration input portion J[1]; a position-side first learning weight W[2] that corresponds to the position-side positive-velocity input portion J[2]; a position-side first learning weight W[3] that corresponds to the position-side negative-velocity input portion J[3]; and position-side first learning weights W[4] to W[j+n] that respectively correspond to the position-side boundary-velocity input portions J[4] to J[j+n]. In addition, the position-side first weight learning portion 14G has a changing function that changes (learns) the position-side first learning weights W[1] to W[j+n] on the basis of the position deviation 10out. Furthermore, the position-side first weight learning portion 14G has a multiplication function that multiplies each of the received position-side first outputs 14L1 by a corresponding one of the position-side first learning weights W[1] to W[j+n].

The position-side first weight learning portion 14G changes (learns) each of values of the position-side first learning weights W[1] to W[j+n] such that each of the values of the position-side first learning weights W[1] to W[j+n] approximates an optimum value with respect to a specified evaluation function, in accordance with the position deviation 10out. For example, the position-side first weight learning portion 14G uses an evaluation function that has the position-side first learning weight as a horizontal axis and the second power of the position deviation as a vertical axis, to change (learn) the value of the position-side first learning weight such that the second power of the position deviation is reduced. Note that the evaluation function is prepared for each of the weights. Note that, when receiving the high-order command velocity Vp shown in the example of FIG. 10, the position-side first weight learning portion 14G learns the position-side first learning weights W[1], W[2], W[j+1], and W[j+2], each of which corresponds to the position-side first output 14L1 that is output, and does not learn the position-side first learning weights W[3] to W[j], and W[j+3] to W[j+n], each of which corresponds to the position-side first output 14L1 that is not output.

The position-side first weight learning portion 14G outputs position-side first multiplication values 14M1 that are obtained by multiplying the received position-side first outputs 14L1 by the corresponding position-side first learning weights W[1] to W[j+n]. For example, when receiving the high-order command velocity Vp shown in the example of FIG. 10, the position-side first weight learning portion 14G outputs Δp×W[1], Vp×W[2], 0.8×W[j+1], and 0.6×W[j+2]. For example, when receiving the high-order command velocity Vp shown in the example of FIG. 11, the position-side first weight learning portion 14G outputs αp×W[1], Vp×W[3], −0.7×W[j−1], and −0.5×W[j].

The output layer 14C in the simple perceptron 142 will be described with reference to FIG. 9. The output layer 14C includes a position-side output portion P[1]. The position-side output portion P[1] converts a value that is obtained by summing position-side first multiplication values of the following (11) to (14) by a specified function (for example, the sigmoid function), and outputs the converted value as the second tentative command velocity 14out: (11) the position-side first multiplication value (αp×W[1]) that is obtained by multiplying the position-side acceleration output (αp), which is output from the position-side acceleration input portion J[1], by the position-side first learning weight W[1]; (12) the position-side first multiplication value (Vp×W[2])

that is obtained by multiplying the position-side positive velocity output (Vp) by the position-side first learning weight W[2] when the position-side positive-velocity input portion J[2] outputs the position-side positive velocity output; (13) the position-side first multiplication value (Vp×W[3]) that is obtained by multiplying the position-side negative velocity output (Vp) by the position-side first learning weight W[3] when the position-side negative-velocity input portion J[3] outputs the position-side negative velocity output; and (14) the position-side first multiplication values that are obtained by multiplying the position-side boundary velocity outputs, each of which is output from one of the position-side boundary-velocity input portions J[4] to J[j+n], by the corresponding position-side first learning weights (W[4] to W[j+n]). Note that the position-side output portion P[1] can output the second tentative command velocity 14out without using the sigmoid function.

Figure 12:
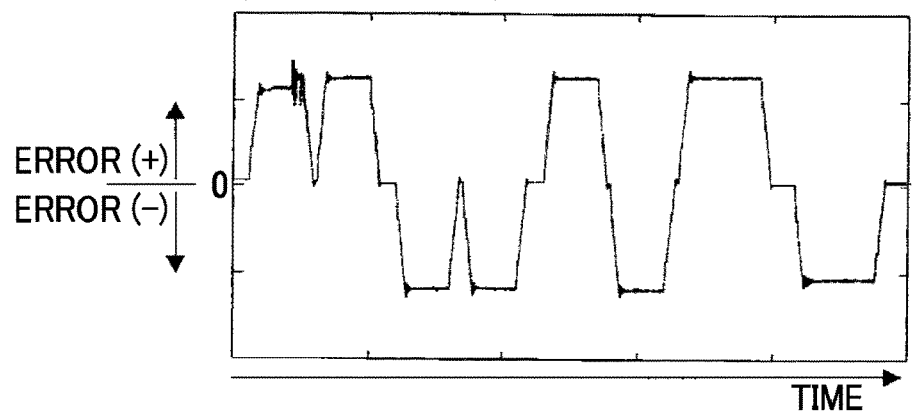
FIG. 12 is a chart that illustrates an example of a position deviation caused in conventional control.
Figure 13:
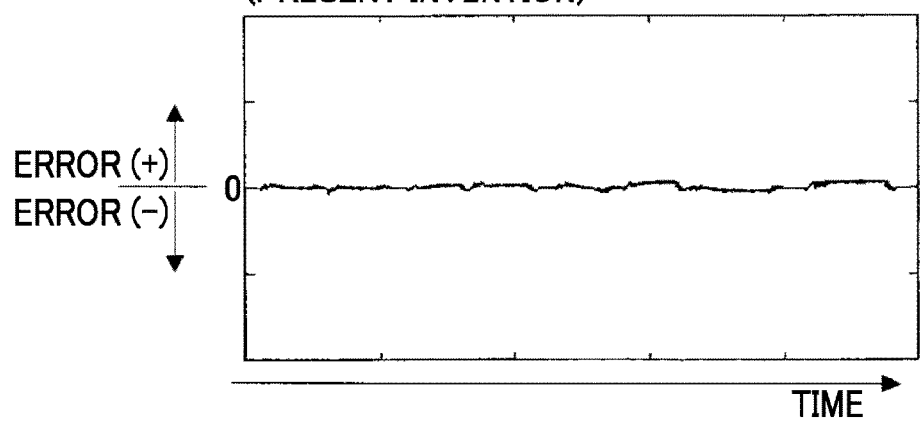
FIG. 13 is a chart that illustrates an example of a position deviation caused in the control in the first embodiment (an effect of the disclosure as compared to the conventional control)

As described so far, in the first embodiment, the characteristic that has the nonlinear characteristic as a whole is divided into the plurality of regions (in this case, the velocity ranges), each of which can be regarded as the linear characteristic. Then, the region that corresponds to the received physical quantity (in this case, the high-order command velocity Vv, the high-order command velocity Vp) is used for computation. Thus, the position deviation can be further reduced. Note that FIG. 12 shows an example of a state where the position deviation (error) occurs in the case of conventional control in which the characteristic is not divided into the regions (the above division into the regions is not performed) and the weights (the velocity-side first learning weights, the position-side first learning weights) are not learned. FIG. 13 shows an example of a state where the position deviation occurs in the case where the control in the first embodiment is executed (the characteristic is divided into the regions as described above, and the velocity-side first learning weights and the position-side first learning weights are learned). In each of the cases, a horizontal axis indicates time, and a vertical axis indicates a deviation (error) between the encoder and the command position. As apparent from comparison between FIG. 12 and FIG. 13, the position deviation (error) can be significantly reduced by the control in the first embodiment as compared to the conventional control.

Figure 14:
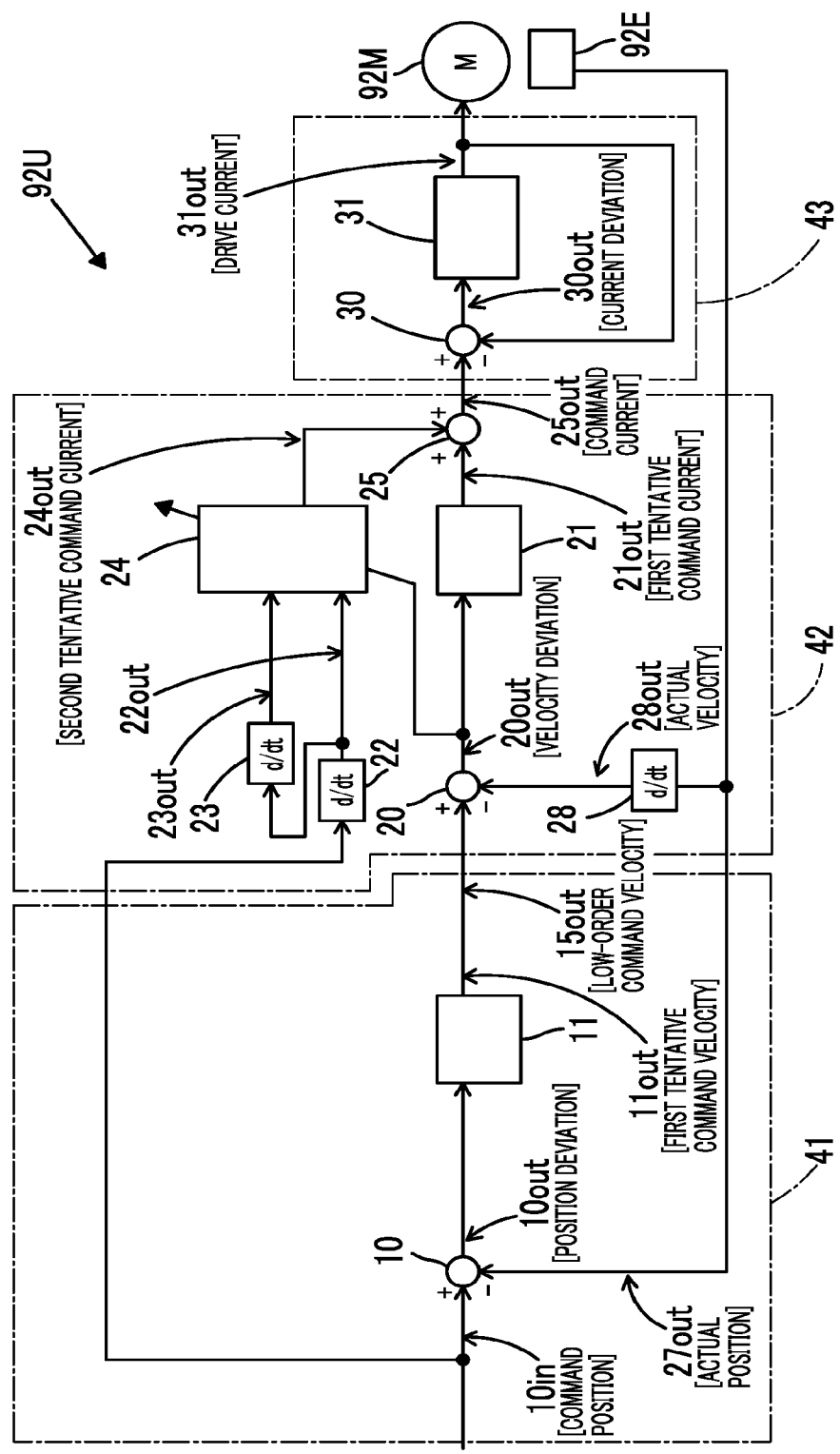
FIG. 14 is a diagram that illustrates an example of an overall configuration of a motor control device in second and fourth embodiments.

Next, the motor control device 92U in a second embodiment will be described with reference to FIG. 14. The motor control device in the second embodiment, which is shown in FIG. 14, differs from the motor control device in the first embodiment, which is shown in FIG. 2, in that the position feed-forward control portion 14, the position-side input velocity computation portion 12, the position-side input acceleration computation portion 13, and the velocity addition computation portion 15 are not provided. The rest of the configuration of the motor control device 92U in the second embodiment is the same as that in the first embodiment. Hereinafter, a description will be made mainly on different points. Note that the first tentative command velocity 11 out, which is output from the position feedback control portion 11, becomes the low-order command velocity 15out without being changed, and the low-order command velocity 15out is input to the velocity deviation computation portion 20.

In the motor control device in the second embodiment, which is shown in FIG. 14, the position feed-forward control portion 14, the input (the position-side input velocity computation portion 12, the position-side input acceleration computation portion 13) to the position feed-forward control portion 14, and the output (the velocity addition computation portion 15) therefrom in the motor control device in the first embodiment, which is shown in FIG. 2, are not provided. Thus, the position deviation is slightly increased in control executed by the motor control device in the second embodiment as compared to the control executed by the motor control device in the first embodiment. However, it is understood from an experimental result obtained by the inventor that the reduction in the position deviation by the velocity feed-forward control portion is more predominant than the reduction in the position deviation by the position feed-forward control portion. It is also understood that, even when the position feed-forward control portion is not provided, the position deviation can be sufficiently reduced, for example, in the robot control shown in the example of FIG. 1. That is, for example, in the robot control, the position deviation can be reduced to an expected level even when the position feed-forward control portion is not provided (and the input and output portions for the position feed-forward control portion are not provided). In this case, a processing load on the motor control device can be reduced.

Figure 15:
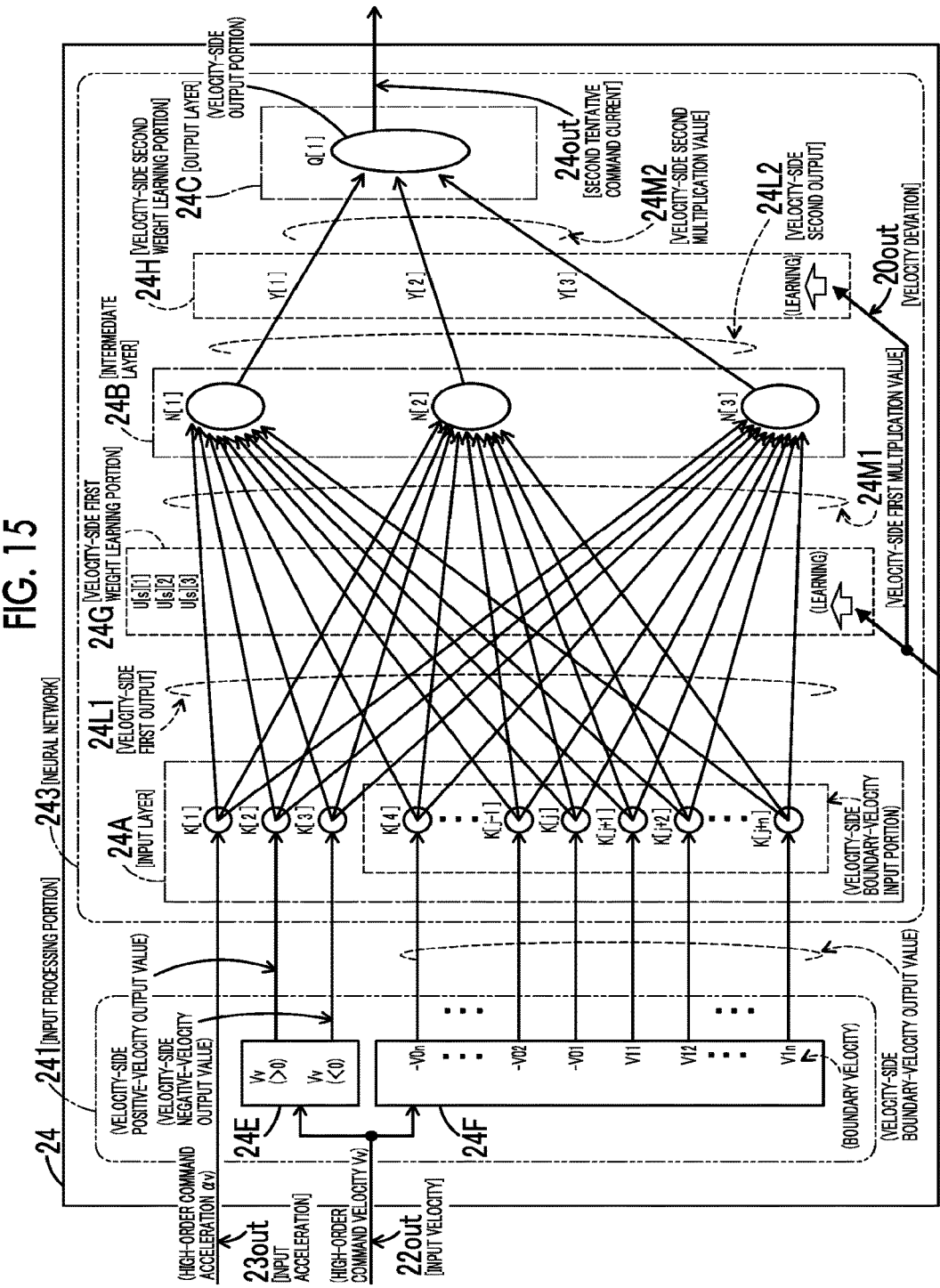
FIG. 15 is a conceptual diagram that illustrates an internal configuration of a velocity feed-forward control portion in FIG. 2 in the third embodiment.
Figure 16:
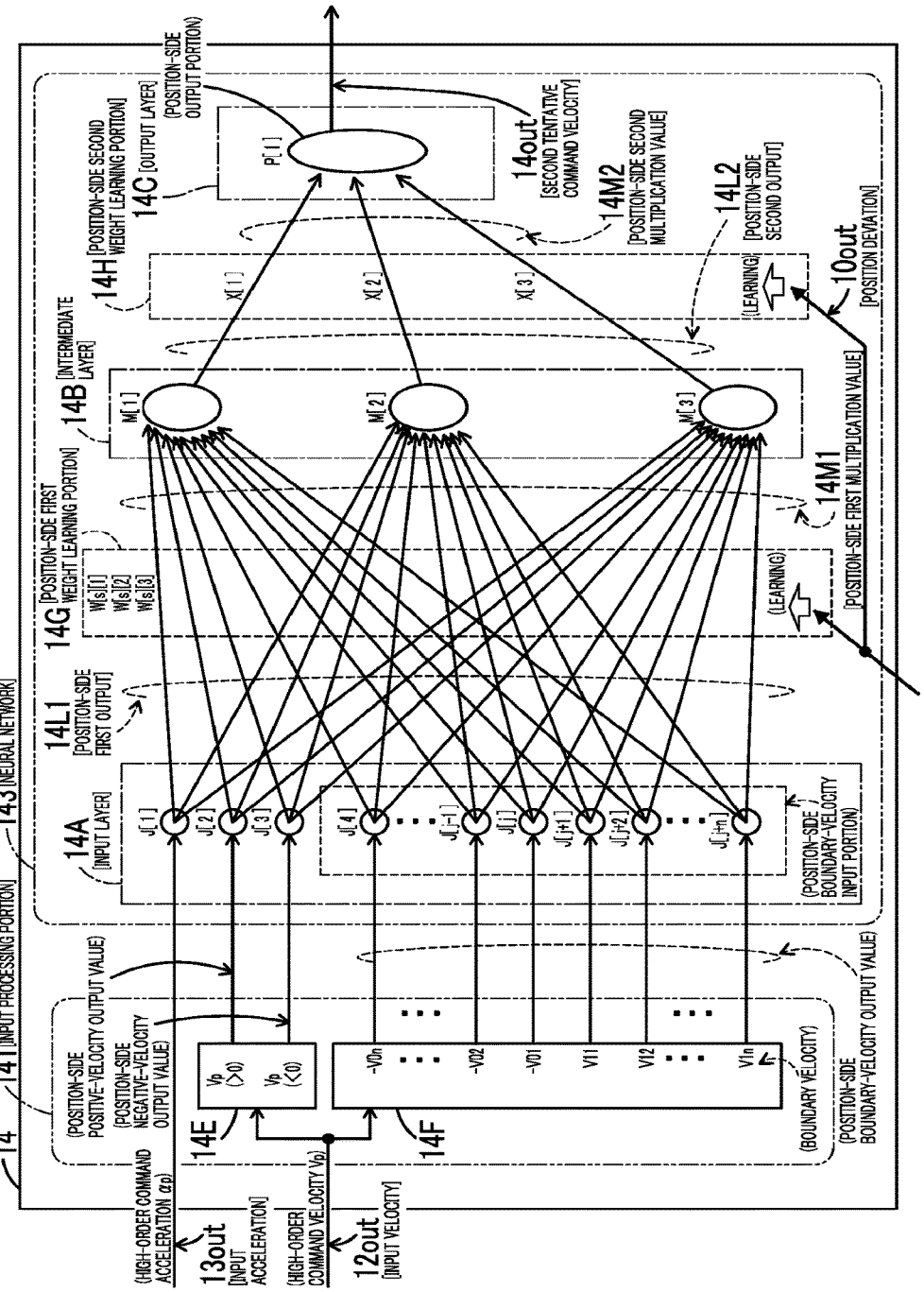
FIG. 16 is a conceptual diagram that illustrates an internal configuration of a position feed-forward control portion in FIG. 2 in the third embodiment.

The motor control device 92U in a third embodiment will be described with reference to FIG. 15 and FIG. 16. In the third embodiment, an overall configuration of the motor control device is the same as that in the first embodiment shown in FIG. 2. However, the motor control device in the third embodiment differs from that in the first embodiment in that an internal configuration of the velocity feed-forward control portion 24 is as shown in FIG. 15 and that an internal configuration of the position feed-forward control portion 14 is as shown in FIG. 16.

Next, the configuration in the velocity feed-forward control portion 24 in the third embodiment will be described by using FIG. 15. Since the influence of the velocity feed-forward control portion 24 on the reduction in the position deviation is greater than that of the position feed-forward control portion 14, the velocity feed-forward control portion 24 will be described first. The velocity feed-forward control portion 24 includes the input processing portion 241 and a neural network 243. Note that the input processing portion 241 is the same as the input processing portion 241 in the first embodiment (see FIG. 3) and thus a description thereof will not be made. In addition, the high-order command velocity Vv and the high-order command acceleration αv are also the same as those in the first embodiment (see FIG. 3), and thus a description thereof will not be made. The neural network 243 includes the input layer 24A, the velocity-side first weight learning portion 24G, an intermediate layer 24B, a velocity-side second weight learning portion 24H, and an output layer 24C. Three velocity-side computation portions N[1] to N[3] are provided as the intermediate layer 24B in the third embodiment. However, the number of the velocity-side computation portions is not limited to three.

The input layer 24A in the neural network 243 will be described with reference to FIG. 15. As shown in FIG. 15, the input layer 24A in the neural network 243 is the same as that of the first embodiment (see FIG. 3) in that the input layer 24A includes the velocity-side acceleration input portion K[1], the velocity-side positive-velocity input portion K[2], the velocity-side negative-velocity input portion K[3], and the velocity-side boundary-velocity input portions K[4] to K[j+n]. However, an output from each of the input portions differs from that in the first embodiment.

The velocity-side acceleration input portion K[1] receives the high-order command acceleration αv and outputs the received high-order command acceleration αv as the velocity-side acceleration output to each of the plurality of velocity-side computation portions N[1] to N[3] that are prepared in advance.

When Vv (>0) in the velocity-side positive/negative-velocity firing portion 24E fires, the velocity-side positive-velocity input portion K[2] receives the velocity-side positive-velocity output value that is the high-order command velocity Vv. Then, the velocity-side positive-velocity input portion K[2] outputs the received velocity-side positive-velocity output value as the velocity-side positive-velocity output to each of the plurality of velocity-side computation portions N[1] to N[3] that are prepared in advance. When Vv (<0) in the velocity-side positive/negative-velocity firing portion 24E fires, the velocity-side negative-velocity input portion K[3] receives the velocity-side negative-velocity output value that is the high-order command velocity Vv. Then, the velocity-side negative-velocity input portion K[3] outputs the received velocity-side negative-velocity output value as the velocity-side negative velocity output to each of the plurality of velocity-side computation portions N[1] to N[3] that are prepared in advance.

The velocity-side boundary-velocity input portions K[4] to K[j+n] are prepared so as to respectively correspond to the plurality of boundary velocities −V0n to V1n. The velocity-side boundary-velocity input portions K[4] to K[j+n] receive the velocity-side boundary-velocity output values from the firing boundary velocities in the velocity-side boundary-velocity firing portion 24F, and output the received velocity-side boundary-velocity output values as the velocity-side boundary velocity outputs to each of the plurality of velocity-side computation portions N[1] to N[3] that are prepared in advance. The velocity-side acceleration output, the velocity-side positive velocity output, the velocity-side negative velocity output, and the velocity-side boundary velocity outputs, which are output from the input portions K[1] to K[j+n], are collectively referred to as the velocity-side first outputs 24L1.

The velocity-side first weight learning portion 24G in the neural network 243 will be described with reference to FIG. 15. A velocity-side first learning weight U[1][1] (U[s][1]) corresponds to the velocity-side first output that is output from the velocity-side acceleration input portion K[1] to the velocity-side computation portion N[1]. A velocity-side first learning weight U[2][1] (U[s][1]) corresponds to the velocity-side first output that is output from the velocity-side positive-velocity input portion K[2] to the velocity-side computation portion N[1]. A velocity-side first learning weight U[3][1] (U[s][1]) corresponds to the velocity-side first output that is output from the velocity-side negative-velocity input portion K[3] to the velocity-side computation portion N[1]. Velocity-side first learning weights U[4][1] to U[j+n] [1] (U[s][1]) respectively correspond to the velocity-side first outputs that are output from the velocity-side boundary-velocity input portions K[4] to K[j+n] to the velocity-side computation portion N[1]. As described above, the velocity-side first learning weights U[s][1] correspond to the velocity-side first outputs that are output to the velocity-side computation portion N[1].

Similarly, a velocity-side first learning weight U[1][2] (U[s][2]) corresponds to the velocity-side first output that is output from the velocity-side acceleration input portion K[1] to the velocity-side computation portion N[2]. A velocity-side first learning weight U[2][2] (U[s][2]) corresponds to the velocity-side first output that is output from the velocity-side positive-velocity input portion K[2] to the velocity-side computation portion N[2]. A velocity-side first learning weight U[3][2] (U[s] [2]) corresponds to the velocity-side first output that is output from the velocity-side negative-velocity input portion K[3] to the velocity-side computation portion N[2]. Velocity-side first learning weights U[4][2] to U[j+n][2] (U[s][2]) respectively correspond to the velocity-side first outputs that are output from the velocity-side boundary-velocity input portions K[4] to K[j+n] to the velocity-side computation portion N[2]. As described above, the velocity-side first learning weights U[s][2] correspond to the velocity-side first outputs that are output to the velocity-side computation portion N[2].

Similarly, a velocity-side first learning weight U[1][3] (U[s][3]) corresponds to the velocity-side first output that is output from the velocity-side acceleration input portion K[1] to the velocity-side computation portion N[3]. A velocity-side first learning weight U[2][3] (U[s][3]) corresponds to the velocity-side first output that is output from the velocity-side positive-velocity input portion K[2] to the velocity-side computation portion N[3]. A velocity-side first learning weight U[3][3] (U[s][3]) corresponds to the velocity-side first output that is output from the velocity-side negative-velocity input portion K[3] to the velocity-side computation portion N[3]. Velocity-side first learning weights U[4][3] to U[j+n][3] (U[s][3]) respectively correspond to the velocity-side first outputs that are output from the velocity-side boundary-velocity input portions K[4] to K[j+n] to the velocity-side computation portion N[3]. As described above, the velocity-side first learning weights U[s][3] correspond to the velocity-side first outputs that are output to the velocity-side computation portion N[3].

The velocity-side first weight learning portion 24G has a memory function that stores the velocity-side first learning weights U[s][1], U[s][2], and U[s][3]. In addition, the velocity-side first weight learning portion 24G has a changing function that changes (learns) the velocity-side first learning weights U[s][1], U[s][2], and U[s][3] on the basis of the velocity deviation 20out. Furthermore, the velocity-side first weight learning portion 24G has a multiplication function that multiplies each of the received velocity-side first outputs 24L1 by the corresponding velocity-side first learning weight.

The velocity-side first weight learning portion 24G changes (learns) each of values of the velocity-side first learning weights U[s][1], U[s][2], and U[s][3] such that each of the values of the velocity-side first learning weights U[s][1], U[s][2], and U[s][3] approximates an optimum value with respect to a specified evaluation function in accordance with the velocity deviation 20out. For example, the velocity-side first weight learning portion 24G uses an evaluation function that has the velocity-side first learning weight as a horizontal axis and the second power of the velocity deviation as a vertical axis, to change (learn) the value of the velocity-side first learning weight such that the second power of the velocity deviation is reduced. Note that the evaluation function is prepared for each of the weights. Note that, when receiving the high-order command velocity Vv that is shown in the example of FIG. 5, the velocity-side first weight learning portion 24G learns only the velocity-side first learning weights U[1][1] to U[1][3], U[2][1] to U[2][3], U[j+2][1] to U[j+2][3], and U[j+3][1] to U[j+3][3], each of which corresponds to the velocity-side first output that is output, and does not learn the velocity-side first learning weights, each of which corresponds to the other velocity-side first output that is not output.

The velocity-side first weight learning portion 24G outputs the velocity-side first multiplication values 24M1 that are obtained by multiplying the velocity-side first outputs by the corresponding velocity-side first learning weights. For example, when receiving the high-order command velocity Vv that is shown in the example of FIG. 5, the velocity-side first weight learning portion 24G outputs αv×U[1][1] to αv×U[1][3], Vv×U[2][1] to Vv×U[2][3], 0.8×U[j+1][1] to 0.8×U[j+1][3], and 0.6×U[j+2][1] to 0.6×U[j+2][3]. For example, when receiving the high-order command velocity Vv that is shown in the example of FIG. 7, the velocity-side first weight learning portion 24G outputs αv×U[1][1] to αv×U[1][3], Vv×U[3][1] to Vv×U[3][3], −0.7×U[j−1][1] to −0.7×U[j−1][3], and −0.5×U[j][1] to −0.5×U[j][3].

The intermediate layer 24B in the neural network 243 will be described with reference to FIG. 15. The intermediate layer 24B includes the velocity-side computation portions N[1] to N[3]. Note that the number of the velocity-side computation portions is not limited to three.

The velocity-side computation portion N[1] sums the plurality of velocity-side first multiplication values that are obtained by multiplying the velocity-side first outputs, which are output from the input portions K[1] to K[j+n] to the velocity-side computation portion N[1], by the velocity-side first learning weights (U[s][1]) that respectively correspond to the velocity-side first outputs, and the velocity-side computation portion N[1] outputs the obtained value as a velocity-side second output to the output layer 24C.

The velocity-side computation portion N[2] sums the plurality of velocity-side first multiplication values that are obtained by multiplying the velocity-side first outputs, which are output from the input portions K[1] to K[j+n] to the velocity-side computation portion N[2], by the velocity-side first learning weights (U[s][2]) that respectively correspond to the velocity-side first outputs, and the velocity-side computation portion N[2] outputs the obtained value as the velocity-side second output to the output layer 24C.

The velocity-side computation portion N[3] sums the plurality of velocity-side first multiplication values that are obtained by multiplying the velocity-side first outputs, which are output from the input portions K[1] to K[j+n] to the velocity-side computation portion N[3], by the velocity-side first learning weights (U[s][3]) that respectively correspond to the velocity-side first outputs, and the velocity-side computation portion N[3] outputs the obtained value as the velocity-side second output to the output layer 24C.

The velocity-side second weight learning portion 24H in the neural network 243 will be described with reference to FIG. 15. The velocity-side second weight learning portion 24H has a memory function that stores: a velocity-side second learning weight Y[1] that corresponds to the velocity-side computation portion N[1]; a velocity-side second learning weight Y[2] that corresponds to the velocity-side computation portion N[2]; and a velocity-side second learning weight Y[3] that corresponds to the velocity-side computation portion N[3]. In addition, the velocity-side second weight learning portion 24H has a changing function that changes (learns) the velocity-side second learning weight Y[1] to Y[3] on the basis of the velocity deviation 20out. Furthermore, the velocity-side second weight learning portion 24H has a multiplication function that multiplies each of the received velocity-side second outputs 24L2 by a corresponding one of the velocity-side second learning weights Y[1] to Y[3].

The velocity-side second weight learning portion 24H changes (learns) each of values of the velocity-side second learning weights Y[1] to Y[3] such that each of the values of the velocity-side second learning weights Y[1] to Y[3] approximates an optimum value with respect to a specified evaluation function, in accordance with the velocity deviation 20out. For example, the velocity-side second weight learning portion 24H uses an evaluation function that has the velocity-side second learning weight as a horizontal axis and the second power of the velocity deviation as a vertical axis, to change (learn) the value of the velocity-side second learning weight such that the second power of the velocity deviation is reduced. Note that the evaluation function is prepared for each of the weights.

The velocity-side second weight learning portion 24H outputs velocity-side second multiplication values 24M2 that are obtained by multiplying the received velocity-side second outputs 24L2 by the corresponding velocity-side second learning weights Y[1] to Y[3].

The output layer 24C in the neural network 243 will be described with reference to FIG. 15. The output layer 24C includes the velocity-side output portion Q[1]. The velocity-side output portion Q[1] converts a value that is obtained by summing the velocity-side second multiplication values of the following (11) to (13) by a specified function (for example, the sigmoid function), and outputs the converted value as the second tentative command current 24out: (11) the velocity-side second multiplication value that is obtained by multiplying the velocity-side second output, which is output from the velocity-side computation portion N[1], by the velocity-side second learning weight Y[1]; (12) the velocity-side second multiplication value that is obtained by multiplying the velocity-side second output, which is output from the velocity-side computation portion N[2], by the velocity-side second learning weight Y[2]; and (13) the velocity-side second multiplication value that is obtained by multiplying the velocity-side second output, which is output from the velocity-side computation portion N[3], by the velocity-side second learning weight Y[3]. Note that the velocity-side output portion Q[1] can output the second tentative command current 24out without using the sigmoid function.

Next, the configuration in the position feed-forward control portion 14 in the third embodiment will be described by using FIG. 16. The position feed-forward control portion 14 includes the input processing portion 141 and a neural network 143. Note that the input processing portion 141 is the same as the input processing portion 141 in the first embodiment (see FIG. 9) and thus a description thereof will not be made. In addition, the high-order command velocity Vp and the high-order command acceleration αp are also the same as those in the first embodiment (see FIG. 9), and thus a description thereof will not be made. The neural network 143 includes the input layer 14A, the position-side first weight learning portion 14G, an intermediate layer 14B, a position-side second weight learning portion 14H, and the output layer 14C. Note that three position-side computation portions M[1] to M[3] are provided as the intermediate layer 14B in the third embodiment. However, the number of the position-side computation portions is not limited to three.

The input layer 14A in the neural network 143 will be described with reference to FIG. 16. As shown in FIG. 16, the input layer 14A in the neural network 143 is the same as that in the first embodiment (see FIG. 9) in that the input layer 14A includes the position-side acceleration input portion J[1], the position-side positive-velocity input portion J[2], the position-side negative-velocity input portion J[3], and the position-side boundary-velocity input portions J[4] to J[j+n]. However, an output from each of the input portions differs from that in the first embodiment.

The position-side acceleration input portion J[1] receives the high-order command acceleration αp and outputs the received high-order command acceleration αp as the velocity-side acceleration output to each of the plurality of position-side computation portions M[1] to M[3] that are prepared in advance.

When Vp (>0) in the position-side positive/negative-velocity firing portion 14E fires, the position-side positive-velocity input portion J[2] receives the position-side positive-velocity output value that is the high-order command velocity Vp. Then, the position-side positive-velocity input portion J[2] outputs the received position-side positive-velocity output value as the position-side positive velocity output to each of the plurality of position-side computation portions M[1] to M[3] that are prepared in advance. When Vp (<0) in the position-side positive/negative-velocity firing portion 14E fires, the position-side negative-velocity input portion J[3] receives the position-side negative-velocity output value that is the high-order command velocity Vp. Then, the position-side negative-velocity input portion J[3] outputs the received position-side negative-velocity output value as the position-side negative velocity output to each of the plurality of position-side computation portions M[1] to M[3] that are prepared in advance.

The position-side boundary-velocity input portions J[4] to J[j+n] are prepared so as to respectively correspond to the plurality of boundary velocities −V0n to V1n. The position-side boundary-velocity input portions J[4] to J[j+n] receive the position-side boundary-velocity output values from the firing boundary velocities in the position-side boundary-velocity firing portion 14F, and output the received position-side boundary-velocity output values as the position-side boundary velocity outputs to each of the plurality of position-side computation portions M[1] to M[3] that are prepared in advance. The position-side acceleration output, the position-side positive velocity output, the position-side negative velocity output, and the position-side boundary velocity outputs, which are output from the input portions J[1] to J[j+n], are collectively referred to as position-side first outputs 14L1.

The position-side first weight learning portion 14G in the neural network 143 will be described with reference to FIG. 16. A position-side first learning weight W[1][1] (W[s][1]) corresponds to the position-side first output that is output from the position-side acceleration input portion J[1] to the position-side computation portion M[1]. A position-side first learning weight W[2][1] (W[s][1]) corresponds to the position-side first output that is output from the position-side positive-velocity input portion J[2] to the position-side computation portion M[1]. A position-side first learning weight W[3][1] (W[s][1]) corresponds to the position-side first output that is output from the position-side negative-velocity input portion J[3] to the position-side computation portion M[1]. Position-side first learning weights W[4][1] to W[j+n][1] (W[s][1]) correspond to the position-side first outputs that are output from the position-side boundary-velocity input portions J[4] to J[j+n] to the position-side computation portion M[1]. As described above, the position-side first learning weights W[s][1] correspond to the position-side first outputs that are output to the position-side computation portion M[1].

Similarly, a position-side first learning weight W[1][2] (W[s][2]) corresponds to the position-side first output that is output from the position-side acceleration input portion J[1] to the position-side computation portion M[2]. A position-side first learning weight W[2][2] (W[s][2]) corresponds to the position-side first output that is output from the position-side positive-velocity input portion J[2] to the position-side computation portion M[2]. A position-side first learning weight W[3][2] (W[s][2]) corresponds to the position-side first output that is output from the position-side negative-velocity input portion J[3] to the position-side computation portion M[2]. Position-side first learning weights W[4][2] to W[j+n][2] (W[s][2]) respectively correspond to the position-side first outputs that are output from the position-side boundary-velocity input portions J[4] to J[j+n] to the position-side computation portion M[2]. As described above, the position-side first learning weights W[s][2] correspond to the position-side first outputs that are output to the position-side computation portion M[2].

Similarly, a position-side first learning weight W[1][3] (W[s][3]) corresponds to the position-side first output that is output from the position-side acceleration input portion J[1] to the position-side computation portion M[3]. A position-side first learning weight W[2][3] (W[s][3]) corresponds to the position-side first output that is output from the position-side positive-velocity input portion J[2] to the position-side computation portion M[3]. A position-side first learning weight W[3][3](W[s][3]) corresponds to the position-side first output that is output from the position-side negative-velocity input portion J[3] to the position-side computation portion M[3]. Position-side first learning weights W[4][3] to W[j+n][3] (W[s][3]) respectively correspond to the position-side first outputs that are output from the position-side boundary-velocity input portions J[4] to J[j+n] to the position-side computation portion M[3]. As described above, the position-side first learning weights W[s][3] correspond to the position-side first outputs that are output to the position-side computation portion M[3].

The position-side first weight learning portion 14G has a memory function that stores the position-side first learning weights W[s][1], W[s][2], and W[s][3]. In addition, the position-side first weight learning portion 14G has a changing function that changes (learns) the position-side first learning weights W[s][1], W[s][2], and W[s][3] on the basis of the position deviation 10out. Furthermore, the position-side first weight learning portion 14G has a multiplication function that multiplies each of the received position-side first outputs 14L1 by the corresponding position-side first learning weight.

The position-side first weight learning portion 14G changes (learns) each of values of the position-side first learning weights W[s][1], W[s][2], and W[s][3] such that each of the values of the position-side first learning weights W[s][1], W[s][2], and W[s][3] approximates an optimum value with respect to a specified evaluation function, in accordance with the position deviation 10out. For example, the position-side first weight learning portion 14G uses an evaluation function that has the position-side first learning weight as a horizontal axis and the second power of the position deviation as a vertical axis, to change (learn) the value of the position-side first learning weight such that the second power of the position deviation is reduced. Note that the evaluation function is prepared for each of the weights. Note that, when receiving the high-order command velocity Vp that is shown in the example of FIG. 10, the position-side first weight learning portion 14G learns only the position-side first learning weights W[1][1] to W[1][3], W[2][1] to W[2][3], W[j+1][1] to W[j+1][3], and W[j+2][1] to W[j+2][3], each of which corresponds to the position-side first output that is output, and does not learn the position-side first learning weights, each of which corresponds to the other position-side first output that is not output.

The position-side first weight learning portion 14G outputs the position-side first multiplication values 14M1 that are obtained by multiplying the output position-side first outputs by the corresponding position-side first learning weights. For example, when receiving the high-order command velocity Vp that is shown in the example of FIG. 10, the position-side first weight learning portion 14G outputs αp×W[1][1] to αp×W[1][31], Vp×W[2][1] to Vp×W[2][3], 0.8×+11[1] to 0.8×+1][3], and 0.6×W[j+2][1] to 0.6×W[j+2][3]. For example, when receiving the high-order command velocity Vp that is shown in the example of FIG. 11, the position-side first weight learning portion 14G outputs αp×W[1][1] to αp×W[1][3], Vp×W[3][1] to Vp×W[3][3], −0.7×W[j−1][1] to −0.7×W[j−1][3], and −0.5×W[j][1] to −0.5×W[j][3].

The intermediate layer 14B in the neural network 143 will be described with reference to FIG. 16. The intermediate layer 14B includes the position-side computation portions M[1] to M[3]. Note that the number of the position-side computation portions is not limited to three.

The position-side computation portion M[1] sums the plurality of position-side first multiplication values that are obtained by multiplying the position-side first outputs, which are output from the input portions J[1] to J[j+n] to the position-side computation portion M[1], by the position-side first learning weights (W[s][1]) that respectively correspond to the position-side first outputs, and the position-side computation portion M[1] outputs the obtained value as a position-side second output to the output layer 14C.

The position-side computation portion M[2] sums the plurality of position-side first multiplication values that are obtained by multiplying the position-side first outputs, which are output from the input portions J[1] to J[j+n] to the position-side computation portion M[2], by the position-side first learning weights (W[s][2]) that respectively correspond to the position-side first outputs, and the position-side computation portion M[2] outputs the obtained value as the position-side second output to the output layer 14C.

The position-side computation portion M[3] sums the plurality of position-side first multiplication values that are obtained by multiplying the position-side first outputs, which are output from the input portions J[1] to J[j+n] to the position-side computation portion M[3], by the position-side first learning weights (W[s][3]) that respectively correspond to the position-side first outputs, and the position-side computation portion M[3] outputs the obtained value as the position-side second output to the output layer 14C.

The position-side second weight learning portion 14H in the neural network 143 will be described with reference to FIG. 16. The position-side second weight learning portion 14H has a memory function that stores: a position-side second learning weight X[1] that corresponds to the position-side computation portion M[1]; a position-side second learning weight X[2] that corresponds to the position-side computation portion M[2]; and a position-side second learning weight X[3] that corresponds to the position-side computation portion M[3]. In addition, the position-side second weight learning portion 14H has a changing function that changes (learns) the position-side second learning weights X[1] to X[3] on the basis of the position deviation 10out. Furthermore, the position-side second weight learning portion 14H has a multiplication function that multiplies each of the received position-side second outputs 14L2 by a corresponding one of the position-side second learning weights X[1] to X[3].

The position-side second weight learning portion 14H changes (learns) each of values of the position-side second learning weights X[1] to X[3] such that each of the values of the position-side second learning weights X[1] to X[3] approximates an optimum value with respect to a specified evaluation function, in accordance with the position deviation 10out. For example, the position-side second weight learning portion 14H uses an evaluation function that has the position-side second learning weight as a horizontal axis and the second power of the position deviation as a vertical axis, to change (learn) the value of the position-side second learning weight such that the second power of the position deviation is reduced. Note that the evaluation function is prepared for each of the weights.

The position-side second weight learning portion 14H outputs position-side second multiplication values 14M2 that are obtained by multiplying the received position-side second outputs 14L2 by the corresponding position-side second learning weights X[1] to X[3].

The output layer 14C in the neural network 143 will be described with reference to FIG. 16. The output layer 14C includes the position-side output portion P[1]. The position-side output portion P[1] converts a value that is obtained by summing the position-side second multiplication values of the following (11) to (13) by a specified function (for example, the sigmoid function), and outputs the converted value as the second tentative command velocity 14out: (11) the position-side second multiplication value that is obtained by multiplying the position-side second output, which is output from the position-side computation portion M[1], by the position-side second learning weight X[1]; (12) the position-side second multiplication value that is obtained by multiplying the position-side second output, which is output from the position-side computation portion M[2], by the position-side second learning weight X[2]; and (13) the position-side second multiplication value that is obtained by multiplying the position-side second output, which is output from the position-side computation portion M[3], by the position-side second learning weight X[3]. Note that the position-side output portion P[1] can output the second tentative command velocity 14out without using the sigmoid function.

As described so far, as compared to the first embodiment, in the third embodiment, the intermediate layer 24B, the intermediate layer 14B, the velocity-side second weight learning portion 24H, and the position-side second weight learning portion 14H are added, the number of the weights of the velocity-side first weight learning portion 24G and the number of the weights of the position-side first weight learning portion 14G are increased, and the perceptron is changed to the neural network. In addition, the outputs from the plurality of input portions are multiplied by the corresponding weights, and more combination patterns for the sum of the obtained values are provided in the neural network than in the perceptron. Thus, as compared to the first embodiment, the velocity deviation and the position deviation can be further reduced in the third embodiment.

Next, the motor control device 92U in a fourth embodiment will be described. The motor control device in the fourth embodiment, which is shown in FIG. 14, differs from the motor control device in the third embodiment, which is shown in FIG. 2, in that the position feed-forward control portion 14, the position-side input velocity computation portion 12, the position-side input acceleration computation portion 13, and the velocity addition computation portion 15 are not provided. The rest of the configuration of the motor control device in the fourth embodiment is the same as that of the motor control device in the third embodiment. Hereinafter, a description will be made mainly on different points. Note that the first tentative command velocity 11 out, which is output from the position feedback control portion 11, becomes the low-order command velocity 15out without being changed, and the low-order command velocity 15out is input to the velocity deviation computation portion 20.

In the motor control device in the fourth embodiment, which is shown in FIG. 14, the position feed-forward control portion 14, the input (the position-side input velocity computation portion 12, the position-side input acceleration computation portion 13) to the position feed-forward control portion 14, and the output (the velocity addition computation portion 15) therefrom in the motor control device in the third embodiment, which is shown in FIG. 2, are not provided. Thus, the position deviation is slightly increased in control executed by the motor control device in the fourth embodiment as compared to the control executed by the motor control device in the third embodiment. However, it is understood from the experimental result obtained by the inventor that the reduction in the position deviation by the velocity feed-forward control portion is more predominant than the reduction in the position deviation by the position feed-forward control portion. It is also understood that, even when the position feed-forward control portion is not provided, the position deviation can be sufficiently reduced, for example, in the robot control, which is shown in the example of FIG. 1. That is, for example, in the robot control, the position deviation can be reduced to the expected level even when the position feed-forward control portion is not provided (and the input and output portions for the position feed-forward control portion are not provided). In this case, the processing load on the motor control device can be reduced.

Next, the motor control device 92U in a fifth embodiment will be described with reference to FIG. 14, FIG. 17 to FIG. 19. The motor control device in the fifth embodiment differs from the motor control device in the second embodiment, which is shown in FIG. 14 and FIG. 3, in that the internal configuration of the velocity feed-forward control portion 24 is changed from the configuration shown in FIG. 3 to a configuration shown in FIG. 17. In addition, in the fifth embodiment, a function of the velocity-side boundary-velocity input portion in the internal configuration of the velocity feed-forward control portion 24 differs from that in the second embodiment. In particular, as shown in examples of FIG. 18 and FIG. 19, the firing states that occur in response to the received high-order command velocity Vv differ from those in the second embodiment, which are shown in the examples of FIG. 5 to FIG. 8.

Figure 17:
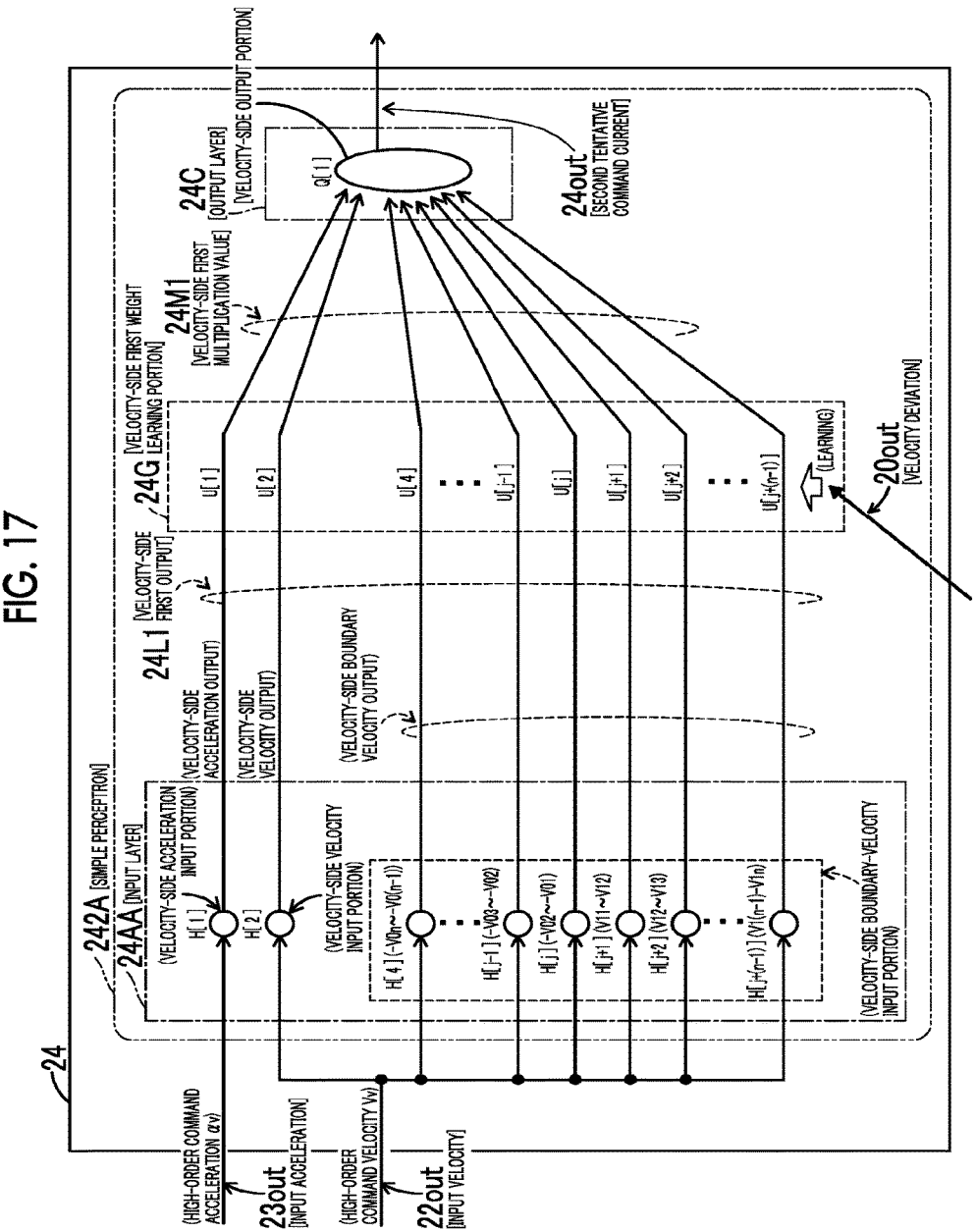
FIG. 17 is a conceptual diagram that illustrates an internal configuration of a velocity feed-forward control portion in FIG. 14 in fifth, sixth, and seventh embodiments.

A configuration of a network with the weight learning function in the velocity feed-forward control portion 24 will be described with reference to FIG. 17. As shown in FIG. 17, the velocity feed-forward control portion 24 in the fifth embodiment includes a simple perceptron 242A. The simple perceptron 242A includes an input layer 24AA, the velocity-side first weight learning portion 24G, and the output layer 24C. Note that the functions of the velocity-side first weight learning portion 24G and the output layer 24C are the same as the functions that have been described in the first and second embodiments. Thus, the velocity-side first weight learning portion 24G and the output layer 24C will not be described. The velocity feed-forward control portion in the fifth embodiment, which is shown in FIG. 17, differs in that the input processing portion 241 in the velocity feed-forward control portion in the first and second embodiments, which is shown in FIG. 3, is not provided and the velocity-side boundary-velocity input portions K[m] are changed to the velocity-side boundary-velocity input portions H[m]. Hereinafter, a description will be made mainly on different points.

The input layer 24AA in the simple perceptron 242A will be described with reference to FIG. 17. As shown in FIG. 17, the input layer 24AA in the simple perceptron 242A includes a velocity-side acceleration input portion H[1], a velocity-side velocity input portion H[2], and the velocity-side boundary-velocity input portions H[4] to H[j+(n−1)].

The velocity-side acceleration input portion H[1] receives the high-order command acceleration αv and outputs the received high-order command acceleration αv as the velocity-side acceleration output. A function of the velocity-side acceleration input portion H[1] is the same as a function of the velocity-side acceleration input portion K[1] in the first and second embodiments.

The velocity-side velocity input portion H[2] receives the high-order command velocity Vv and outputs the received high-order command velocity Vv as velocity-side velocity output. The velocity-side velocity input portion H[2] differs from the velocity-side positive-velocity input portion K[2] and the velocity-side negative-velocity input portion K[3] in the first and second embodiments in that the positive velocity and the negative velocity are not distinguished from each other.

The velocity-side boundary-velocity input portions H[4] to H[j+(n−1)] are prepared so as to respectively correspond to the plurality of boundary velocities shown in FIG. 4. In the example of FIG. 4, the plurality of velocity ranges include the velocity range of the boundary velocities −V0n to −V0(n−1) to the velocity range of the boundary velocities −V02 to −V01, and the velocity range of the boundary velocities V11 to V12 to the velocity range of the boundary velocities V1(n−1) to V1 n. The velocity-side boundary-velocity input portions H[4] to H[j+(n−1)] are prepared so as to respectively correspond to the plurality of boundary velocities. The velocity-side boundary-velocity input portions H[4] to H[j+(n−1)] receive the high-order command velocity Vv, and the velocity-side boundary-velocity input portions that are portions corresponding to the received high-order command velocity Vv output the velocity-side boundary velocity outputs. The velocity-side acceleration output, the velocity-side velocity output, and the velocity-side boundary velocity outputs, which are output from the input portions H[1], H[2], and H[4] to H[j+(n−1)], are collectively referred to as the velocity-side first outputs 24L1. Note that the velocity-side boundary-velocity input portion H[4] in FIG. 17 corresponds to the velocity range of the boundary velocities −V0n to −V0(n−1) in FIG. 4 (−V0(n−1) is not shown in FIG. 4). In addition, the velocity-side boundary-velocity input portion H[j−1] in FIG. 17 corresponds to the velocity range of the boundary velocities −V03 to −V02 shown in FIG. 4, and the velocity-side boundary-velocity input portion H[j+2] corresponds to the velocity range of the boundary velocities V12 to V13 shown in FIG. 4. Furthermore, the velocity-side boundary-velocity input portion H[j+(n−1)] in FIG. 17 corresponds to the velocity range of the boundary velocities V1(n−1) to V1n in FIG. 4 (V1(n−1) is not shown in FIG. 4).

Figure 18:
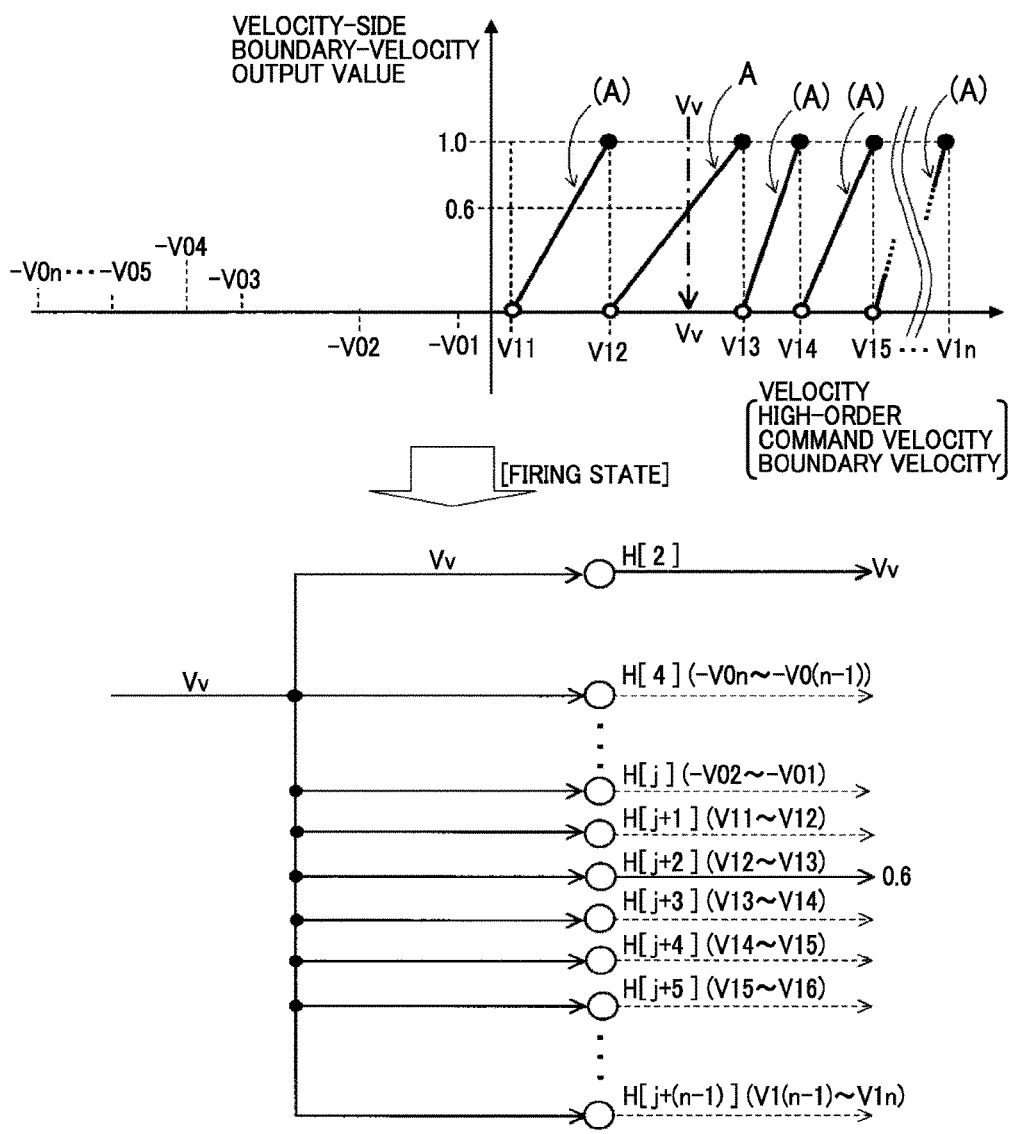
FIG. 18 is a graph and a diagram that illustrate an example of a firing state of a velocity-side boundary-velocity input portion H[m] in an example of a case of a high-order command velocity Vv>0 and a boundary velocity V12<the high-order command velocity Vv<a boundary velocity V13 in the fifth embodiment.

Examples of the firing states of the velocity-side boundary-velocity input portions H[4] to H[j+(n−1)] of the input layer 24AA in the simple perceptron 242A will be described with reference to FIG. 18 and FIG. 19. FIG. 18 shows an example in which the received high-order command velocity Vv is positive (>0) and the high-order command velocity Vv is larger than the boundary velocity V12 and smaller than the boundary velocity V13 (the boundary velocity V12<the high-order command velocity Vv<the boundary velocity V13). FIG. 18 shows an example in which each velocity range has a function A. In a graph of an upper portion in FIG.

18, a horizontal axis is set as an X-axis, and a vertical axis is set as a Y-axis. In this case, the function A is a linear proportional function that connects a position (X, Y)=(a lower limit boundary velocity, 0) and a position (X, Y)=(an upper limit boundary velocity, 1.0) in the velocity range to which the function A belongs. The function A does not include (the lower limit boundary velocity, 0), and includes (the upper limit boundary velocity, 1.0). For example, the function A in the velocity range of the boundary velocity V12 to the boundary velocity V13 does not include (the lower limit boundary velocity V12, 0) (indicated by a white circle) and includes (the upper limit boundary velocity V13, 1.0) (indicated by a black circle).

FIG. 18 shows an example in which the high-order command velocity Vv is positive (>0), the high-order command velocity Vv is larger than the boundary velocity V12 and smaller than the boundary velocity V13 (the boundary velocity V12<the high-order command velocity Vv<the boundary velocity V13), and the value of the function A that corresponds to the high-order command velocity Vv is 0.6 (the function A is the function A in the velocity range of the boundary velocities V12 to V13). In this case, as shown in FIG. 18, the velocity-side boundary-velocity input portion H[j+2] that corresponds to the velocity range of the boundary velocities V12 to V13 outputs the velocity-side boundary velocity output=0.6 as the velocity-side boundary velocity output, the velocity-side boundary-velocity input portion H[j+2] serving as a portion corresponding to the high-order command velocity Vv. The velocity-side boundary-velocity input portion H[j+1] that corresponds to the velocity range of the boundary velocities V11 to V12 as a portion that does not correspond to the high-order command velocity Vv and also the velocity-side boundary-velocity input portions H[j+3] to H[j+(n−1)] that do not correspond to the high-order command velocity Vv do not output anything. In addition, since FIG. 18 shows the example of the case where the high-order command velocity Vv is positive (>0), the velocity-side boundary-velocity input portions H[4] to H[j] that correspond to a case where the high-order command velocity Vv is negative (<0) do not output anything. For example, in the case of the high-order command velocity Vv=V13, the velocity-side boundary-velocity input portion H[j+2] that corresponds to the velocity range of the boundary velocities V12 to V13 outputs 1.0 as the velocity-side boundary velocity output. In the case of the high-order command velocity Vv=V12, the velocity-side boundary-velocity input portion H[j+1] that corresponds to the velocity range of the boundary velocities V11 to V12 outputs 1.0 as the velocity-side boundary velocity output. Thus, the velocity-side boundary-velocity input portions H[4] to H[j+(n−1)] each have a function of determining whether to output the velocity-side boundary velocity output and a function of computing the value of the velocity-side boundary velocity output.

FIG. 19 shows an example in which the received high-order command velocity Vv is negative (<0), the high-order command velocity Vv is larger than the boundary velocity −V03 and smaller than the boundary velocity −V02 (the boundary velocity −V03<the high-order command velocity Vv<the boundary velocity −V02), and each velocity range has the function A. In a graph of an upper portion in FIG. 19, a horizontal axis is set as the X-axis, and a vertical axis is set as the Y-axis. In this case, the function A is a linear proportional function that connects a position (X, Y)=(the lower limit boundary velocity, −1.0) and a position (X, Y)=(the upper limit boundary velocity, 0) in the velocity range to which the function A belongs, includes (the lower limit boundary velocity, −1.0), and does not include (the upper limit boundary velocity, 0). For example, the function A in the velocity range of the boundary velocity −V03 to the boundary velocity −V02 includes (the lower limit boundary velocity −V03, −1.0) (indicated by a black circle) and does not include (the upper limit boundary velocity −V02, 0) (indicated by a white circle).

FIG. 19 shows the example in which the high-order command velocity Vv is negative (<0), the high-order command velocity Vv is larger than the boundary velocity −V03 and smaller than the boundary velocity −V02 (the boundary velocity −V03<the high-order command velocity Vv<the boundary velocity −V02), and the value of the function A that corresponds to the high-order command velocity Vv is −0.3 (the function A is the function A in the velocity range of the boundary velocities −V03 to −V02). In this case, as shown in FIG. 19, the velocity-side boundary-velocity input portion H[j−1] that corresponds to the velocity range of the boundary velocities −V03 to −V02 outputs the velocity-side boundary velocity output=−0.3 as the velocity-side boundary velocity output, the velocity-side boundary-velocity input portion H[j−1] serving as a portion corresponding to the high-order command velocity Vv. The velocity-side boundary-velocity input portions H[4] to H[j−2] that respectively correspond to the velocity range of the boundary velocities −V0n to V0(n−1) to the velocity range of the boundary velocities −V04 to −V03 as the portions that do not correspond to the high-order command velocity Vv and also the velocity-side boundary-velocity input portion H[j] that does not correspond to the high-order command velocity Vv do not output anything. In addition, since FIG. 19 shows the example of the case where the high-order command velocity Vv is negative (<0), the velocity-side boundary-velocity input portions H[j+1] to H[j+(n−1)] that correspond to the case where the high-order command velocity Vv is positive (>0) do not output anything. For example, in the case of the high-order command velocity Vv=−V03, the velocity-side boundary-velocity input portion H[j−1] that corresponds to the velocity range of the boundary velocities −V03 to −V02 outputs −1.0 as the velocity-side boundary velocity output. In the case of the high-order command velocity Vv=−V02, the velocity-side boundary-velocity input portion H[j] that corresponds to the velocity range of the boundary velocities −V02 to −V01 outputs −1.0 as the velocity-side boundary velocity output. Thus, the velocity-side boundary-velocity input portions H[4] to H[j+(n−1)] each have a function of determining whether to output the velocity-side boundary velocity output and a function of computing the value of the velocity-side boundary velocity output.

In the simple perceptron 242A (see FIG. 17) of the motor control device in the fifth embodiment, the function of the input processing portion 241 in the simple perceptron 242 (see FIG. 3) of the motor control device in the second embodiment is integrated into the input layer 24AA, and the input processing portion 241 is not provided. In addition, the velocity-side positive-velocity input portion K[2] and the velocity-side negative-velocity input portion K[3] in the second embodiment are integrated into the velocity-side velocity input portion H[2]. Thus, as compared to the motor control device in the second embodiment, the configuration of the motor control device in the fifth embodiment is simplified, and the processing load thereof is reduced. In the second embodiment, the plurality of boundary-velocity firing portions fire. This makes it possible to output the plurality of boundary velocity outputs from the plurality of boundary-velocity input portions. Thus, velocity continuity is provided, and the velocity deviation at any velocity is small. In the fifth embodiment, only one boundary velocity output can be output from one boundary-velocity input portion. Thus, velocity discontinuity occurs. While the configuration is simplified, the velocity deviation is likely to be increased slightly.

Next, the motor control device 92U in a sixth embodiment will be described with reference to FIG. 14, FIG. 17, FIG. 20, and FIG. 21. Similarly to the fifth embodiment, the motor control device in the sixth embodiment differs from the motor control device in the second embodiment, which is shown in FIG. 14 and FIG. 3, in that the internal configuration of the velocity feed-forward control portion 24 is changed from the configuration shown in FIG. 3 to the configuration shown in FIG. 17. In addition, in the sixth embodiment, the function of the velocity-side boundary-velocity input portion in the internal configuration of the velocity feed-forward control portion 24 differs from that in the second embodiment. As shown in examples of FIG. 20 and FIG. 21, the firing states that occur in response to the received high-order command velocity Vv differ from those in the fifth embodiment, which are shown in the examples of FIG. 18 and FIG. 19 (the sixth embodiment differs from the fifth embodiment in that the function A is replaced with a function B). Hereinafter, a description will be made mainly on different points.

Figure 20:
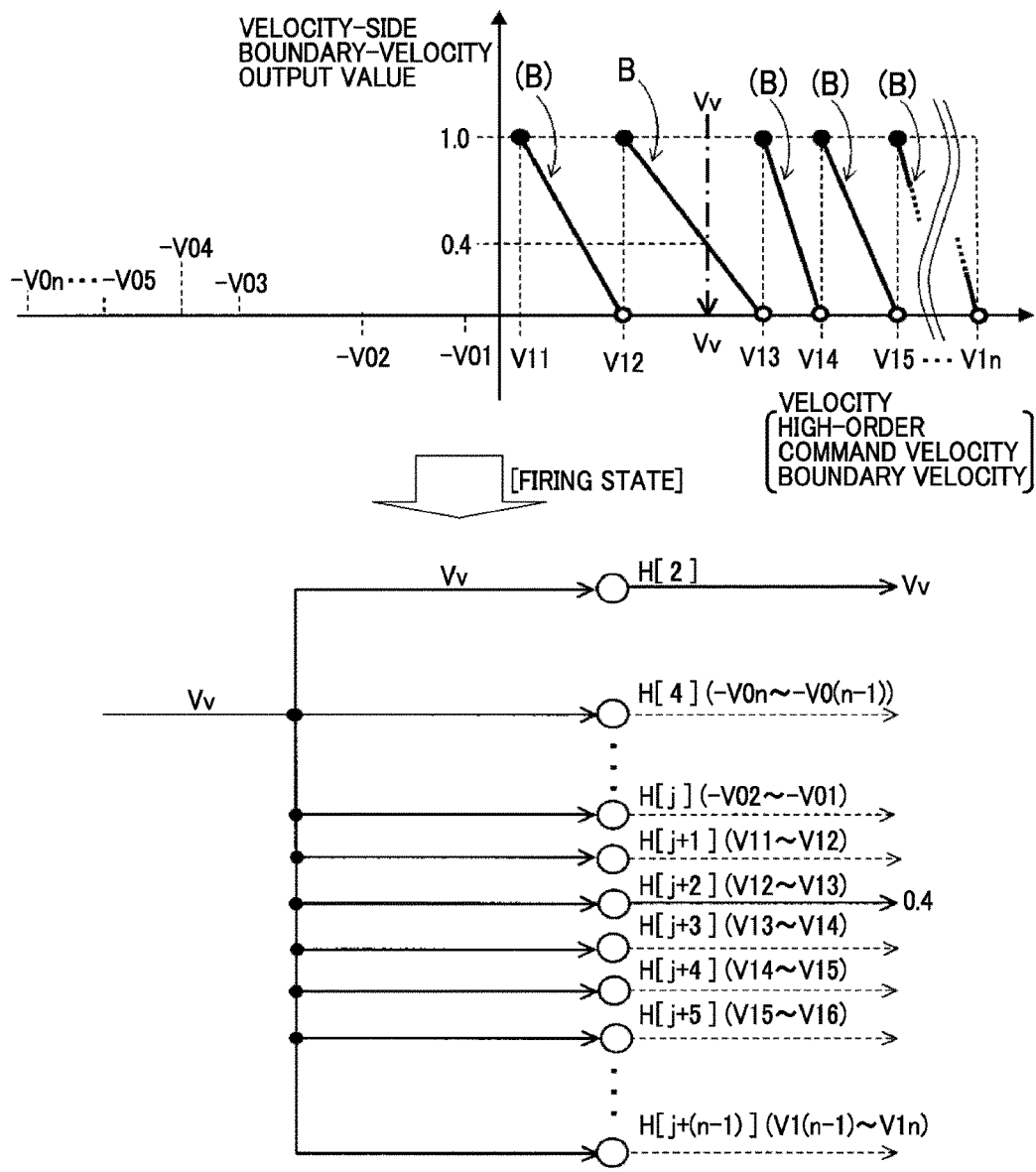
FIG. 20 is a graph and a diagram that illustrate an example of a firing state of a velocity-side boundary-velocity input portion H[m] in an example of a case of a high-order command velocity Vv>0 and a boundary velocity V12<the high-order command velocity Vv<a boundary velocity V13 in the sixth embodiment.

Examples of the firing states of the velocity-side boundary-velocity input portions H[4] to H[j+(n−1)] of the input layer 24AA in the simple perceptron 242A will be described with reference to FIG. 20 and FIG. 21. FIG. 20 shows an example in which the received high-order command velocity Vv is positive (>0), the high-order command velocity Vv is larger than the boundary velocity V12 and smaller than the boundary velocity V13 (the boundary velocity V12<the high-order command velocity Vv<the boundary velocity V13) and each velocity range has the function B. In a graph of an upper portion in FIG. 20, a horizontal axis is set as the X-axis, and a vertical axis is set as the Y-axis. In this case, the function B is a linear proportional function that connects a position (X, Y)=(the lower limit boundary velocity, 1.0) and a position (X, Y)=(the upper limit boundary velocity, 0) in the velocity range to which the function B belongs, includes (the lower limit boundary velocity, 1.0), and does not include (the upper limit boundary velocity, 0). For example, the function B in the velocity range of the boundary velocity V12 to the boundary velocity V13 includes (the lower limit boundary velocity V12, 1.0) (indicated by a black circle) and does not include (the upper limit boundary velocity V13, 0) (indicated by a white circle).

FIG. 20 shows an example in which the high-order command velocity Vv is positive (>0), the high-order command velocity Vv is larger than the boundary velocity V12 and smaller than the boundary velocity V13 (the boundary velocity V12<the high-order command velocity Vv<the boundary velocity V13), and the value of the function B that corresponds to the high-order command velocity Vv is 0.4 (the function B is the function B in the velocity range of the boundary velocities V12 to V13). In this case, as shown in FIG. 20, the velocity-side boundary-velocity input portion H[j+2] that corresponds to the velocity range of the boundary velocities V12 to V13 outputs the velocity-side boundary velocity output=0.4 as the velocity-side boundary velocity output, the velocity-side boundary-velocity input portion H[j+2] serving as a portion corresponding to the high-order command velocity Vv. The velocity-side boundary-velocity input portion H[j+1] that corresponds to the velocity range of the boundary velocities V11 to V12 as a portion that does not correspond to the high-order command velocity Vv and also the velocity-side boundary-velocity input portions H[j+3] to H[j+(n−1)] that do not correspond to the high-order command velocity Vv do not output anything. In addition, since FIG. 20 shows the example of the case where the high-order command velocity Vv is positive (>0), the velocity-side boundary-velocity input portions H[4] to H[j] that correspond to the case where the high-order command velocity Vv is negative (<0) do not output anything. For example, in the case of the high-order command velocity Vv=V12, the velocity-side boundary-velocity input portion H[j+2] that corresponds to the velocity range of the boundary velocities V12 to V13 outputs 1.0 as the velocity-side boundary velocity output. In the case of the high-order command velocity Vv=V13, the velocity-side boundary-velocity input portion H[j+3] that corresponds to the velocity range of the boundary velocities V13 to V14 outputs 1.0 as the velocity-side boundary velocity output. Thus, the velocity-side boundary-velocity input portions H[4] to H[j+(n−1)] each have a function of determining whether to output the velocity-side boundary velocity output and a function of computing the value of the velocity-side boundary velocity output.

FIG. 21 shows an example in which the received high-order command velocity Vv is negative (<0), the high-order command velocity Vv is larger than the boundary velocity −V03 and smaller than the boundary velocity −V02 (the boundary velocity −V03<the high-order command velocity Vv<the boundary velocity −V02) and each velocity range has the function B. In a graph of an upper portion in FIG. 21, a horizontal axis is set as the X-axis, and a vertical axis is set as the Y-axis. In this case, the function B is a linear proportional function that connects a position (X, Y)=(the lower limit boundary velocity, 0) and a position (X, Y)=(the upper limit boundary velocity, −1.0) in the velocity range to which the function B belongs, does not include (the lower limit boundary velocity, 0), and includes (the upper limit boundary velocity, −1.0). For example, the function B in the velocity range of the boundary velocity −V03 to the boundary velocity −V02 does not include (the lower limit boundary velocity −V03, 0) (indicated by a white circle) and includes (the upper limit boundary velocity −V02, −1.0) (indicated by a black circle).

FIG. 21 shows the example in which the high-order command velocity Vv is negative (<0), the high-order command velocity Vv is larger than the boundary velocity −V03 and smaller than the boundary velocity −V02 (the boundary velocity −V03<the high-order command velocity Vv<the boundary velocity −V02), and the value of the function B that corresponds to the high-order command velocity Vv is −0.7 (the function B is the function B in the velocity range of the boundary velocities −V03 to −V02). In this case, as shown in FIG. 21, the velocity-side boundary-velocity input portion H[j−1] that corresponds to the velocity range of the boundary velocities −V03 to −V02 outputs the velocity-side boundary velocity output=−0.7 as the velocity-side boundary velocity output, the velocity-side boundary-velocity input portion H[j−1] serving as a portion corresponding to the high-order command velocity Vv. The velocity-side boundary-velocity input portions H[4] to H[j−2] that respectively correspond to the velocity range of the boundary velocities −V0n to V0(n−1) to the velocity range of the boundary velocities −V04 to −V03 as the portions that do not correspond to the high-order command velocity Vv and also the velocity-side boundary-velocity input portion H[j] that does not correspond to the high-order command velocity Vv do not output anything. In addition, since FIG. 21 shows the example of the case where the high-order command velocity Vv is negative (<0), the velocity-side boundary-velocity input portions H[j+1] to H[j+(n−1)] that correspond to the case where the high-order command velocity Vv is positive (>0) do not output anything. For example, in the case of the high-order command velocity Vv=−V02, the velocity-side boundary-velocity input portion H[j−1] that corresponds to the velocity range of the boundary velocities −V03 to −V02 outputs −1.0 as the velocity-side boundary velocity output. In the case of the high-order command velocity Vv=−V03, the velocity-side boundary-velocity input portion H[j−2] that corresponds to the velocity range of the boundary velocities −V04 to −V03 outputs −1.0 as the velocity-side boundary velocity output. Thus, the velocity-side boundary-velocity input portions H[4] to H[j+(n−1)] each have a function of determining whether to output the velocity-side boundary velocity output and a function of computing the value of the velocity-side boundary velocity output.

In the simple perceptron 242A (see FIG. 17) of the motor control device in the sixth embodiment, similarly to the fifth embodiment, the function of the input processing portion 241 in the simple perceptron 242 (see FIG. 3) of the motor control device in the second embodiment is integrated into the input layer 24AA, and the input processing portion 241 is not provided. In addition, the velocity-side positive-velocity input portion K[2] and the velocity-side negative-velocity input portion K[3] in the second embodiment are integrated into the velocity-side velocity input portion H[2]. Thus, similarly to the fifth embodiment, as compared to the motor control device in the second embodiment, the configuration of the motor control device in the sixth embodiment is simplified, and the processing load thereof is reduced. In addition, in the sixth embodiment, similarly to the fifth embodiment, only one boundary velocity output can be output from one boundary-velocity input portion. Thus, velocity discontinuity occurs. While the configuration is simplified, the velocity deviation is likely to be increased slightly.

Next, the motor control device 92U in a seventh embodiment will be described with reference to FIG. 14, FIG. 17, FIG. 22, and FIG. 23. Similarly to the fifth embodiment, the motor control device in the seventh embodiment differs from the motor control device in the second embodiment, which is shown in FIG. 14 and FIG. 3, in that the internal configuration of the velocity feed-forward control portion 24 is changed from the configuration shown in FIG. 3 to the configuration shown in FIG. 17. In addition, in the seventh embodiment, the function of the velocity-side boundary-velocity input portion in the internal configuration of the velocity feed-forward control portion 24 differs from that in the second embodiment. As shown in examples of FIG. 22 and FIG. 23, firing states that occur in response to the received high-order command velocity Vv differ from those in the fifth embodiment, which are shown in the examples of FIG. 18 and FIG. 19 (the seventh embodiment differs from the fifth embodiment in that the function A is replaced with a function C). Hereinafter, a description will be made mainly on different points.

Examples of firing states of the velocity-side boundary-velocity input portions H[4] to H[j+(n−1)] of the input layer 24AA in the simple perceptron 242A will be described with reference to FIG. 22 and FIG. 23. FIG. 22 shows an example in which the received high-order command velocity Vv is positive (>0), the high-order command velocity Vv is larger than the boundary velocity V12 and smaller than the boundary velocity V13 (the boundary velocity V12<the high-order command velocity Vv<the boundary velocity V13) and each velocity range has the function C. In a graph of an upper portion in FIG. 22, a horizontal axis is set as the X-axis, and a vertical axis is set as the Y-axis. In this case, the function C is a function in an isosceles triangular shape (without a bottom side) that sequentially connects a position (X, Y)= (the lower limit boundary velocity, 0), a position (X, Y)=(a center between the lower limit boundary velocity and the upper limit boundary velocity, 1.0), and a position (X, Y)=(the upper limit boundary velocity, 0) in the velocity range to which the function C belongs, does not include (the lower limit boundary velocity, 0), and includes (the upper limit boundary velocity, 0). For example, the function C in the velocity range of the boundary velocity V12 to the boundary velocity V13 does not include (the lower limit boundary velocity V12, 0) (indicated by a white circle) and includes (the upper limit boundary velocity V13, 0) (indicated by a black circle).

FIG. 22 shows an example in which the high-order command velocity Vv is positive (>0), the high-order command velocity Vv is larger than the boundary velocity V12 and smaller than the boundary velocity V13 (the boundary velocity V12<the high-order command velocity Vv<the boundary velocity V13), and the value of the function C that corresponds to the high-order command velocity Vv is 0.8 (the function C is the function C in the velocity range of the boundary velocities V12 to V13). In this case, as shown in FIG. 22, the velocity-side boundary-velocity input portion H[j+2] that corresponds to the velocity range of the boundary velocities V12 to V13 outputs the velocity-side boundary velocity output=0.8 as the velocity-side boundary velocity output, the velocity-side boundary-velocity input portion H[j+2] serving as a portion corresponding to the high-order command velocity Vv. The velocity-side boundary-velocity input portion H[j+1] that corresponds to the velocity range of the boundary velocities V11 to V12 as a portion that does not correspond to the high-order command velocity Vv and also the velocity-side boundary-velocity input portions H[j+3] to H[j+(n−1)] that do not correspond to the high-order command velocity Vv do not output anything. In addition, since FIG. 22 shows the example of the case where the high-order command velocity Vv is positive (>0), the velocity-side boundary-velocity input portions H[4] to H[j] that correspond to the case where the high-order command velocity Vv is negative (<0) do not output anything. For example, in the case of the high-order command velocity Vv=V13, the velocity-side boundary-velocity input portion H[j+2] that corresponds to the velocity range of the boundary velocities V12 to V13 outputs 0 as the velocity-side boundary velocity output. In the case of the high-order command velocity Vv=V12, the velocity-side boundary-velocity input portion H[j+1] that corresponds to the velocity range of the boundary velocities V11 to V12 outputs 0 as the velocity-side boundary velocity output. As described above, the velocity-side boundary-velocity input portions H[4] to H[j+(n−1)] each have a function of determining whether to output the velocity-side boundary velocity output and a function of computing the value of the velocity-side boundary velocity output.

FIG. 23 shows an example in which the received high-order command velocity Vv is negative (<0) and the boundary velocity −V03<the high-order command velocity Vv<the boundary velocity −V02 and an example in which each velocity range has the function C. In a graph of an upper portion in FIG. 23, a horizontal axis is set as the X-axis, and a vertical axis is set as the Y-axis. In this case, the function C is a function in an isosceles triangular shape (except for a bottom side) that sequentially connects a position (X, Y)=(the lower limit boundary velocity, 0), a position (X, Y)=(center of the lower limit boundary velocity and the upper limit boundary velocity, −1.0), and a position (X, Y)=(the upper limit boundary velocity, 0) in the velocity range to which the function C belongs, includes (the lower limit boundary velocity, 0), but does not include (the upper limit boundary velocity, 0). For example, the function C in the velocity range from the boundary velocity −V03 to the boundary velocity −V02 includes (the lower limit boundary velocity −V03, 0) (indicated by a black circle) but does not include (the upper limit boundary velocity −V02, 0) (indicated by a white circle).

FIG. 23 shows the example in which the high-order command velocity Vv is negative (<0), the high-order command velocity Vv is larger than the boundary velocity −V03 and smaller than the boundary velocity −V02 (the boundary velocity −V03<the high-order command velocity Vv<the boundary velocity −V02), and the value of the function C that corresponds to the high-order command velocity Vv is −0.6 (the function C is the function C in the velocity range of the boundary velocities −V03 to −V02). In this case, as shown in FIG. 23, the velocity-side boundary-velocity input portion H[j−1] that corresponds to the velocity range of the boundary velocities −V03 to −V02 outputs the velocity-side boundary velocity output=−0.6 as the velocity-side boundary velocity output, the velocity-side boundary-velocity input portion H[j−1] serving as a portion corresponding to the high-order command velocity Vv. The velocity-side boundary-velocity input portions H[4] to H[j−2] that respectively correspond to the velocity range of the boundary velocities −V0n to V0(n−1) to the velocity range of the boundary velocities −V04 to −V03 as the portions that do not correspond to the high-order command velocity Vv and also the velocity-side boundary-velocity input portion H[j] that does not correspond to the high-order command velocity Vv do not output anything. In addition, since FIG. 23 shows the example of the case where the high-order command velocity Vv is negative (<0), the velocity-side boundary-velocity input portions H[j+1] to H[j+(n−1)] that correspond to the case where the high-order command velocity Vv is positive (>0) do not output anything. For example, in the case of the high-order command velocity Vv=−V03, the velocity-side boundary-velocity input portion H[j−1] that corresponds to the velocity range of the boundary velocities −V03 to −V02 outputs 0 as the velocity-side boundary velocity output. In the case of the high-order command velocity Vv=−V02, the velocity-side boundary-velocity input portion H[j] that corresponds to the velocity range of the boundary velocities −V02 to −V01 outputs 0 as the velocity-side boundary velocity output. Thus, the velocity-side boundary-velocity input portions H[4] to H[j+(n−1)] each have a function of determining whether to output the velocity-side boundary velocity output and a function of computing the value of the velocity-side boundary velocity output.

In the simple perceptron 242A (see FIG. 17) of the motor control device in the seventh embodiment, similarly to the fifth embodiment, the function of the input processing portion 241 in the simple perceptron 242 (see FIG. 3) of the motor control device in the second embodiment is integrated into the input layer 24AA, and the input processing portion 241 is not provided. In addition, the velocity-side positive-velocity input portion K[2] and the velocity-side negative-velocity input portion K[3] in the second embodiment are integrated into the velocity-side velocity input portion H[2]. Thus, similarly to the fifth embodiment, as compared to the motor control device in the second embodiment, the configuration of the motor control device in the seventh embodiment is simplified, and the processing load thereof is reduced. In addition, in the seventh embodiment, similarly to the fifth embodiment, only one boundary-velocity output can be output from one boundary-velocity input portion. Thus, velocity discontinuity occurs. While the configuration is simplified, the velocity deviation is likely to be increased slightly.

The motor control device 92U of the disclosure is not limited to the configurations that have been described in the above-described embodiments, the configurations of the velocity feed-forward control portion, the configurations of the position feed-forward control portion, and the like in the above-described embodiments. Various modifications, additions, deletions may be made to the above-described embodiments without departing from the scope of the disclosure.

In the description of the above-described embodiments, the high-order command velocity Vv (the high-order command velocity Vp) is output from the velocity-side input velocity computation portion 22 (the position-side input velocity computation portion 12) on the basis of the command position. However, in another embodiment, the high-order command velocity may be directly output from the robot control device 60. In addition, in the description of the above-described embodiments, the high-order command acceleration αv (the high-order command acceleration αp) is output from the velocity-side input acceleration computation portion 23 (the position-side input acceleration computation portion 13) on the basis of the high-order command velocity Vv (the high-order command velocity Vp). However, in another embodiment, the high-order command acceleration may be directly output from the robot control device 60.

In the above-described embodiments, the normal distribution function is used as the specified distribution function in each of the velocity-side boundary-velocity firing portions 24F and the position-side boundary-velocity firing portion 14F. However, when the distribution function is used, the distribution function is not limited to the normal distribution function, and any of various distribution functions can be used. Similarly, the functions A, B, and C in the fifth to the seventh embodiments are not limited to the functions A, B, and C that have been described in the fifth to the seventh embodiments, and various functions can be used as the functions A, B, and C.

Each of the motor control devices that have been described in the above-described embodiments is not limited to a motor control device for a robot, and can be applied to a motor control device that controls a position of a specified member in various types of equipment.

Each of the expressions in the above-described embodiments, such as "equal to or larger than (≥)", "equal to or smaller than (≤)", "larger than (>)", and "smaller than (<)", may or may not include an equal sign.

What is claimed is:

1. A motor control device configured to control a position of a controlled object by using an electric motor that moves the position of the controlled object, and a position detection unit that detects a position related to the electric motor, the motor control device comprising:
a position deviation computation portion that computes a position deviation that is a deviation between a command position for the electric motor and an actual position based on a detection signal from the position detection unit;

a position feedback control portion that executes feedback control in accordance with the position deviation and outputs a first tentative command velocity;
a velocity deviation computation portion that computes a velocity deviation that is a deviation between a low-order command velocity for the electric motor including the first tentative command velocity and an actual velocity based on the detection signal from the position detection unit;
a velocity feedback control portion that executes feedback control in accordance with the velocity deviation and outputs a first tentative command current;
a velocity feed-forward control portion that executes feed-forward control in accordance with a high-order command velocity that is different from the low-order command velocity and outputs a second tentative command current;
a current addition computation portion that adds the first tentative command current to the second tentative command current and outputs a command current; and
a current output portion that outputs a drive current for the electric motor based on the command current, wherein the velocity feed-forward control portion includes: a velocity-side acceleration input portion that receives high-order command acceleration and outputs the received high-order command acceleration as a velocity-side acceleration output; a velocity-side velocity input portion that receives the high-order command velocity and outputs the received high-order command velocity as a velocity-side velocity output; a plurality of velocity-side boundary-velocity input portions which are prepared so as to respectively correspond to a plurality of boundary velocities, to receive the high-order command velocity, and to output a velocity-side boundary velocity output from a velocity-side boundary-velocity input portion corresponding to the high-order command velocity, the plurality of the boundary velocities being velocities at boundaries of a plurality of preset adjacent velocity ranges that are obtained by dividing a limited velocity range that is limited relative to a velocity range of the high-order command velocity; a velocity-side first weight learning portion that changes a plurality of velocity-side first learning weights in accordance with the velocity deviation, the velocity-side first learning weights respectively corresponding to velocity-side first outputs that include the velocity-side acceleration output, the velocity-side velocity output, and the velocity-side boundary velocity output; and a velocity-side output portion that outputs, as the second tentative command current, a value obtained by summing a plurality of velocity-side first multiplication values that are obtained by multiplying the velocity-side first outputs by the velocity-side first learning weights that respectively correspond to the velocity-side first outputs.

2. The motor control device according to claim 1, wherein:
the limited velocity range that has a velocity-physical phenomenon characteristic and that is regarded as having a nonlinear characteristic is divided into the velocity ranges each of which is regarded as having a linear characteristic, the velocity-physical phenomenon characteristic indicating a relationship between a velocity and a specified physical phenomenon including friction at a time when the controlled object is moved; and the velocities at the boundaries of the velocity ranges are set as the boundary velocities.

3. A motor control device configured to control a position of a controlled object by using an electric motor that moves the position of the controlled object, and a position detection unit that detects a position related to the electric motor, the motor control device comprising:
a position deviation computation portion that computes a position deviation that is a deviation between a command position for the electric motor and an actual position based on a detection signal from the position detection unit;
a position feedback control portion that executes feedback control in accordance with the position deviation and outputs a first tentative command velocity;
a velocity deviation computation portion that computes a velocity deviation that is a deviation between a low-order command velocity for the electric motor including the first tentative command velocity and an actual velocity based on the detection signal from the position detection unit;
a velocity feedback control portion that executes feedback control in accordance with the velocity deviation and outputs a first tentative command current;
a velocity feed-forward control portion that executes feed-forward control in accordance with a high-order command velocity that is different from the low-order command velocity and outputs a second tentative command current;
a current addition computation portion that adds the first tentative command current to the second tentative command current and outputs a command current; and
a current output portion that outputs a drive current for the electric motor based on the command current, wherein the velocity feed-forward control portion includes: a velocity-side positive/negative-velocity firing portion that receives the high-order command velocity, outputs a velocity-side positive-velocity output value when the received high-order command velocity is positive, and outputs a velocity-side negative-velocity output value when the received high-order command velocity is negative; a velocity-side boundary-velocity firing portion that has a plurality of boundary velocities, receives the high-order command velocity, and outputs velocity-side boundary-velocity output values from the boundary velocities each of which has a velocity difference from the high-order command velocity that is equal to or smaller than a specified velocity difference among the plurality of the boundary velocities, each of the velocity-side boundary-velocity output values being based on the velocity difference from the high-order command velocity, and the plurality of the boundary velocities being velocities at boundaries of a plurality of preset adjacent velocity ranges that are obtained by dividing a limited velocity range that is limited relative to a velocity range of the high-order command velocity; a velocity-side acceleration input portion that receives high-order command acceleration and outputs the received high-order command acceleration as a velocity-side acceleration output; a velocity-side positive-velocity input portion that receives the velocity-side positive-velocity output value and outputs the received velocity-side positive-velocity output value as a velocity-side positive-velocity output; a velocity-side negative-velocity input portion that receives the velocity-side negative-velocity output value and outputs the received velocity-side negative-velocity output value as a velocity-side negative-velocity output; a plurality of velocity-side boundary-velocity input portions which are prepared so as to respectively correspond to the plurality of the boundary velocities, to receive the velocity-side boundary-velocity output values, and to output the received velocity-side boundary-velocity output values as a plurality of velocity-side boundary velocity outputs; a velocity-side first weight learning portion that changes a plurality of velocity-side first learning weights in accordance with the velocity deviation, the velocity-side first learning weights respectively corresponding to velocity-side first outputs that include the velocity-side acceleration output, the velocity-side positive-velocity output, the velocity-side negative-velocity output, and the plurality of the velocity-side boundary velocity outputs; and a velocity-side output portion that outputs, as the second tentative command current, a value obtained by summing a plurality of velocity-side first multiplication values that are obtained by multiplying the velocity-side first outputs by the velocity-side first learning weights that respectively correspond to the velocity-side first outputs.

4. The motor control device according to claim 3 further comprising:
a position feed-forward control portion that executes feed-forward control in accordance with the high-order command velocity and outputs a second tentative command velocity; and
a velocity addition computation portion that adds the first tentative command velocity to the second tentative command velocity and outputs the low-order command velocity, wherein
the position feed-forward control portion includes: a position-side positive/negative-velocity firing portion that receives the high-order command velocity, outputs a position-side positive-velocity output value when the received high-order command velocity is positive, and outputs a position-side negative-velocity output value when the received high-order command velocity is negative; a position-side boundary-velocity firing portion that has the plurality of boundary velocities, receives the high-order command velocity, and outputs position-side boundary-velocity output values from the boundary velocities each of which has a velocity difference from the high-order command velocity that is equal to or smaller than a specified velocity difference among the plurality of the boundary velocities, each of the position-side boundary-velocity output values being based on the velocity difference from the high-order command velocity; a position-side acceleration input portion that receives the high-order command acceleration and outputs the received high-order command acceleration as a position-side acceleration output; a position-side positive-velocity input portion that receives the position-side positive-velocity output value and outputs the received position-side positive-velocity output value as a position-side positive-velocity output; a position-side negative-velocity input portion that receives the position-side negative-velocity output value and outputs the received position-side negative-velocity output value as a position-side negative-velocity output; a plurality of position-side boundary-velocity input portions which are prepared so as to respectively correspond to the plurality of the boundary velocities, to receive the position-side boundary-velocity output values, and to output the received position-side boundary-velocity output values as a plurality of position-side boundary velocity outputs; a position-side first weight learning portion that changes a plurality of position-side first learning weights in accordance with the position deviation, the position-side first learning weights respectively corresponding to position-side first outputs that include the position-side acceleration output, the position-side positive-velocity output, the position-side negative-velocity output, and the plurality of the position-side boundary velocity outputs; and a position-side output portion that outputs, as the second tentative command velocity, a value obtained by summing a plurality of position-side first multiplication values that are obtained by multiplying the position-side first outputs by the position-side first learning weights that respectively correspond to the position-side first outputs.

5. The motor control device according to claim 3, wherein:
the limited velocity range that has a velocity-physical phenomenon characteristic and that is regarded as having a nonlinear characteristic is divided into the velocity ranges each of which is regarded as having a linear characteristic, the velocity-physical phenomenon characteristic indicating a relationship between a velocity and a specified physical phenomenon including friction at a time when the controlled object is moved; and
the velocities at the boundaries of the velocity ranges are set as the boundary velocities.

6. The motor control device according to claim 3, wherein:
the velocity-side boundary-velocity firing portion has a specified distribution function that has a preset velocity width as a spreading width, and uses the distribution function to calculate a distribution probability corresponding to a velocity that is distant from a center of the distribution function by the velocity difference between the received high-order command velocity and each of the boundary velocities;
the velocity-side boundary-velocity firing portion fires at only the boundary velocities corresponding to the calculated distribution probabilities that are not zero; and
when the high-order command velocity is positive, the velocity-side boundary-velocity firing portion outputs positive values based on the calculated distribution probabilities, as the velocity-side boundary-velocity output values corresponding to the boundary velocities that fire, and when the high-order command velocity is negative, the velocity-side boundary-velocity firing portion outputs negative values based on the calculated distribution probabilities, as the velocity-side boundary-velocity output values corresponding to the boundary velocities that fire.

7. The motor control device according to claim 4, wherein:
the position-side boundary-velocity firing portion has a specified distribution function that has a preset velocity width as a spreading width, and uses the distribution function to calculate a distribution probability corresponding to a velocity that is distant from a center of the distribution function by the velocity difference between the received high-order command velocity and each of the boundary velocities;
the position-side boundary-velocity firing portion fires at only the boundary velocities corresponding to the calculated distribution probabilities that are not zero; and when the high-order command velocity is positive, the position-side boundary-velocity firing portion outputs positive values based on the calculated distribution probabilities, as the position-side boundary-velocity output values corresponding to the boundary velocities that fire, and when the high-order command velocity is negative, the position-side boundary-velocity firing portion outputs negative values based on the calculated distribution probabilities, as the position-side boundary-velocity output values corresponding to the boundary velocities that fire.

8. A motor control device configured to control a position of a controlled object by using an electric motor that moves the position of the controlled object, and a position detection unit that detects a position related to the electric motor, the motor control device comprising:
- a position deviation computation portion that computes a position deviation that is a deviation between a command position for the electric motor and an actual position based on a detection signal from the position detection unit;
- a position feedback control portion that executes feedback control in accordance with the position deviation and outputs a first tentative command velocity;
- a velocity deviation computation portion that computes a velocity deviation that is a deviation between a low-order command velocity for the electric motor including the first tentative command velocity and an actual velocity based on the detection signal from the position detection unit;
- a velocity feedback control portion that executes feedback control in accordance with the velocity deviation and outputs a first tentative command current;
- a velocity feed-forward control portion that executes feed-forward control in accordance with a high-order command velocity that is different from the low-order command velocity and outputs a second tentative command current;
- a current addition computation portion that adds the first tentative command current to the second tentative command current and outputs a command current; and
- a current output portion that outputs a drive current for the electric motor based on the command current, wherein the velocity feed-forward control portion includes: a velocity-side positive/negative-velocity firing portion that receives the high-order command velocity, outputs a velocity-side positive-velocity output value when the received high-order command velocity is positive, and outputs a velocity-side negative-velocity output value when the received high-order command velocity is negative; a velocity-side boundary-velocity firing portion that has a plurality of boundary velocities, receives the high-order command velocity, and outputs velocity-side boundary-velocity output values from the boundary velocities each of which has a velocity difference from the high-order command velocity that is equal to or smaller than a specified velocity difference among the plurality of the boundary velocities, each of the velocity-side boundary-velocity output values being based on the velocity difference from the high-order command velocity, and the plurality of the boundary velocities being velocities at boundaries of a plurality of preset adjacent velocity ranges that are obtained by dividing a limited velocity range that is limited relative to a velocity range of the high-order command velocity; a velocity-side acceleration input portion that receives high-order command acceleration and outputs the received high-order command acceleration as a velocity-side acceleration output to each of a plurality of velocity-side computation portions that are prepared in advance; a velocity-side positive-velocity input portion that receives the velocity-side positive-velocity output value and outputs the received velocity-side positive-velocity output value as a velocity-side positive-velocity output to each of the plurality of the velocity-side computation portions; a velocity-side negative-velocity input portion that receives the velocity-side negative-velocity output value and outputs the received velocity-side negative-velocity output value as a velocity-side negative-velocity output to each of the plurality of the velocity-side computation portions; a plurality of velocity-side boundary-velocity input portions which are prepared so as to respectively correspond to the plurality of the boundary velocities, to receive the velocity-side boundary-velocity output values, and to output the received velocity-side boundary-velocity output values as a plurality of velocity-side boundary velocity outputs to each of the plurality of the velocity-side computation portions; a velocity-side first weight learning portion that changes a plurality of velocity-side first learning weights in accordance with the velocity deviation, the plurality of the velocity-side first learning weights respectively corresponding to velocity-side first outputs that include the plurality of the velocity-side acceleration outputs, the plurality of the velocity-side positive-velocity outputs, the plurality of the velocity-side negative-velocity outputs, and the plurality of the velocity-side boundary velocity outputs; the plurality of the velocity-side computation portions each of which outputs, as a velocity-side second output, a value obtained by summing a plurality of velocity-side first multiplication values that are obtained by multiplying the velocity-side first outputs by the velocity-side first learning weights that respectively correspond to the velocity-side first outputs; a velocity-side second weight learning portion that changes a plurality of velocity-side second learning weights in accordance with the velocity deviation, the plurality of the velocity-side second learning weights respectively corresponding to the velocity-side second outputs; and a velocity-side output portion that outputs, as the second tentative command current, a value obtained by summing a plurality of velocity-side second multiplication values that are obtained by multiplying the velocity-side second outputs by the velocity-side second learning weights that respectively correspond to the velocity-side second outputs.

9. The motor control device according to claim 8 further comprising:
- a position feed-forward control portion that executes feed-forward control in accordance with the high-order command velocity and outputs a second tentative command velocity; and
- a velocity addition computation portion that adds the first tentative command velocity to the second tentative command velocity and outputs the low-order command velocity, wherein
- the position feed-forward control portion includes: a position-side positive/negative-velocity firing portion that receives the high-order command velocity, outputs a position-side positive-velocity output value when the received high-order command velocity is positive, and outputs a position-side negative-velocity output value when the received high-order command velocity is negative; a position-side boundary-velocity firing portion that has the plurality of the boundary velocities, receives the high-order command velocity, and outputs position-side boundary-velocity output values from the boundary velocities each of which has a velocity difference from the high-order command velocity that is equal to or smaller than a specified velocity difference among the plurality of the boundary velocities, each of the position-side boundary-velocity output values being based on the velocity difference from the high-order command velocity; a position-side acceleration input portion that receives high-order command acceleration and outputs the received high-order command acceleration as a position-side acceleration output to each of a plurality of position-side computation portions that are prepared in advance; a position-side positive-velocity input portion that receives the position-side positive-velocity output value and outputs the received position-side positive-velocity output value as a position-side positive-velocity output to each of the plurality of the position-side computation portions; a position-side negative-velocity input portion that receives the position-side negative-velocity output value and outputs the received position-side negative-velocity output value as a position-side negative-velocity output to each of the plurality of the position-side computation portions; a plurality of position-side boundary-velocity input portions which are prepared so as to respectively correspond to the plurality of the boundary velocities, to receive the position-side boundary-velocity output values, and to output the received position-side boundary-velocity output values as a plurality of position-side boundary velocity outputs to each of the plurality of the position-side computation portions; a position-side first weight learning portion that changes a plurality of position-side first learning weights in accordance with the position deviation, the plurality of the position-side first learning weights respectively corresponding to position-side first outputs that include the plurality of the position-side acceleration outputs, the plurality of the position-side positive-velocity outputs, the plurality of the position-side negative-velocity outputs, and the plurality of the position-side boundary velocity outputs; the plurality of the position-side computation portions each of which outputs, as a position-side second output, a value obtained by summing a plurality of position-side first multiplication values that are obtained by multiplying the position-side first outputs by the position-side first learning weights that respectively correspond to the position-side first outputs; a position-side second weight learning portion that changes a plurality of position-side second learning weights in accordance with the position deviation, the plurality of the position-side second learning weights respectively corresponding to the position-side second outputs; and a position-side output portion that outputs, as the second tentative command velocity, a value obtained by summing a plurality of position-side second multiplication values that are obtained by multiplying the position-side second outputs by the position-side second learning weights that respectively correspond to the position-side second outputs.

10. The motor control device according to claim 8, wherein:

the limited velocity range that has a velocity-physical phenomenon characteristic and that is regarded as having a nonlinear characteristic is divided into the velocity ranges each of which is regarded as having a linear characteristic, the velocity-physical phenomenon characteristic indicating a relationship between a velocity and a specified physical phenomenon including friction at a time when the controlled object is moved; and the velocities at the boundaries of the velocity ranges are set as the boundary velocities.

11. The motor control device according to claim 8, wherein:

the velocity-side boundary-velocity firing portion has a specified distribution function that has a preset velocity width as a spreading width, and uses the distribution function to calculate a distribution probability corresponding to a velocity that is distant from a center of the distribution function by the velocity difference between the received high-order command velocity and each of the boundary velocities;

the velocity-side boundary-velocity firing portion fires at only the boundary velocities corresponding to the calculated distribution probabilities that are not zero; and when the high-order command velocity is positive, the velocity-side boundary-velocity firing portion outputs positive values based on the calculated distribution probabilities, as the velocity-side boundary-velocity output values corresponding to the boundary velocities that fire, and when the high-order command velocity is negative, the velocity-side boundary-velocity firing portion outputs negative values based on the calculated distribution probabilities, as the velocity-side boundary-velocity output values corresponding to the boundary velocities that fire.

12. The motor control device according to claim 9, wherein:

the position-side boundary-velocity firing portion has a specified distribution function that has a preset velocity width as a spreading width, and uses the distribution function to calculate a distribution probability corresponding to a velocity that is distant from a center of the distribution function by the velocity difference between the received high-order command velocity and each of the boundary velocities;

the position-side boundary-velocity firing portion fires at only the boundary velocities corresponding to the calculated distribution probabilities that are not zero; and when the high-order command velocity is positive, the position-side boundary-velocity firing portion outputs positive values based on the calculated distribution probabilities, as the position-side boundary-velocity output values corresponding to the boundary velocities that fire, and when the high-order command velocity is negative, the position-side boundary-velocity firing portion outputs negative values based on the calculated distribution probabilities, as the position-side boundary-velocity output values corresponding to the boundary velocities that fire.

* * * * *